United States Patent
Russell

(10) Patent No.: US 8,332,517 B2
(45) Date of Patent: Dec. 11, 2012

(54) METHOD, COMPUTER PROGRAM, AND ALGORITHM FOR COMPUTING NETWORK SERVICE VALUE PRICING BASED ON COMMUNICATION SERVICE EXPERIENCES DELIVERED TO CONSUMERS AND MERCHANTS OVER A SMART MULTI-SERVICES (SMS) COMMUNICATION NETWORK

(75) Inventor: Jesse E. Russell, Piscataway, NJ (US)

(73) Assignee: IncNetworks, Inc., Long Beach, NJ (US)

( * ) Notice: Subject to any disclaimer, the term of this patent is extended or adjusted under 35 U.S.C. 154(b) by 350 days.

(21) Appl. No.: 12/752,087

(22) Filed: Mar. 31, 2010

(65) Prior Publication Data
US 2011/0243553 A1 Oct. 6, 2011

(51) Int. Cl.
*G06F 15/173* (2006.01)
*G06F 15/16* (2006.01)
*G06F 15/177* (2006.01)
*G06F 21/00* (2006.01)

(52) U.S. Cl. ........ 709/226; 709/201; 709/220; 709/229; 705/50; 705/52

(58) Field of Classification Search .................. 709/201, 709/220, 226, 229; 705/50, 52
See application file for complete search history.

(56) References Cited

U.S. PATENT DOCUMENTS

| | | | | |
|---|---|---|---|---|
| 7,012,891 | B1 * | 3/2006 | Chandran et al. | 370/230 |
| 7,298,724 | B2 * | 11/2007 | Lin et al. | 370/338 |
| 8,181,206 | B2 * | 5/2012 | Hasek | 725/58 |

* cited by examiner

*Primary Examiner* — David Lazaro
*Assistant Examiner* — Farzana Huq
(74) *Attorney, Agent, or Firm* — Doster Greene, LLC

(57) ABSTRACT

A system and method for providing multi-services within a communication network according to various exemplary embodiments can include storing, in a database of a computer, user-defined sets of rules and instructions for providing multi-services to end user devices connected to a communication network comprising a Hybrid Fiber-Wireless (HFW) network having policy management capabilities. The system and method can receive, at one or more processors, the user-defined sets of rules and instructions from a plurality of end users via a plurality of end user devices. The system and method can configure a virtual network for each end user within the communication network using the policy management capabilities based on the user-defined sets of rules and instructions provided by each end user. The user-defined sets of rules and instructions define provisioning and delivery of resources and services provided by the communication network to the end user.

16 Claims, 22 Drawing Sheets

(Part 1)

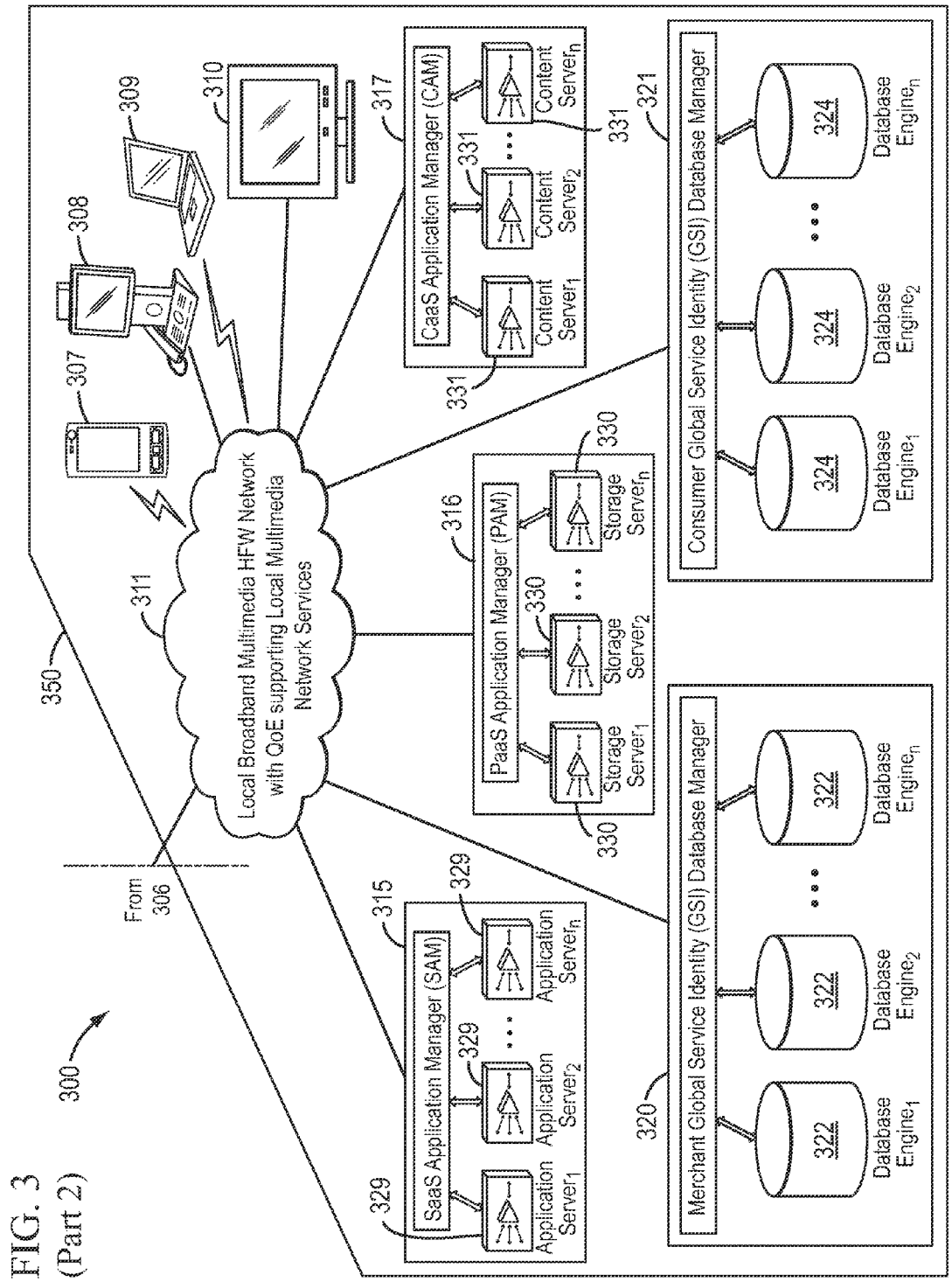
FIG. 3 (Part 2)

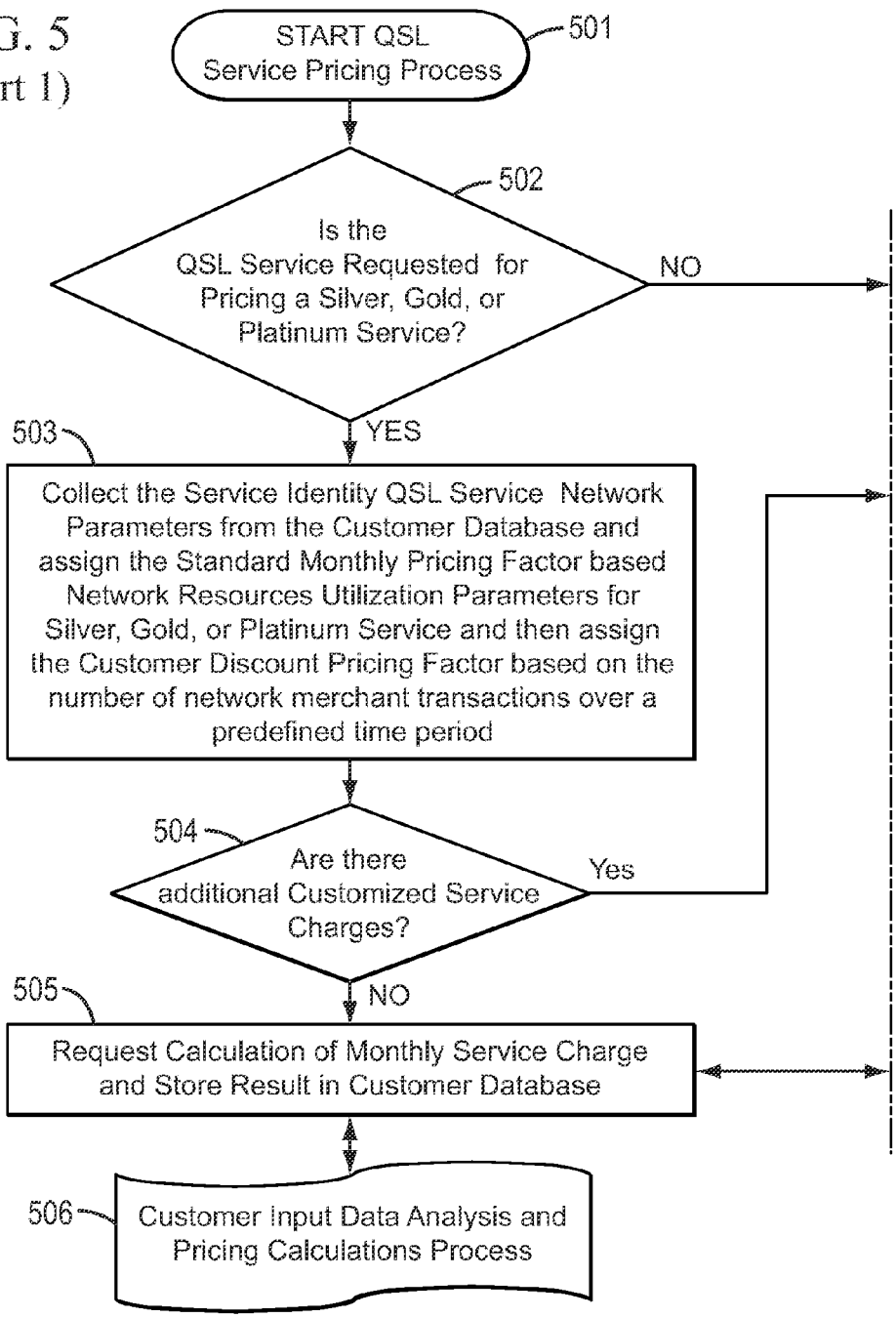
FIG. 5 (Part 1)

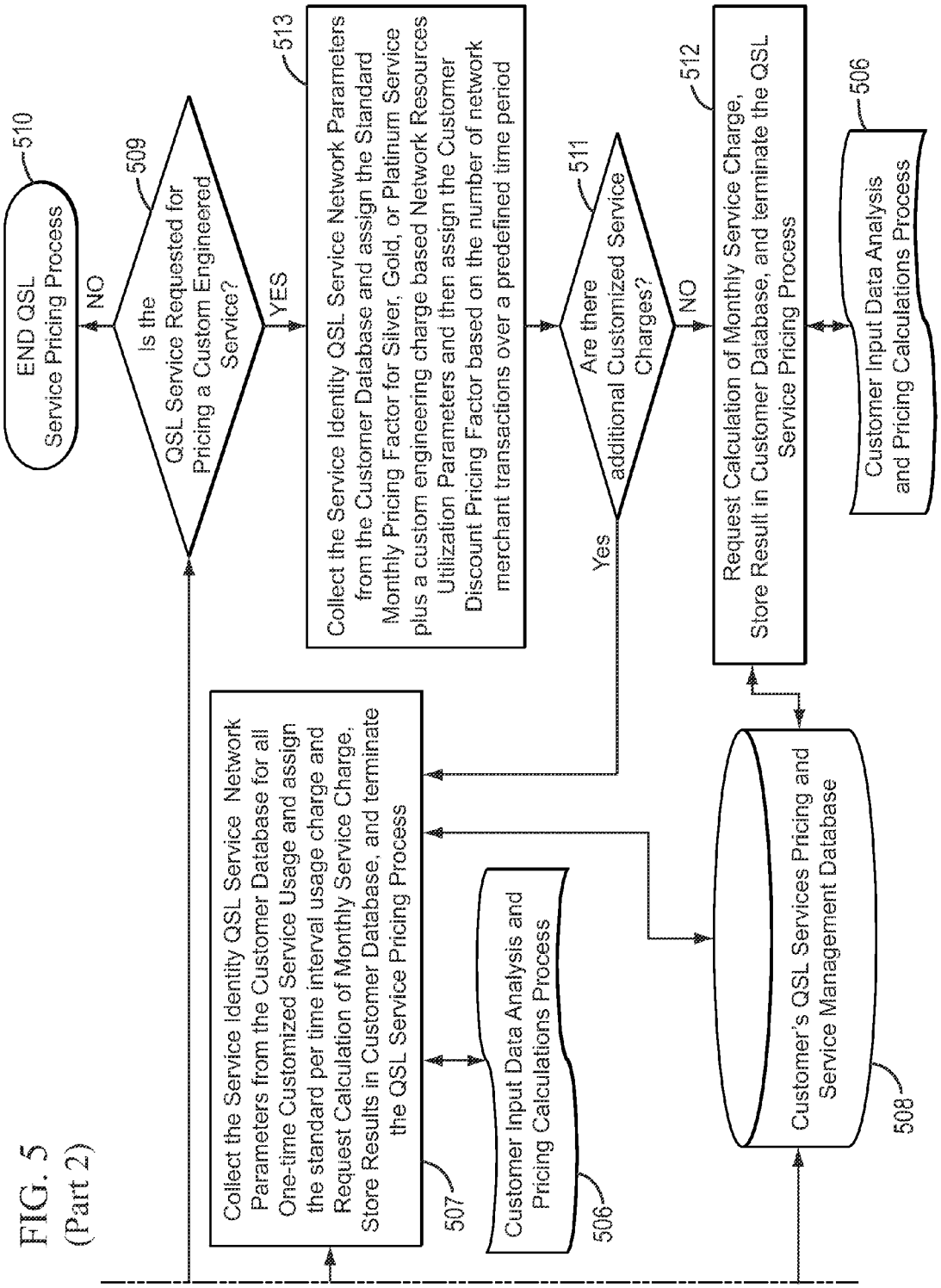
FIG. 5 (Part 2)

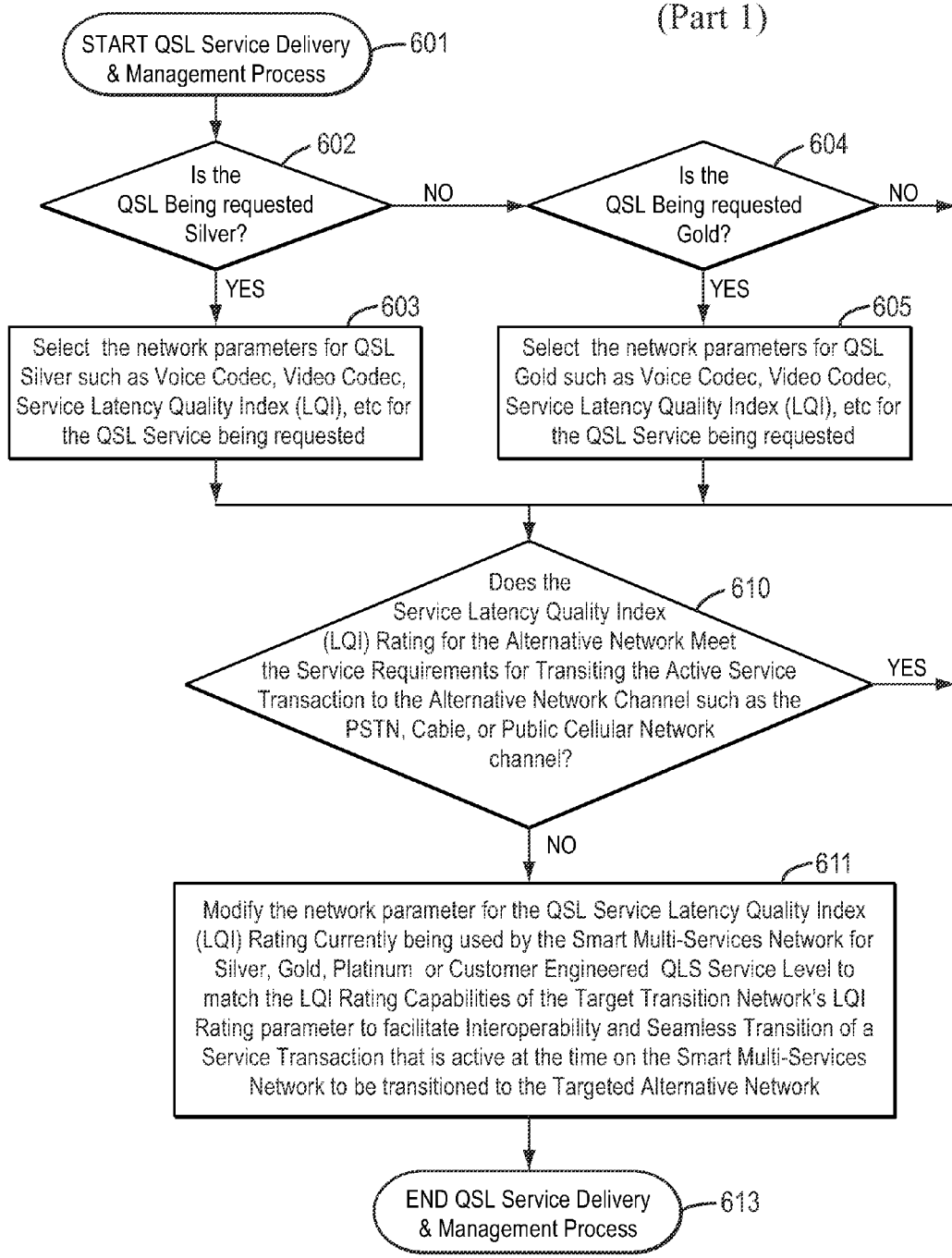

(Part 2)

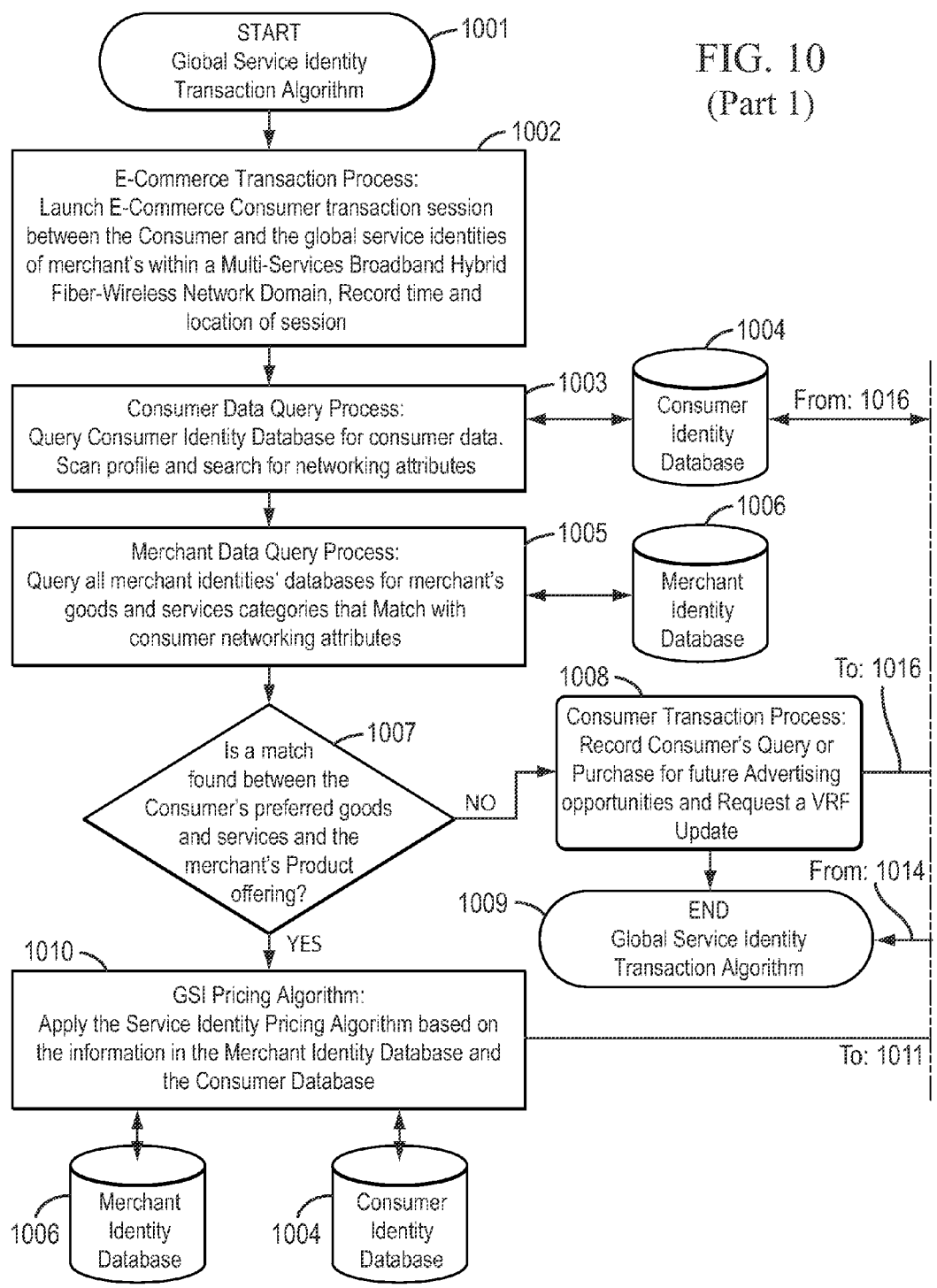
FIG. 10 (Part 1)

(Part 2)

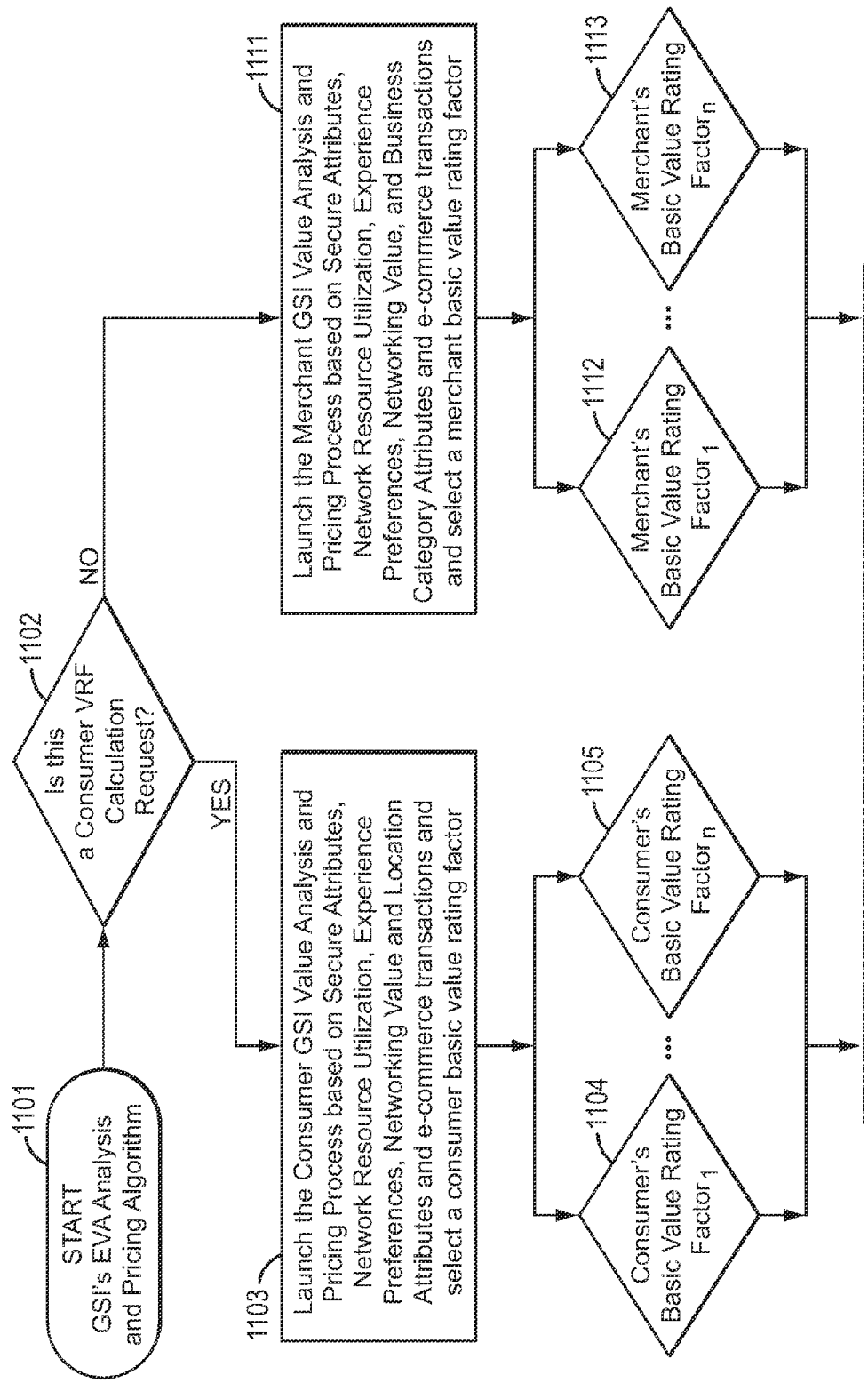
FIG. 11 (Part 1)

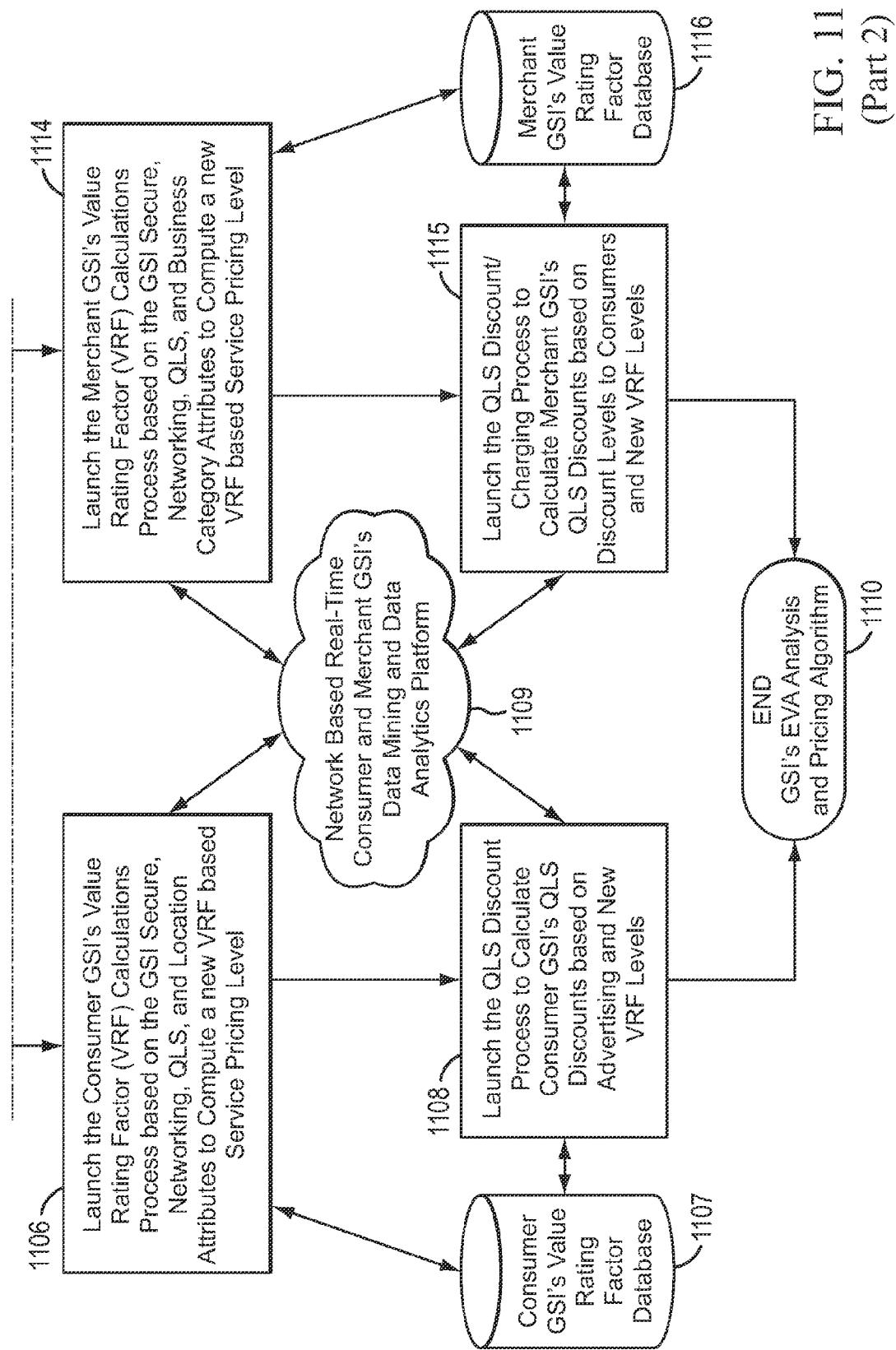
FIG. 11 (Part 2)

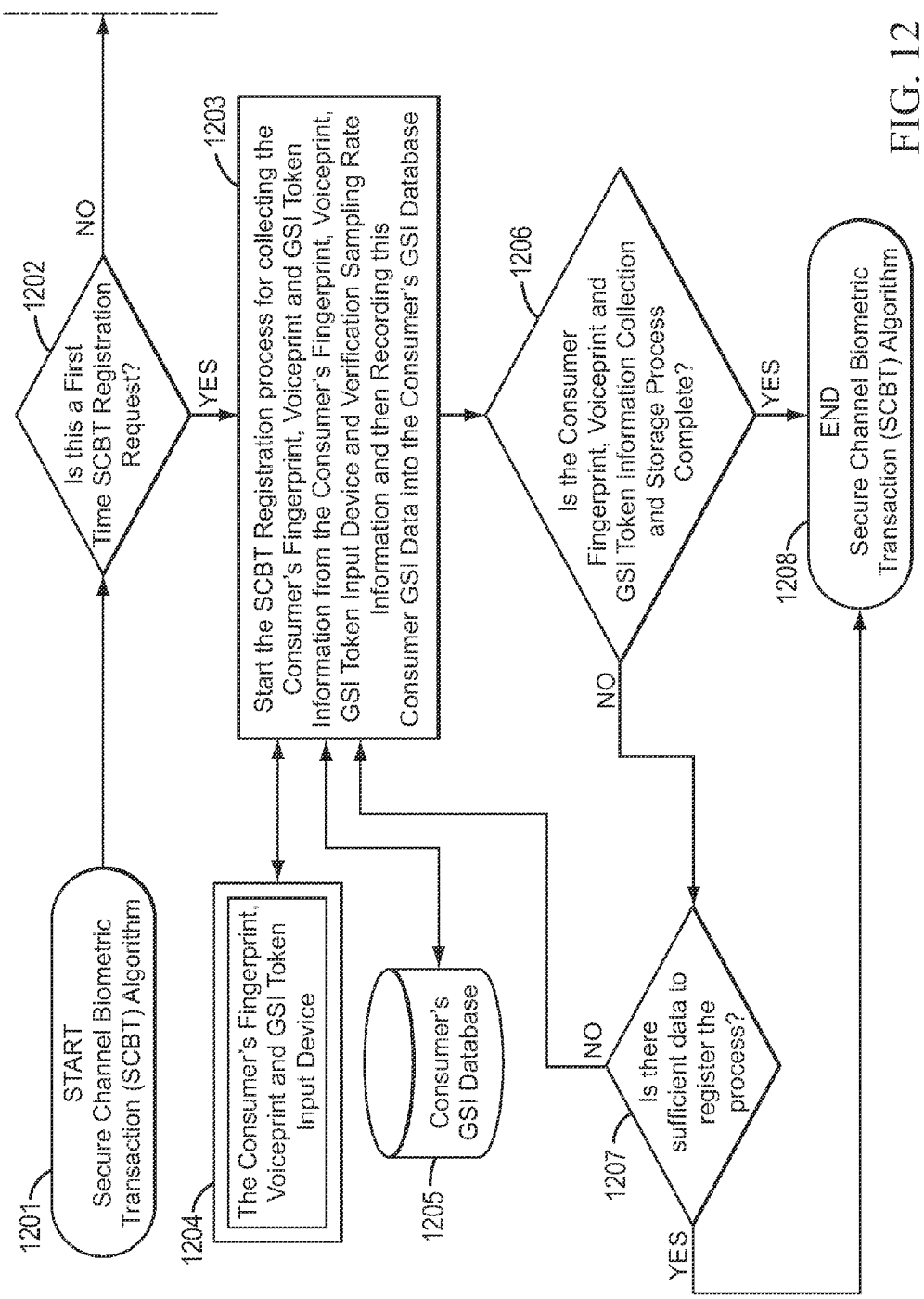
FIG. 12 (Part 1)

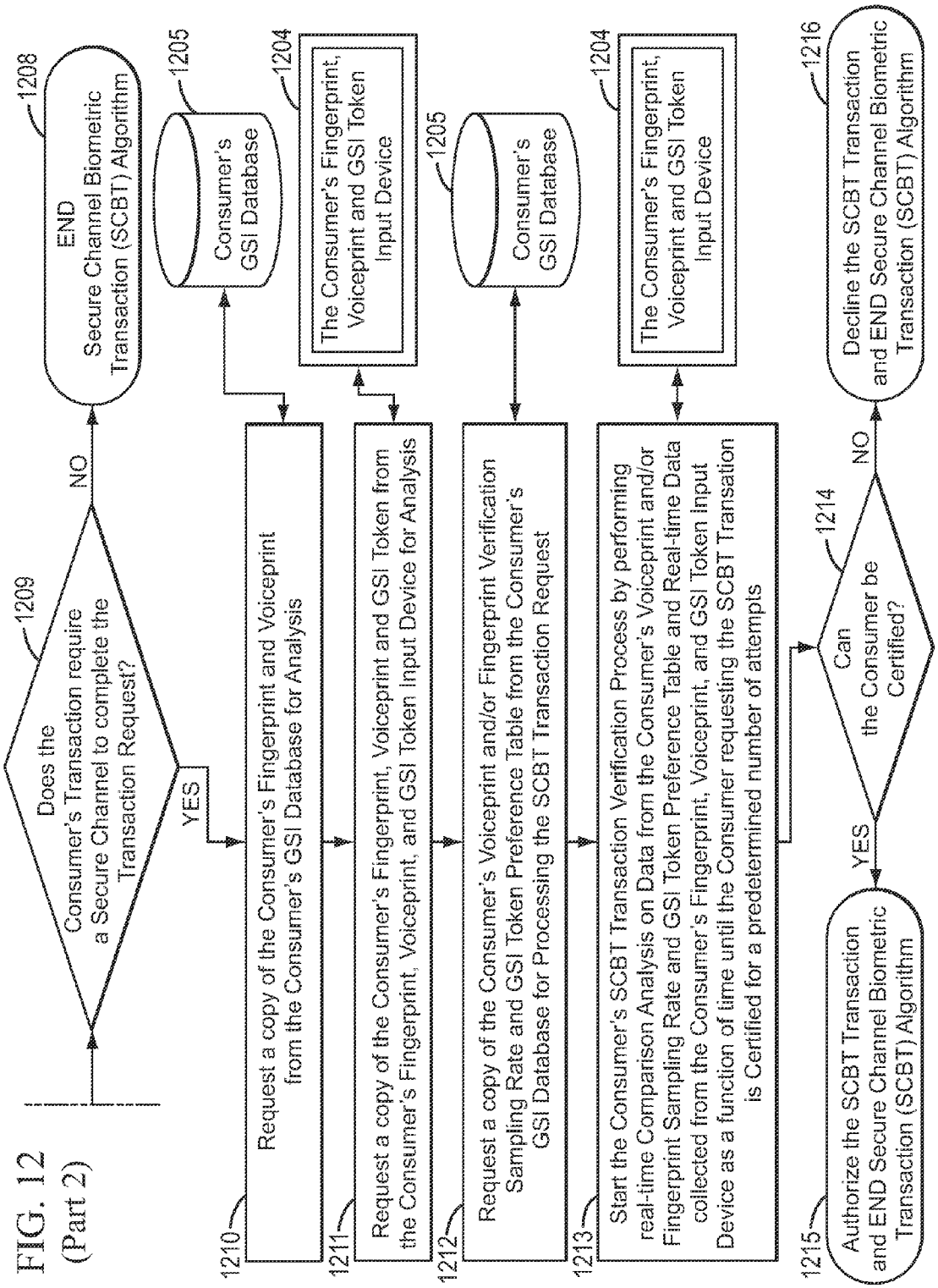
FIG. 12 (Part 2)

METHOD, COMPUTER PROGRAM, AND ALGORITHM FOR COMPUTING NETWORK SERVICE VALUE PRICING BASED ON COMMUNICATION SERVICE EXPERIENCES DELIVERED TO CONSUMERS AND MERCHANTS OVER A SMART MULTI-SERVICES (SMS) COMMUNICATION NETWORK

FIELD OF THE INVENTION

The present invention relates to devices and methods of a Smart Multi-Services (SMS) Communication Network, which is based on service-centric policy management techniques that enable each end user to configure his or her own virtual network operating environment within the SMS network. The end user establishes his or her virtual network to define and set the parameters for the services and resources that the SMS network will provide to the end user and the manner in which they are provided by the network to the end user. As a user-defined, -managed, and -controlled network, the SMS communications networks offers various features, for example, such as the capability to support any type of service session using broadband transactions, a Quality of Experience (QoE) service delivery approach, a service pricing model, a service provisioning paradigm, a Latency Quality Index (LQI) technique, a shared resources scheme, dynamic allocation of network resources, Mobile Cloud Computing, alias e-commerce transactions, and secured channel communications. The parameters of each of these features can be initially set or activated by the end user, dynamically monitored by the SMS communications network and made available to the end user, who can selectively modify one or more of these features in real-time.

BACKGROUND OF THE INVENTION

For decades, the communication and information network architecture model 100 for communication and information service delivery has been focused on a design approach that emphasized the utilization of the best transmission media for a particular network service type implementation such as voice, data, or broadcast video. The most noted of these is the Public Switch Telephone Network (PSTN) 112, as shown in FIG. 1, which primarily utilizes copper wires for the final segment of the network design, commonly referred to as the local loop. In the early stages of the local loop design, one of the primary goals was to optimize this final segment of the network design for the delivery of voice with the best Quality of Service (QoS) for the voice service connection. For many years, this PSTN network design concentrated mainly on voice services and features where the pricing algorithms were based on emphasizing the QoS for the delivery of voice services and the number of features that could be delivered to the customers as a part of the voice service offering.

This voice communication service delivery and pricing model continued for many years until customers began to demand data and information services. The initial attempt for the delivery of data and other informational based services was to share the same PSTN network to modulate data over the same copper wires. This configuration met an initial need of allowing the end user to receive voice and/or low speed data over the same pair of copper wires, but failed short in the area of QoS for data which was measured as a function of the speed of the data transmission. In contrast, the QoS for voice services, described above, was measured as a function of the clarity of the voice transmission and data was measured as the speed of transmission. This differentiation in voice and data QoS service delivery lead to different pricing algorithms and the bifurcation of voice networks and informational based data networks. Over time, this bifurcation of voice and informational based data networks lead to the development of a new type of data network, known as the Internet 117, as shown in FIG. 1. While the Internet 117 addressed the delivery of informational based data services networking, the issue of the QoS for speed of the data transmission still remained. Consequently, the data services pricing model for the Internet was established based on the Internet's speed of transmission access.

With the progression of technology and data network designs, voice and data networks have continued to evolve over time as independent networks as shown in FIG. 1. Recently, the emergence of the demand for clarity of video motion pictures has resulted in the development of yet another wired network design, commonly referred to as the broadcast cable network 107. The pricing algorithm for the broadcast cable network primarily focuses on the clarity of video transmission and the amount and type of video content delivered.

Over the years, many attempts have been made to bundle the services provided by the three different networks (PSTN 112, the Internet 117, and broadcast cable networks 107) from a pricing perspective, but challenges remain as to how to integrate these networks from a QoS perspective. This network integration issue from a QoS perspective becomes even more complex with the emergence of mobility networks, such as cellular and Wi-Fi based wireless network, where the QoS is defined as a function of the degree of mobility as well as the clarity of voice and video, including the speed of data transmission. Among the mobility networks, cellular 102, as shown in FIG. 1, has emerged as the most prevalent, where the pricing algorithm is a function of voice quality, voice feature, data speed, data feature, video quality, video feature, and the degree of mobility.

Another limitation, which developed due to the differences in the network designs, is that multiple network identifications must be established to identify the same end-user as a different user within each of these different network types from the perspective of the end user with respect to, for example, a PSTN dial number, a cellular phone dial number, a cable customer billing number, an Internet customer billing number, and the like. These different approaches to identifying the same customer has supported and sustained the different pricing models for the various types of services provided to the same customer by these different network types. This bifurcation of the QoS for the various network types of services and the multiple network identifications has resulted in certain restrictions from the perspective of the end user as well as how the end user views or uses these services in a converged network solution such as a common method of monitoring network resource utilization for voice services, video services, data services and/or mobility services or a common method of monitoring network resource utilization for the combination of these services for a particular user on the network, as well as a simple way to bundle these services from a pricing perspective.

By way of example, FIG. 1 illustrates an existing communication and information network architecture model and algorithms for service delivery and pricing. In general, FIG. 1 provides an example of the existing bifurcated QOS and service type identification schemes for a cellular network 102, a cable broadcast network 107, a PSTN 112, and the Internet 117. For example, to establish a voice or data communication connection between two cellular phone device users, a cellular phone 101 can be used to initiate a cellular call within a cellular network 102 to another cellular phone 104. However, initially to access cellular network 102, the user must subscribe to cellular network 102 where the user is assigned a distinct cellular phone number that is stored within a cellular network subscriber database 103 which uniquely identifies and distinguishes a particular user from all other users within cellular network 102.

If the user of cellular phone 101 wishes to call a PSTN phone 111 and 115 on the PSTN network 112 (also known as, Voice Services Network), the same assigned cellular phone number is used. To conduct the call, cellular network 102 must establish a connection to PSTN network 112 and request a look-up of the PSTN subscriber's phone number in the PSTN network subscriber database 114 to determine how to connect cellular phone 101 to PSTN phone 111 or 115. A look up request must be performed even if the cellular subscriber and the PSTN subscriber are the same subscriber, because the subscriber is identified in both the cellular network scriber database 103 and the PSTN network subscriber database 114 as two different subscribers.

In addition, the connection must also be routed through a common wireline access network 106 or 113 (also known as, a local cable, the Internet, or a PSTN service network). This common wireline access network 106 or 113 can be a single network in the case of common cable access for access to PSTN phone 111 or 115, television 105 or 110, or personal computer 116 or 118. In some instances, the connection is routed through multiple common wireline access networks. Regardless if routed through a single or multiple networks, this common wireline access network 106 or 113 adds increased complexity to the connections between the individual networks for completing calls or connections. On the other hand, the connection between two end devices for voice calling, Internet access, and access to broadcast television is managed by the primary networks such as the Cellular Network, 102, the Cable Broadcast Network, 107, the PSTN Network, 112, and the Internet 117, not the local common wireline access network 106 or 113.

In the above example of the cellular phone call to a PSTN phone, this process leads to two major differences from the consumer's perspective. The first difference is that the QoS requirement for the cellular network segment of a single call is different than the QoS for the PSTN network segment of the call. The second difference is that the pricing algorithms for this single call are different within both the cellular network and the PSTN network. Given that, at a minimum, two different networks are required to complete a single call or connection. The network interfacing and exchange of subscriber information required between the two networks to establish the single call or connection between the two phones increases the overall cost, even if the subscriber is the same subscriber for both phones and devices. Sometimes, more than two networks are required to complete the same call because of the common wireline access network, which further increases the overall cost of the call, because of the complexity of the interfaces and the interaction between these networks that are required to complete a call.

Another example is when a subscriber of cable broadcast network 107 wishes to view television content from television 105 or 110, the subscriber must be recognized within the cable broadcast network subscriber database 108. The subscriber must also be an authorized subscriber of the cable broadcast network video content 109 to receive and view cable content on television 105 or 110. However, if the same subscriber wishes to watch television on cellular phone 101 or 104 or watch television on personal computer 116 or 118, the network limitations between the cellular network 102, and/or the Internet 117 (also known as, Data or Informational Services Network without QoS) and the cable broadcast network 107 will not permit this connection to take place without special custom engineering by the customer on the cellular phone and placing special communication equipment at the customer's home that connects to the cable network and then also connects to the Internet at the customer's home by the customer, which still may not be supported by the cable broadcast network. Furthermore, the fact that the same subscriber is identified differently in the cellular network database 103, the cable broadcast database 108, and the Internet Database 119 also prevents these network connections from working seamlessly for the customer.

Each of these networks tracks the usage and access of the same subscriber in a different manner and, as a result, restricts access to certain new services that cross the boundary of these networks such as a cable service delivery over the Cellular Network or cable service delivery over the Internet Data Network from a QoS perspective. The access and QoS restriction of each network makes it impossible to establish and manage a common QoS for a single subscriber in a consistent manner. This approach to service access also limits the network service providers from charging for certain services based upon different QoS schemes, because the network service cannot control the QoS for services that cross network boundaries between cellular networks 103, cable broadcast network 107, PSTN networks 112, and the Internet 117.

It may be desirable to offer services in a converged network manner within a converged Smart Multi-Services (SMS) communication network that employs a single identification scheme to uniquely identify a collection of services such as voice, video, multimedia, data, and wireless that are assigned to a single user. It may also be desirable to employ a service identity concept such as Global Service Identities (GSIs), which can uniquely identify each user within a converged SMS communication network on a local or global basis and as such enable the end-user to benefit from utilizing all of their services in ways that best match the needs of each individual user.

Due to the complexity of the legacy network designs and their use of multiple networks with their equally complex pricing algorithms and competing QoS service delivery requirements, it may be desirable to reconsider these legacy network designs and employ a converged SMS communication network such as a hybrid fiber-wireless network to address the competing QoS requirements of these legacy networks with a standard approach to identify each user for all communication, services transaction types. It may also be desirable to provide a pricing paradigm that is based on the Quality of Experience (QoE) that a end user receives while on the network "QoE Service Level", which can be defined as a function of all the network resource that are utilized by the end user during a communication and/or information session that is delivered by a converged SMS communication network.

SUMMARY OF THE INVENTION

The present invention may satisfy one or more of the above-mentioned desirable features. Other features and/or aspects may become apparent from the description which follows.

A system and method for providing multi-services within a communication network according to various exemplary embodiments can include storing, in a database of a computer, user-defined sets of rules and instructions for providing multi-services to end user devices connected to a communication network including a Hybrid Fiber-Wireless (HFW) network having policy management capabilities. The system and method can receive, at one or more processors, the user-defined sets of rules and instructions from a plurality of end users via a plurality of end user devices. The system and method can configure a virtual network for each end user within the communication network using the policy management capabilities based on the user-defined sets of rules and instructions provided by each end user. The user-defined sets of rules and instructions define provisioning and delivery of resources and services provided by the communication network to the end user.

A system and method for providing services and resources using a Smart Multi-Services (SMS) communication network, according to various exemplary embodiments, can include receiving at, one or more processors, user-defined sets of rules and instructions from a plurality of end users via a plurality of end user devices, and storing user-defined sets of rules and instructions to cause at least one processor of the one or more processors to: configure a virtual network for each end user within the communication network using policy management capabilities based on the user-defined sets of rules and instructions provided by each end user. The user-defined sets of rules and instructions define provisioning and delivery of resources and services provided by the communication network to the end user. The system and method can conduct at least one communication session selected from a voice, a video, a data, or a multimedia transmission. The system and method can enable an end user of the plurality of end users to define the rules and instructions to establish at least one service level for delivering the services and resources to the end user. The service level for delivering the services and resources to the end user can be selected from a plurality of Quality of Experience (QoE) service levels. Each QoE service level corresponds to one or more dimensions that control a perception of at least one service that the end user experiences when receiving the service. The policy management capabilities enables the end user to test features and capabilities of the communication network associated with each QoE service level for selecting a fee to pay for the service based on the perception of the service to the end user. The system and method can also include calculating a Latency Quality Index (LQI) rating for measuring a performance level of the communication network to determine the QoE service level that the end user experiences when engaged in the communication session. The system and method can execute a service price reduction program such that an owner of the HFW network is capable of submitting an activation request to calculate an initial service pricing plan for the end user based on initial profile data captured by a data collection agent to determine an initial value of the end user and a base price for at least one service. The database stores the initial value of the end user and the base price for the service. As the end user requests additional services, the service price reduction program initially uses the initial value of the end user to iteratively recalculate a current value of the end user based on a number of transaction requests submitted by the end user to reduce the base price for the service. The system and method can further include providing shared resources and services of the communication network accessible by some of the end users having a common interest for sharing the resources and services so as to reduce cost of network services and resources paid by some of the end users. The system and method can execute a resource allocation program to dynamically allocate network resources delivered to the end user per at least one transaction requested by the end user and conducted during the communication session. The system and method can receive a transfer request from the end user to transfer data from a first processor located at a first location to a second processor located at a second location as the end user travels from the first location to the second location. The first processor authorizes the transfer request if the user-defined sets of rules and instructions of the end user permit the transfer of the data. The first processor can transfer the data of the end user to the second processor if the first processor authorizes the transfer request. The system and method can execute an e-commerce alias program to enable the end user to create a service identity to conduct an e-commerce transaction during the communication session over the communication network without revealing a true identity of the end user during negotiations of terms of the e-commerce transaction. The system and method can reveal the true identity of the end user when the end user agrees to the terms of the e-commerce transaction. The service identity can include at least one attribute known to the at least one end user and at least one attribute unknown to the at least one end user. The system and method can enable the end user to dynamically submit a secure channel request to establish a secure channel to conduct the session between at least two end points within the communication network. In response to the secure channel request, the system and method can transmit a terms of service agreement to recipients of each end points to obtain consent from each recipient to terms and conditions defined within the terms of service agreements to establish the secure channel. The system and method can issue instructions to the communication network to open the secured channel between an end point of the end user and each end point of the recipients that agree to terms of service for establishing the secured channel. After the completion of the secured transaction, the communication network can delete and erase all data and information associated with the session conducted over the secured channel from the communication network and all the end points of the recipients and the end user.

A system and method for pricing network services based on a service experience delivered to a consumer via a device, according to various exemplary embodiments, can include storing, in a database of a computer, data for prices for services delivered to a consumer and information identifying the consumer. The system and method can receive at the computer, via a network capable of conducting simultaneous communication sessions and a device, input selection information indicative of at least one type of service and at least one level of a quality of experience of a service to be delivered to the consumer via the device. The system and method can also access a quality of experience model configured based on at least one dimension that controls a perception of a sensation that the consumer experiences when the service is delivered to the consumer via the device. The system and method can further compute a price associated with the level of the quality of experience of the service selected by the consumer by applying the quality of experience model using the type of service and the level of the quality of experience of the service. The system and method can transmit the price over the network to the device for display to the consumer. If the consumer enters a response agreeing to the price, the system and method can transmit the type of service based on the level of the quality of experience to the consumer.

A system and method for designating shared resources and services zones in a smart multi-service communications network, according to various embodiments, can include providing a virtual security zone for local shared services network to designate Virtual Computer Networking Demilitarized Zones (DMZs) for a plurality of local unrelated entities within a local area network with local connectivity access; provide local connectivity access to the virtual computer networking DMZs for accessing local shared services and resources provided on a local shared services hardware platform employing security zone virtualization software, wherein each of the plurality of unrelated entities are unrelated entities that gain access to share common resources and services to perform tasks on independent and unrelated projects; and to segment software resources to store data of each entity to provide each entity with separate, private and secure access to the data stored by the entity. The system and method can provide, within the virtual security zone local shared services network, a local area network manager to permit access to the virtual computer networking DMZs to access the local shared services and resources of the virtual security zone local shared services network to the plurality of local unrelated entities located within a predefined local wireless or wired geographic communication access area. The system and method can also provide, within the virtual security zone local shared services network, a local virtual computer networking DMZ machine configured as a software-implementation of a computer having a local hardware computing platform capable of providing at least one DMZ within a common local hardware computing environment for allowing the plurality of local unrelated entities to share local applications and databases within the at least one virtual computer networking DMZ. The system and method can further provide the local virtual computer networking DMZ machine installed on a local host hardware platform including local system hardware and software applications. The system and method can share the local system hardware as a common local hardware and software resources virtually partitioned into the virtual computer networking DMZs partitioned according to each local entity of the plurality of local unrelated entities to provide secure isolation of entity proprietary information and secure entity access to the local software applications partitioned for each local entity. The system and method can provide, within the virtual security zone local shared services network, a local resource database for grouping and storing the security zone local shared services and resources provided on the local area network via the virtual computer networking DMZs based on a plurality of local interests defined as being common among the plurality of local unrelated entities. The system and method can also provide a virtual security zone for higher level shared services network connected to the virtual security zone local shared services network and provide a plurality of higher level unrelated entities access to higher level shared services and resources provided on a higher level shared services hardware and software platform employing the security zone virtualization software. The higher level shared services network can include any level defined within the communication network at a level higher than the local level shared services network. The plurality of higher level unrelated entities can include a plurality of higher level users registered at least one higher level shared services network and the plurality of local unrelated entities seeking access to higher level shared services and resources that are unavailable to the plurality of local unrelated entities on the virtual security zone local shared services network. The system and method can provide, within the virtual security zone higher level shared services network, a higher level area network manager to permit virtual security zone access to the higher level services and resources of the security zone higher level virtual shared services network to the plurality of higher level unrelated entities. The system and method can also provide, within the virtual security zone higher level shared services network, a secure higher level virtual machine configured as software-implementation of a computer having a higher level hardware computing platform capable of providing a common higher level hardware computing environment for allowing the plurality of higher level unrelated entities to virtually share higher level common applications and databases. The system and method can further provide the higher level virtual secure machine installed on a higher level host hardware platform including higher level system hardware and software applications. The system and method can share the higher level system hardware as a common higher level software resource and the higher level software applications partitioned according to each higher level entity's virtual computer networking DMZ of the plurality of higher level unrelated entities to provide secure isolation of entity proprietary information and secure entity access to the higher level software applications partitioned for each higher level entity. The system and method can provide, within the virtual security zone higher level shared services network, a higher level resource database for grouping and storing the higher level shared services and resources provided on the security zone higher level area network based on a plurality of higher level interests defined as being common among the plurality of higher level unrelated entities.

A system and method for designating virtual individual security zones within a communications network, according to various exemplary embodiments, can include storing, in a database of a computer, data for designating virtual individual security zones (DMZs). The system and method can designate the DMZs for a plurality of unrelated entities with network connectivity located within a predefined wireless or wired geographic communication access area. The plurality of unrelated entities can be assigned such that all of the entities are unrelated entities that gain access to share common resources and services to perform tasks on independent and unrelated projects. The system and method can segment software resources to store data of each entity to provide each entity with separate, private and secure access to the data stored by the entity. The system and method can provide access to the DMZs to access shared services and resources provided on a shared services hardware platform and employ security zone virtualization software. The system and method can permit access to the shared services and resources of a first virtual shared services network to the plurality of unrelated entities located within the predefined wireless or wired geographic communication access area. The system and method can provide a hardware computing platform capable of providing at least one virtual DMZ within a common hardware computing environment for allowing the plurality of unrelated entities located within the predefined wireless or wired geographic communication access area to share applications and databases within the at least one virtual computer networking DMZ. The system and method can also provide a host hardware platform including hardware and software applications capable of being shared as a common hardware software resources virtually partitioned into the virtual computer networking DMZs according to each entity located within the predefined wireless or wired geographic communication access area to provide secure isolation of entity proprietary information and to provide entity secure access to the software applications partitioned for each entity. The system and method can group and store, in the database, the security zone shared services and resources provided on the network via the virtual computer networking DMZs based on a plurality of interests defined as being common among the plurality of unrelated entities located within the predefined wireless or wired geographic communication access area.

A system and method for provisioning and pricing services provided to a user via a device connected to a smart multi-services communication network based on an economic value of the user to the network, according to various exemplary embodiments, can include assigning in a service identity database a service identity to identify a user to permit access to a smart multi-services communication network for requesting and receiving at least one type of service over a common access connection. The system and method can receive from a device operated by the user a service request to receive services at a service application manager within the smart multi-services network. The system and method can provision features of the services requested by the user being controlled by the service identity, comprising: determining a QSL level of service requested by the user; storing, in an attribute database, parameters of the smart multi-services network for activation of the QSL level of service requested by the user; and collecting data regarding network usage patterns of the user and a number of merchant transactions conducted by the user as a function of time and location. The system and method can calculate, based on the data regarding the network usage patterns of the user and the number of merchant transactions conducted by the user, an Economic Value Attribute (EVA) of the user to define a commercial economic value of the user to the network and merchants registered on the network. The system and method can price the QSL level of service requested by the user employing a pricing algorithm to ensure that the network automatically offers to the user a lowest available price for a standard service transaction based on the QSL level of service. The system and method can collect QSL Service Network parameters from a Customer Database. The system and method can compute a Standard Pricing Factor based on a number of network merchant transactions conducted by the user as determined based on Network Resources Utilization Parameters for the selected QSL Level of service. The system and method can also compute a Customer Discount Pricing Factor based on the EVA of the user and offer a discount level for the number and value of network merchant transactions conducted by the user over a predetermined time period. The system and method can determine whether additional Customized Service Charges are applicable based on whether the user requested additional customization of the standard services. If the additional Customized Service Charges are applicable, the system and method can collect the QSL Service Network parameters from the Customer Database to compute a Customized Service Usage charge and compute the service transaction charge for the requested QSL Level of services based on the Customized Service Usage, the Standard Pricing Factor, and the Customer Discount Pricing Factor. If no additional Customized Service Charges are applicable, system and method can select a Custom Engineered Monthly Service Charge and compute the service transaction charge for the requested QSL Level of services based on the Custom Engineered Monthly Service Charge, the Standard Pricing Factor, and the Customer Discount Pricing Factor.

A method for seamlessly transitioning active services sessions across networks, according to various exemplary embodiments, can include establishing a communication session with a device to conduct a service session with a first type of network. The method can deliver services to the device connected to the first type of network during the service session. The services delivered to the device can be configured based on a Service Latency Quality Index (LQI) rating, which defines the Experience (QoE) a user operating the device will experience when receiving the services via the device. The method can receive a service transition request from the device connected to the first type of network to receive the services at a second type of network as the device travels from the first type of network to the second type of network. The first type of network and the second type of network can be configured having different performance capabilities. The method can perform service interoperability between the first type of network and the second type of network by dynamically modifying the QoE via the LQI rating of the user to maintain the experience of the user as the device transitions from the first type of network to the second type of network having different performance capabilities. The method can determine a QoE Service Level (QSL) for the services being delivered to the device via the first type of network. The method can acquire a first set of parameters configured on the first type of network to deliver the QSL of the services to the device via the second type of network. The method can determine whether the second type of network is configured having the Service LQI Rating used to deliver the QSL of the services to the device via the first type of network so that the services can be seamlessly transitioned to the second type of network. If the second type of network is configured having the Service LQI Rating of the first type of network, the method can set a second set of parameters of the Service LQI Rating on the second type of network based on the first set of parameters and transfer the service session from the first type of network to the second type of network. If the second type of network is not configured having the Service LQI Rating of the first type of network, the method can adjust the first set of parameters of the Service LQI Rating of the first type of network to match an existing Service LQI Rating already provided by the second type of network and transfer the service session from the first type of network to the second type of network.

A system and method for dynamically managing a transaction over a network between at least two service identities, according to various exemplary embodiments, can include employing a computer system having at least one database that applies a pricing model algorithm that computes prices of content and media services based on a quality of experience delivered to at least one of the two service identities. The system and method can assign service identities to objects having identifiable attributes. The system and method can establish a connection between devices connected to a network for conducting transactions regarding at least one of the objects, wherein each service identity is assigned a unique identification. The system and method can implement a services pricing analysis by applying the pricing model algorithm for a consumer service identity of the service identities. The consumer service identity can include an object that initiates a transaction request over the network. The system and method can compute, based on the pricing analysis, a service identity rating factor for the consumer service identity. The system and method can create a consumer service identity database of consumer service identity information related to consumer rights and privileges allocated to consumer service identities to receive from the network. The consumer rights and privileges allocated to each consumer service identity can be based on consumer service attributes assigned to each of the consumer service identities. The consumer service attributes can include user identity security selection attributes, user identity unsecured networking attributes, user identity experience attributes, and user identity service location information. The user identity security selection attributes can be assigned to uniquely identify each consumer service identity within the consumer service identity database, wherein the user identity security selection attributes can be controlled by the network as private and confidential information. The user identity unsecured networking attributes can be assigned and controlled by the consumer service identity as a customer alias identification and disclosed as public information for initiating and conducting transactions anonymously over the network without disclosing the consumer service identity. The user identity experience attributes can be selected and purchased by the consumer service identity to define a quality of service experience interaction to be dedicated and delivered to the consumer service identity during a communication session over the network. The user identity experience attributes can include user Latency Quality Index (LQI) selection preferences and user identity service form selection preferences selected from at least one of voice, video, multimedia, and data services transmissions. The user identity service location can be assigned by the consumer service identity to define a relative location of the consumer service identity as a fixed identity or a mobile identity for conducting transactions over the network. The relative location of the mobile consumer service identity can be constantly monitored and dynamically updated to allow the consumer to conduct transactions over the network. The system and method can calculate a discount rating factor for the consumer service identity to determine a cost reduction of content and media services purchased by the consumer service identity to be delivered over the network. The discount rating factor can be based on the user identity security selection attributes, the user identity unsecured networking attributes, the user identity experience attributes, and the user identity service location, and a consumer e-commerce value attribute calculated to define a commercial economic value for the at least one consumer service identity. The system and method can conduct a merchant category analysis for at least one merchant service identity of the service identities. The merchant service identity can include at least one object that provides a response to the transaction initiated by the consumer service identity over the network. The system and method can create a merchant service identity database of merchant service identity information related to merchant rights and privileges allocated to merchant service identities to receive services from the network. The merchant rights and privileges allocated to each merchant can be based on merchant service attributes assigned to each of the merchant service identities. The merchant service attribute can include merchant identity selection attributes, merchant identity unsecured networking attributes, goods and services attributes, merchant identity experience attributes, demographic profile attributes, merchant service location attributes, and merchant discount schedule data. The merchant identity security selection attributes can be assigned to uniquely identify each merchant service identity within the merchant service identity database. The merchant identity security selection attributes can be controlled by the network as private and confidential information. The merchant identity security selection attributes are assigned to calculate a risk rating for each merchant service identity by performing a risk assessment that calculates risk for a consumer service identity to engage in a commercial relationship to conduct the transaction request with the at least one merchant service identity over the network; determine, based on the calculated risk rating and the risk assessment, whether to submit to the at least one merchant service identity the transaction request initiated by the at least one consumer service identity; and approve and submit the transaction request to the merchant service identity when the risk rating exceeds a predefined risk threshold. The merchant identity unsecured networking attributes are assigned and controlled by the merchant service identity as a merchant identification and disclosed as public information for conducting transactions over the network. The goods and services attributes can be defined as categories to match goods and services according to the transaction request initiated by the consumer service identity with the goods and services provided by the merchant service identity. The merchant identity experience attributes can be selected and purchased by the merchant service identity to define the quality of service experience interaction to be dedicated and delivered during the communication session to conduct the transaction request over the network between the merchant service identity and the customer service identity. When the merchant identity experience attributes differ from the consumer identity experience attributes, the merchant identity experience attributes dictate the quality of service experienced by the merchant service identity and the consumer service identity during the communication session. The merchant user identity experience attributes can include merchant LQI selection preference and user identity service form selection preferences selected from voice, video, multimedia, or data services transmissions. The demographic profile attributes can be assigned by the merchant service identity to define demographic profiles of a target group of the consumer service identity and to direct the goods and services of the merchant service identity towards the target group to facilitate transactions with the consumer service identity. The merchant service location attributes can be assigned to dynamically plot a geographical map of the location of the consumer service identity relative to a location of the merchant service identity and to transmit merchant advertisement information to the consumer service identity when the consumer service identity enters within a predefined boundary area of the geographical map where the merchant service identity is located. The merchant discount schedule data can be assigned by the merchant service identity to identify advertisements of discounted products offered by the merchant service identity. The advertisements can be updated and stored periodically within the merchant discount schedule database by the merchant service identity as incentives to increase transactions with the at least one consumer service identity. The system and method can perform pricing analysis and comparisons for the consumer service identity with a product and service of the merchant category analysis of the merchant service identities to match the product and/or service transaction requested by the consumer service identity based on the goods and services provided by the merchant service identities to facilitate completion of the transaction requested. The system and method can calculate, iteratively, the discount rating factor for the consumer service identity based upon a number of transaction requests completed between the consumer service identity and the merchant service identities.

A system for rewarding consumers and merchants for conducting transactions over a network, according to various exemplary embodiments, the system can include at least one processor, and a plurality of databases connected to the at least one processor for storing data and instructions to cause the at least one processor to execute a shared-value consumer-merchant e-commerce networking program that rewards both consumers and merchants for conducting at least one direct e-commerce transaction between consumers and merchants. The shared-value consumer-merchant e-commerce networking program can be executed using a Secure Channel Biometric Transaction (SCBT) Algorithm for providing secure communication channels for conducting the at least one e-commerce transaction between the consumers and the merchants. The processor receives consumer data from the consumer, receives merchant data from the merchant, and assigns a consumer global service identity (GSI) to the consumer based on the consumer data and assigns a merchant GSI to the merchant based on the merchant data. The plurality of databases can include at least one consumer database and at least one merchant database. The consumer databases, under the control of the consumer, can be configured to store consumer GSI data based on the consumer GSI assigned to the consumer. The consumer GSI data can include a plurality of attributes that uniquely identify the consumer within the network for conducting e-commerce networking transactions, social networking and advertising between the consumer and the merchant. The plurality of attributes can include at least one consumer security identity attribute (SIA) that defines how the consumer controls the consumer GSI on the network; at least one consumer networking identity attribute (NIA) that defines how the at least one consumer controls networking with other consumer GSIs and merchant GSIs registered on the network; at least one consumer communication services attribute (CSI) that defines how communications and transactions are conducted with the consumer over the network, as defined by the at least one consumer; and at least one consumer e-commerce value attribute (EVA) that defines how the network calculates a value of the consumer to the network and to the merchant. The merchant database, under the control of the at least one merchant, can be configured to store merchant GSI data based on the merchant GSI assigned to the merchant. The merchant GSI data can include a plurality of attributes, which can include at least one merchant SIA that defines how the at least one merchant controls the merchant GSI on the network; at least one merchant NIA which defines how the at least one merchant controls networking with consumer GSIs and other merchant GSIs registered on the network; at least one merchant CSI that defines how communications and transactions are conducted with the merchant over the network, as defined by the merchant; and at least one merchant EVA that defines how the network calculates a value of the merchant to the network owner and to other merchants.

A system for providing a competitive analysis of products and services offered by merchants registered on a network, according to various exemplary embodiments, can include a Hybrid Fiber-Wireless (HFW) network configured based on a shared-value consumer-merchant service cost sharing scheme that conducts commercial transactions using at least one consumer global service identity (GSI) to automatically perform a competitive analysis of products and services offered by at least one merchant on the network and to conduct private commercial transactions without revealing the at least one consumer GSI to the at least one merchant until a consumer agrees to the commercial transaction. The system can include at least one processor connected to the HFW network; and a plurality of databases connected to the at least one HFW network for storing data and instructions to cause the at least one processor to establish a peering relationship to connect at least one consumer and the merchant on the HFW network to provide the consumer with real-time access to all pricing, product and services features, and product and services available data regarding similar products and services offered simultaneously from all merchants that are registered on the HFW network and agree to competitively sell at a present time the product or the service to the at least one consumer. The processor can receive consumer data from the at least one consumer; assign a consumer GSI to the consumer based on the consumer data; and receive, from the consumer, a request for a same or better commercial price for at least one product or service offered by different merchants registered on the network. The processor can also perform, based on the consumer request, the competitive analysis for the same or better commercial price based on current data available from all of the merchants that agree to compete simultaneously to sell the at least one product or the service to the consumer GSI, and perform the competitive analysis by retrieving and analyzing data stored within the plurality of databases. The plurality of databases can include at least one consumer value proposition database, at least one consumer database, at least one merchant value proposition database, at least one merchant benefit database, and at least one consumer benefit database. The consumer value proposition database can be configured to dynamically retrieve and store, for the at least one consumer, best current available prices for at least one product or service offered by merchants registered on the network. The consumer database, under the control of the consumer, can be configured to store consumer GSI data based on the consumer GSI assigned to the at least one consumer. The consumer GSI data can include a plurality of attributes that uniquely identify the consumer within the network for conducting e-commerce networking transaction, social networking and advertising between the consumer and the merchant. The plurality of attributes can include at least one consumer security identity attribute (SIA), at least one consumer networking identity attribute (NIA), at least one consumer communication services attribute (CSI), and at least one consumer e-commerce value attribute (EVA). The consumer security identity attribute (SIA) can be assigned to include consumer secured data. The processor can be configured to enable the consumer to provide instructions to segment the consumer secured data into a consumer relational database. The consumer secured data uniquely identifies the at least one consumer and can be segmented into confidential and private data known only to the network and the consumer. The processor can restrict access and use of the consumer secured data such that the consumer secured data is used only to finalize and authorize the e-commerce transaction between the consumer and the merchant under the control of the consumer and the network through the use of a Secured Channel Biometric Transaction (SCBT) Algorithm. The consumer networking identity attribute (NIA) can be assigned to include consumer transactional data and demographic data regarding the at least one consumer. The processor can be configured to dynamically track the at least one consumer NIA based on a physical location of the consumer, and store and update the consumer NIA in the consumer database based on the physical location of the consumer. The processor can track the physical location of the consumer relative to a physical location of the merchant to enable the merchant to provide instructions to instantaneously generate and offer special products or services or special discounts on products or services to the consumer based on the physical location and demographic profile of the consumer. The consumer communication services attribute (CSI) can be assigned to identify a type of at least one communication device registered for use on the network by the consumer and to identify features and services equipped and programmed on the communication device to support different forms of communication services. The consumer e-commerce value attribute (EVA) can be calculated by the at least one processor to define a commercial economic value for the at least one consumer. The processor can continuously recalculate the at least one consumer EVA based on a number of e-commerce transactions conducted on the network by the at least one consumer within a predetermined period of time. The processor can monitor and continuously update the consumer EVA to enable the merchant or a network service provider to offer product and services discount to the consumer based on the consumer EVA. The processor can be configured to enable the merchant to access valuable consumer data stored in the consumer database as an incentive for the merchant to offer the best current price available for the at least one product or service to the consumer. The valuable consumer data can include demographic profiling data including the consumer NIA, the consumer CSI, and the consumer EVA. The processor can be configured to determine a statistical probability of the merchant completing a successful sale with the consumer and to display the statistical probability to the merchant's device before the merchant offers the best current price for the product or service to the consumer. The merchant value proposition database can be configured to store data that enables the merchant to dynamically instruct the processor to calculate lower costs associated with marketing and selling at least one product or service to increase the statistical probability of successfully completing the sale with the consumer by using the consumer demographic data profiling information. The processor can be configured to identify high-valued consumers and enable the merchant access to the demographic profiling data regarding the high-valued consumers for electronic marketing and advertising purposes and to instruct the processor to transmit direct marketing and targeted advertising regarding at least one product or service to the high-valued customers. The merchant benefit database can be configured to store data to enable the processor to calculate a cost savings for marketing and advertising by comparing cost traditionally paid by the merchant to advertise using traditional unsolicited request advertising techniques and cost paid by the merchant to advertise using direct real-time access to the demographic profiling data with solicited request advertising techniques. The consumer benefit database can be configured to store data to enable the processor to execute a cost-sharing program that enables a network service provider and the merchant to distribute a portion of the cost savings to one or more consumers to encourage consumers to conduct frequent e-commerce transactions with the merchant or the network.

A system and method for advertising goods and services to consumers via a device connected to a communication network, according to various embodiments, can include receiving at, at least one processor, data for advertising goods and services to at least one consumer via a device connected to a communication network. The system and method can store, in a database, data for advertising goods and services to the consumer via the device connected to the communication network, and store instructions to cause the processor to receive, via the communication network, registration information and demographic profile information to receive at least one product or service via the communication network capable of conducting simultaneous communication sessions selected from a voice, a video, a data, or multimedia transmission. The system and method can submit an authorization request to the consumer to obtain authorization to track and monitor, as a function of time, physical location and demographic profile information, at least one device registered for use on the network by the consumer. The system and method can provide to the consumer a selection option to grant the authorization during the submission of the registration information or to dynamically grant the authorization when the consumer initiates each communication session over the network. The system and method can also provide the consumer a tracking option to select a continuously tracking and monitoring feature or a selective tracking and monitoring feature. The continuously tracking and monitoring feature authorizes the network to continuously monitor and track the physical location of the device. The selective tracking and monitoring feature also enables the consumer to select when the network monitors and tracks the device based on an occurrence of a triggering event. If permission is granted by the consumer, the system and method can track and monitor as a function of time and the physical location of the device within the network. The system and method can detect when the device enters a predefined geographical area.

A system and method for transferring data to an end user via a device connected to a communication network, according to various exemplary embodiments, can include receiving at, a processor, data to facilitate transfer of the data to an end user to a device connected to a communication network. The system and method can store, in a database, data to facilitate the transfer of the data to the end user via the device connected to the communication network, and store instructions to cause the at least one processor to receive, via the communication network, registration information to identify the end user on the communication network. The system and method can assign in at least one database, based on the registration information of the end user, a home location network associated with the end user, a service identity to identify the end user to permit access to the network for requesting and receiving services, and at least one end user permanent device registered and authorized by the end user to transmit requests and to receive services on behalf of the end user. The system and method can receive an access request submitted by the end user from at least one visiting network. In response to the access request from the at least one visiting network, the system and method can add each visiting network as an ad hoc addition of a server node on a local, regional, national, or global level within the communication network and identify the end user as a visitor within each visiting network. In response to the access request from the at least one visiting network, the system and method can execute a mobile cloud computing data networking protocol to implement a data handover to grant access to the data on the home network and deliver the data and other products and services to the end user via the visiting network at a quality of experience service level selected by the end user during the registration process. The system and method can automatically locate the data on servers on the home network of the end user and automatically transfer a copy of the data from at least one server on the home network to at least one server on the at least one visiting network. The system and method can automatically maintain, synchronize, and age the data of the end user until the end user returns and accesses the home network.

A system and method for providing a secure transmission of data, under the control of an end user, when the end user initiates a transaction or communication session over a communication network, according to various exemplary embodiments, can include receiving at, a processor, data for providing a secure transmission for transmitted data when an end user initiates at least one of a transaction or a communication session with a device connected to a communication network. The system and method can store, in a database, the data for providing the secure transmission for the transmitted data when the end user initiates a transaction or a communication session with the device connected to the communication network, and store instructions to cause the at least one processor to receive, via the communication network, registration information including biometric data and at least one sampling rate for each biometric data provided by the end user to initiate a registration or authorization process. The system and method can store the registration information and the biometric data in at least one consumer database. The system and method can assign in a service identity database a service identity to identify the end user to permit access to the communication network for requesting and receiving at least one type of service over a common access connection. The service identity can include at least one known attribute, which is known to the end user, and at least one unknown attribute, which is unknown to the end user. The system and method can generate the at least one unknown attribute by encrypting the biometric data provided by the end user such that the encoded information is known only to the communication network. The system and method can combine the at least one known attribute with the at least one unknown attribute to create a unique service identity security token for the end user. The system and method can receive a request to conduct the transaction or communication session. The system and method can automatically monitor all requests transmitted from the end user to determine whether to conduct the transaction or communication session using a secure channel. If a determination is made that the communication session requires transmission over the secured channel between at least two end points within the communication network, the system and method can establish the secure channel to conduct the communication session. The system and method can verify authenticity of the end user by requesting a copy of the biometric data of the end user. The system and method can receive the copy of the requested biometric data of the end user. The system and method can perform a comparative analysis of the copy of the requested biometric data with the biometric data provided by the end user during the registration process. The system and method can transmit a terms of service agreement to recipients of each end points to obtain consent from each recipient to terms and conditions defined within the terms of service agreements to establish the secure channel. Upon verifying the authenticity of the end user and obtaining the consent from at least one recipient, the system and method can compute a sampling code for each biometric data by combining each sampling rate with a random number generator. The sampling rate for each biometric data can be provided by the end user to set a frequency to modify the unique service identity token to control a level of security afforded by the network for the transaction or communication session requested by the end user. The system and method can encode the transaction or the communication session with the unique service identity security token using a Secured Channel Biometric Transaction (SCBT) Algorithm. The system and method can modify the unique service identity security token based on the sampling code for each biometric data. The system and method can issue at least one instruction to open the secured channel between an end point of the end user and each end point of the recipients that agree to terms of service for establishing the secured channel. The system and method can transmit the data of the communication session over the secure channel. After the completion of the secured communication session, the system and method can delete and erase all data and information associated with the communication session conducted over the secured channel from the communication network and all the end points of the recipients, the end user devices or both.

A system and method for accessing resources and services provided by a network, according to various exemplary embodiments, can include providing a communication system comprising a plurality of networks and determining a physical location of a device connected to a first network of the plurality of networks. The system and method can request access to services provided on a second network of the plurality of networks when the device crosses a boundary area and enters as a visitor into the second network. The boundary area represents an intersection in physical boundaries of the first network and the second network, wherein the second network is in use by the device at a time of crossing of the boundary area. In response to the access to services request, the system and method can grant access to the services provided by the second network. The system and method can broadcast at least one signaling message by the second network to all networks of the plurality of networks to locate a home network of the device. In response to the broadcast of the at least one signaling message, the system and method can receive an acknowledgment message from the home network indicating that the device is registered within the home network. In response to the acknowledgment message, the system and method can establish a peer-to-peer connection between the home network and the second network to enable the device to access shared resources and services provided by the home network while the device travels within the boundary area of the second network.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 5 is an exemplary flow chart illustrating the major process and operations of the SAM for implementing a pricing algorithm for computing pricing for utilizing network resources and services;

FIG. 11 is an exemplary flow chart illustrating the features and operations of an Automatic E-Commerce Value Attribute (EVA) Analysis and Pricing Algorithm used by the SMS network to calculate an economic value of each consumer and merchant GSI;

FIG. 12 is an exemplary flow chart illustrating the features and operation of a consumer e-commerce Secure Channel Biometric Transaction (SCBT) Algorithm used by the SMS network to establish a secure Channel to conduct a secure communication between end points of the network and to decouple a consumer from a particular device assigned to the user on the network to permit network services and resources to be delivered to any device;

DESCRIPTION OF THE EMBODIMENTS

Figure 1:
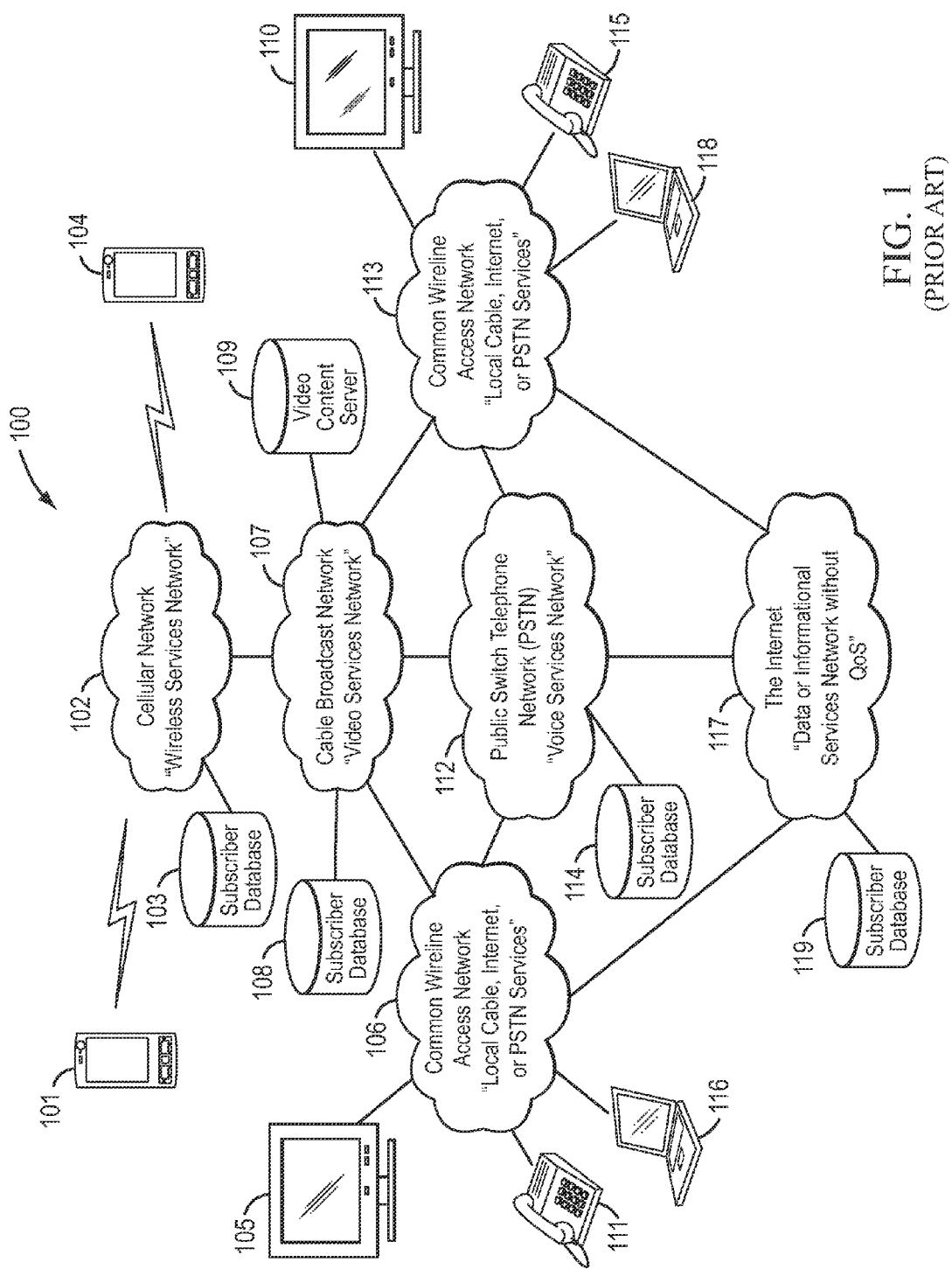
FIG. 1 (prior art) illustrates a known communication and information network architecture model for service delivery and pricing.

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a", "an", and "at least one" are used interchangeably in this application.

The SMS communication network of the present teachings are based on service-centric policy management techniques that enable each end user to configure his or her own virtual network operating environment within the SMS network. The end user establishes his or her virtual network to define and set the parameters for the services and resources that the SMS network will provide to the user and the manner in which they are provided by the network to the user. Various embodiments of the SMS network enable each end user to define and control various features, for example, such as the capability to support any type of service session using broadband transactions, a Quality of Experience (QoE) service delivery approach, a service pricing model, a service provisioning paradigm, a Latency Quality Index (LQI) technique, a shared resources scheme, dynamic allocation of network resources, Mobile Cloud Computing, alias e-commerce transactions, and secured channel communications. The parameters of each of these features can be initially set or activated by the user, dynamically monitored by the SMS communications network and made available to the end user, who can selectively modify one or more of these features in real-time.

Thus, various embodiments of the SMS networks, which are referred to as Service-Centric Policy Management based networks allows for network service intelligent within a network to be distributive throughout all segments and/or components of the network, such as at end user devices, access and transport network platforms, as well as media content and core network service platforms. These Service-Centric Policy Management based network capabilities further enable multiple simultaneous sessions or connections between any numbers of network end points and as such these types of networks employ a communication service delivery pricing model that differs from conventional systems and networks.

Various embodiments of the SMS communication network provide a service delivery approach and a pricing model for converged broadband wireline, cellular or wireless network access services based on an end user communication service QoE service delivered method used by a converged SMS communication network. Whereby, the devices and methods enable the delivery of simultaneous voice communication sessions, simultaneous communication video sessions, simultaneous data information sessions, and simultaneous multimedia communication sessions and capabilities, as well as simultaneous independent communication sessions, which can be voice, video, data and/or multimedia. These communication and information session transaction service types can be managed based on a common session transaction platform within the converged SMS communication network to ensure that all session transactions meet the QoE network service performance metrics as defined by the end user. The devices and methods further allow the end user to select desired service experience levels "QoE Service Levels" for each transaction session type based on the policy management capabilities contained within the converged SMS communication network as defined by the end user. In addition, the devices and methods allow the SMS communication network to dynamically allocate transaction session bandwidths as a function of the Latency Quality Index (LQI) for each session transaction service type as required by the end user in real-time to meet the QoE Service Level objectives based on the price of the service to the end user.

Various embodiments of the SMS communication network and the service delivery pricing model takes advantage of the emergence of new fiber Ethernet and broadband wireless communication technologies and the convergence of these technologies into hybrid fiber-wireless networks with an integrated implementation of Quality of Service (QoS) to support the QoE service delivery model. These advancements eliminate the past restriction on bandwidth and various QoS limitations and as a result enable the implementation of the converged SMS communication networks.

The use of hybrid fiber-wireless networking design has expanded the concept of "bandwidth" such that it can now be perceived as a commodity from a service pricing perspective and as a result the bandwidth can be dynamically allocated as a function of the type of session transaction enabled by the end user in real-time. As such, various embodiments of the communication service delivery pricing model provide a communication service pricing paradigm or model that focuses on the service experience that can be provided to the end user while on the network, and not on the quality of a communication service connection for providing such service forms as voice, video, or data that can be provided to the end user from different types of networks. The pricing paradigm can be configured to be based on the quality of the communication service experience which is provided to each user over the converged SMS communication network as a function of the network resources utilized from the perspective of each individual user's communication service transaction sessions conducted over the converged SMS communication network. The pricing paradigm can also be configured to guarantee the quality of experience service level for a user's communication service transaction session which can be priced as a function of both the resource utilization on multi-services network and the interval of time that those resources are used. This pricing paradigm approach can be referred to as the Quality of Experience (QoE) Index or QoE Service Level. By leveraging this virtually unlimited network bandwidth and architectural capabilities scheme, in various embodiments, the device and method can create a communication network environment that allows an end user to be represented on the SMS network as a Global Service Identities (GSI), which is a logical identity that is assigned to the end user for the purpose of providing an end user service experience on a specific SMS network or on any combination of SMS networks.

In various embodiments, these SMS networks are also capable of providing any communication service form such as voice, video, or data or combination of these service forms over a single SMS network with the unique ability of allowing the end user to select a variety of service experience levels from a single SMS network using network policy management techniques employed within the network or within the end user device or by the combination of the end user device and the network. These network policy management techniques can be used to provide SMS networks with the intelligence to understand each user's GSI communication service transaction needs and to ensure that each user's service transaction is guaranteed to meet the same service experience level requirement for every transaction that is requested by the end user. Various embodiments provide methods for pricing communication services, without the limitations of legacy networks where different networks or the combinations of different networks all provide different quality of service communication connections to the end user, none of which can be independently selected by the end user. Various embodiments provide an approach that uses common wireless access and wireline networks based on the Internet Protocol (IP), where the end user and the end user devices are decoupled from each other until the end user decides to establish a session with the networks from a particular end user device. This approach of real-time network establishment of the relationship between the end user, Global Service Identity (GSI) for the end user, and a network end user access device can be used to provide service access such as voice, video, multimedia data, and wireless access and ensure the communication service experience that the end user will have when using the network. In addition, this approach of real-time network establishment of the relationship between the end user, global service identity (GSI) for the end user, and a network end user access device through the use of biometric also enhances the level of the security of the end users' communication experience on the network. This enables the network service provider to simplify the management of end user databases and the delivery of end user services. In some embodiments, the use of only common broadband IP wireless access networks for the real-time network establishment between the end user and a particular network end user access device provides the maximum flexibility for pricing the network resources (services) based on the value delivered to an end user as a function of time, demand, and location while employing a converged SMS communication network.

Traditional service pricing model are based on bandwidth cost, end user device cost, or both, and not on the value of the service experience to the end user. Various embodiments provide a service experience based pricing models which allow the end user to select service experience level categories, such as, for example, silver, gold, platinum or custom engineered service experiences based on a paradigm of valuing the media and content-driven differentiation of the service level experience for voice, video, and/or data by the end user based on service management policies that are defined, managed and controlled by the end user.

Various embodiments of the communication service delivery pricing model remove the current restrictions imposed on the end user by current networks for basic voice, video, and data services, while also allowing the end user to dynamically select their personal service experience level for voice, video, and data under the control of the end user in real-time. This approach for voice, by way of an example, allows the end user to dynamically select a service experience level, such as basic voice (Low bite rate voice), High Definition (HD) Voice, stereophonic voice, etc. as the end user seamlessly moves between a wireline network connection, a wireless network connection or both. This approach for video, by way of an example, allows the end user to dynamically select a service experience level, such as standard broadcast video services, HDTV (480P) service, HDTV (720P) service, HDTV (1080P) service, etc. as the end user seamlessly moves between a wireline network connection, a wireless network connection or both. By way of another example, this approach for data services allows the end user to dynamically set data speed as a function of the data access service experience that the user is requesting as a function of time and location, in contrast to traditional approaches, which utilizes the data network as a function of the bandwidth limitation of the data network at the time of usage which is not under the control of the end user.

Various embodiments of the communication service delivery pricing model provides network capabilities, such as a converged SMS communication network platform capable of supporting the integration of voice, video, and data services on a single network which has the flexibility to dynamically allocate bandwidth and quality of service requirement under the control of the end user for any given end user requested service experience level as a function of time, network resource utilization, and physical location based upon real-time commodity pricing for network resources, therefore, providing a paradigm in communication service pricing. As such, various embodiments also allow for any end user, not the device, to be viewed as a Global Service Identity (GLSI) within the network and hosted by the networks, which enables any end user to dynamically request any affordable service experience level based on the experience level pricing model defined by the network as a function of time, network resource utilization, and physical location.

The GSI approach afforded by various embodiments of the communication service delivery pricing model also allows end users to conduct other service requests from the SMS network on behalf of the GSI. A few examples of such requests are to find directions to a location for the GSI, to find a product from a particular merchant on the network for the GSI, and to conduct a financial transaction on behalf of the GSI. Those skilled in the art would understand that various requests may be implemented by the communication network based service delivery pricing models utilizing an analytic network platform for computing price as a function of time, network resources utilization, and physical location without departing from the scope of the present teachings.

Employing these network capabilities such as an analytic network platform also allows for the computation of a GSI rating factor that connotes a relativity value of GSIs to the network and merchants as a function of the utilization of the network as well as the types of activities and transactions performed on behalf of a GSI on the network. Thereby, allowing the network to utilize this relativity value for a GSI on the network for the purpose of allowing merchants to perform direct advertising to select GSIs based on their values as defined by their value rating factor and physical location within the network, as opposed to indiscriminately broadcasting online advertisements to all GSIs on the network. This direct advertisement can yield a more direct response from consumers that is more measurable. As such, this capability allows the network to provide discounts and other pricing incentive to the selected GSIs to encourage network utilization for information searching and collection and/or economic transactions with other GSIs, such as merchants, on the network as a function of their physical location. The use of these analytic network platforms also allows the network to dynamically learn the buying habits and patterns of end user by collecting and analyzing end user economic and social networking transactions on the network in real-time, thereby, creating a demographic profile and a value rating profile of each GSI on the network for the purpose of aiding or assisting the end user with economic transactions, social networking transactions, or both on the network.

Various embodiments provide a method of pricing SMS communication network services based on the value of the end user to the network service provider by collecting profiling data on the end users and using the data to set the initial price of a service. As the end user increases their commercial transaction over the network, the end user becomes a more valuable customer to the network. Therefore, the network can be configured to reduce the initial price of the service based on the end user's usage of network services, other network resources or both. In various embodiments, the SMS communication network enables the end user to interact with the network to test and/or experience the network service capabilities and features to aid the end user in selecting the most affordable network service price based on the value of the service to the end user. This feature allows the end users to set or select their own price for the communication service that they would request the network to deliver to them. The SMS communication network, in various embodiments, enables the end users to self-provision their own communication network service capabilities and features based on predefined standard QoE service packages. As alternative to the predefined standard QoE service packages, the SMS network also provides the end user with the option to customize their own communication network service capabilities and features. The options to select a predefined standard QoE and to customize an end user's QoE as provided by the SMS network differ from conventional networks, because conventional networks may allow the user to select a product such as call-waiting but the user cannot modify the parameters, terms and conditions as to how the end user receives the call-waiting feature. The end user is presented with a take-it-or-leave-it situation with no options, because the end user must accept the call-waiting features as programmed or established by the conventional network.

Various embodiments of the SMS communication network calculates an LQI network performance measurement for measuring the performance of the network from the perspective of the end user by using human-machine interactivity techniques to determine the relative quality of experience that a user senses when he or she is engaged in a communication session or transaction on the network. The LQI can further serve as a measurement to ensure that the end user receives the requested level of service from the SMS network. In various embodiments, the SMS network permits multiple end users on the same level, end users on different levels, or the combination of end users on the same level and users on different levels that have a common interest or affiliation to share network resources or services as means to reduce their overall network cost of service. The SMS network, in various embodiments, can be configured to dynamically allocate network resource on a per session transaction basis to meet to service QoE requirement requested by the end user for session transactions such as voice, video, data; or multimedia.

Various embodiments of the SMS network can transfer the end users' data repository from one access network physical location to another access network physical location so that the end user's network data repository can follow the end users as they move from one physical location where network access communication service is being provided to another physical location within the same SMS network or another SMS network where access communication service is provide and as such allow the end user to have access to a Data Repository Follow-me Service. The SMS network can monitor and transfer the end user's data based on either the physical location of the end user's mobile or portable device or based on the GSI assigned to an end user. Detection of the end user's device can be performed based on continuous mobility devices like "Cell Phones or Laptop Computers" or portability end user devices like IP Telephone or Desktop Computers. Various embodiments of the SMS network enables the user to perform alias e-commerce transactions, which allow an end user to be identified on the network for e-commerce networking and e-commerce business negotiating without unveiling the real identity of the end user until the end user agrees to the terms of the e-commerce transaction and activates the transaction. The alias for identifying the end user on the network during the commission of an alias e-commerce transaction can be based on the GSI assigned to uniquely identify the end user within the network. In various embodiments, the SMS network affords an end user the option to select per transaction/session or to specify for a predefined group of transactions/sessions whether to establish a real-time secure channel for communication between the two end points on the network. After the secure transaction or session is completed, the SMS network automatically deletes all data associated with the session or transaction.

Various embodiments of the SMS network enable the implementation of "Location Relevance Advertising" where merchants enrolled on the network can offer instantaneous discounts, sales, and coupons to consumers enrolled on the network as the consumers enters into a predefined boundary. The end user can selectively activate the Location Relevance Advertising feature of the SMS network such that the network can monitor the consumer's physical location and offer special discounts, sales, and coupons based on physical location and the economic value assessment of the consumer as calculated by the network. The economic value assessment of the consumer can be determined, for example, based on the number of transactions or sessions conducted the consumer over and/or within the network.

As will be appreciated by one skilled in the art, the present teachings of the communication service delivery pricing model may be embodied as a system, method, or computer program product. In various embodiments, the present teachings include various steps, which will be described below. The steps of the communication service delivery pricing model may be performed by hardware components or may be embodied in machine-executable instructions, which may be used to cause a general-purpose or special-purpose processor programmed with the instructions to perform the steps. Alternatively, the steps may be performed by a combination of hardware and software.

The communication service delivery pricing model may be provided as a computer program product, or software, that may include a machine-readable medium having stored thereon instructions, which may be used to program a computer system (or other electronic devices) to perform a process according to the present teachings. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other type of medium suitable for storing electronic instructions.

To provide for interaction with a user, the invention can be implemented on a device, such as, a computer system having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or haptic feedback; and input from the user can be received in any form, including acoustic, speech, or haptic input.

The communication service delivery pricing model may also be practiced in distributed computing environments where the machine readable medium is stored on and/or executed by more than one computer system. In addition, the information transferred between computer systems may either be pulled or pushed across the communication medium connecting the computer systems. In various embodiments, the communication service delivery pricing model may be described in terms of algorithms and symbolic representations of operations on data bits that may be stored within a memory and operated on by a processor.

Figure 2:
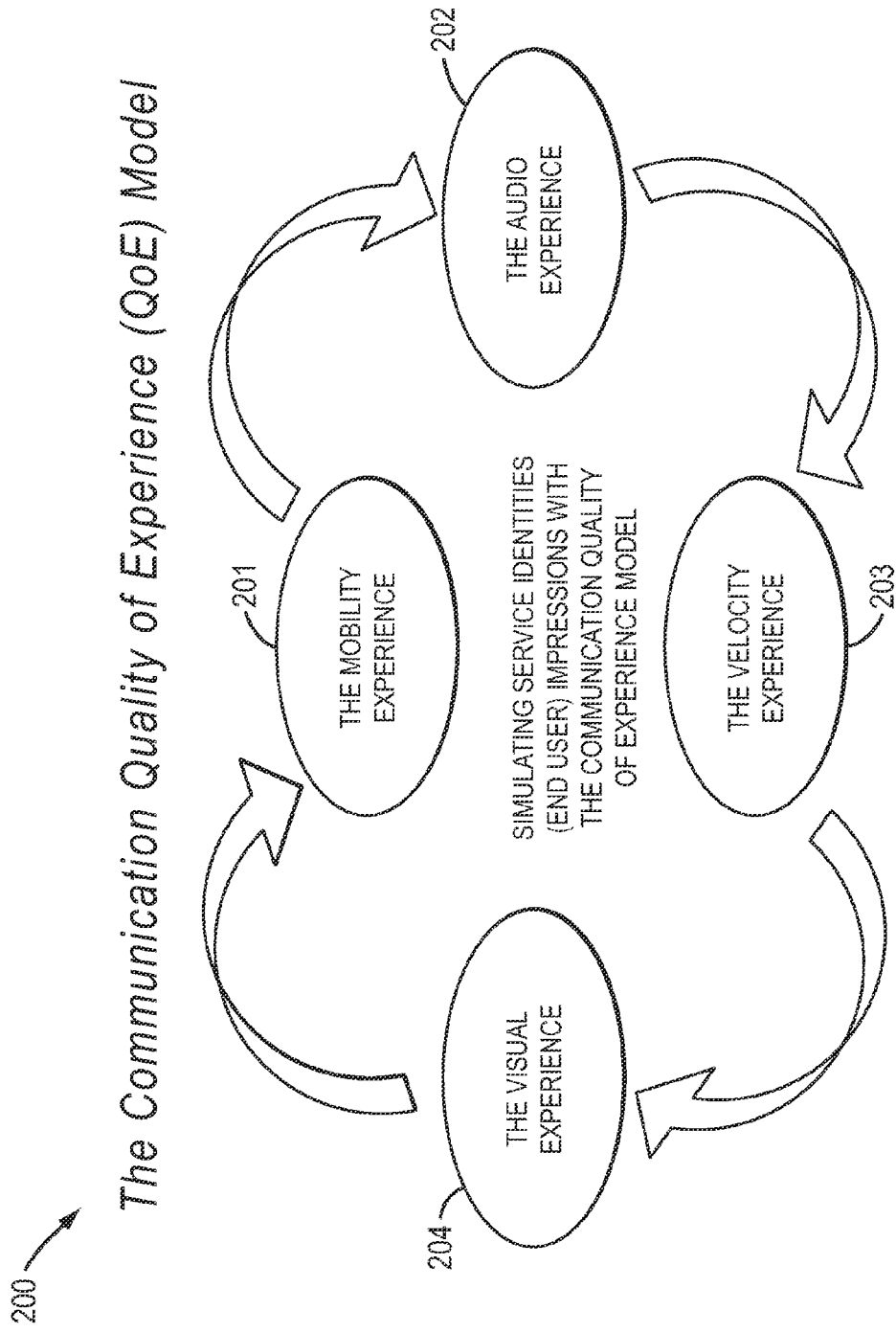
FIG. 2 illustrates an exemplary embodiment of a communication Quality of Experience (QoE) service delivery pricing model in accordance with the present teachings.

An exemplary embodiment of a communication service delivery pricing model that can be used, for valuing the media and content-driven differentiation of the service level experience for voice, video, and/or data by the end user, is illustrated in FIG. 2.

The present teachings relate to devices and methods of a communication service delivery pricing model for pricing broadband wireline, cellular and/or wireless services based on the end user's service experience, and not the bandwidth or the service form such as voice, video, or data. Thereby, allowing the end user to select a service level experience and use it for simultaneous sessions such as a voice session, a video session, a data session, multimedia or a combination voice, video, multimedia, and data session from a single end user communication device on the network. This single end user communication device should possess the capabilities to support multiple simultaneous sessions or connections or the device should be capable of being configured to support multiple simultaneous sessions or connections. The present teaching permits delivery of the communication service experience within a wide-area broadband wireline and/or cellular network or within a private broadband wireline and/or wireless network (e.g., within a residential home, business enterprise, city, etc.) where the end user has a communication device that is capable of supporting, for example, broadband wireline and/or wireless communication for voice, video, and/or data services. The device and method allow for multiple experience levels for voice, video, and data or combinations of these service experience levels as a function of price. An example of this for a voice application is low bit rate voice, standard voice, high quality voice, stereophonic voice, as a function of price, where the end user's service price is based on the service experience level selected by the end user on a continuous basis or on a per session or transaction basis.

This communication service pricing model may be configured to provide the same communication service for these various experience levels through a unique broadband access service portal design that allows any capable end user device to dynamically connect to broadband private or public wireless networks or to private or public wireline networks and provide the same service level experience as a function of price.

An exemplary embodiment of a Quality of Experience (QoE) model 200 that can be used, for example, to price communication and informational services based on the QoE that an end user receives from a network is illustrated in FIG. 2. The exemplary embodiment of the QoE model 200 removes bandwidth as the key limiting factor, which is typically used in existing pricing and QoS service delivery models. The QoE model 200 can be configured based upon a hybrid fiber-wireless network design 300 (for example, as shown in the exemplary embodiment of FIG. 3), which removes the current restriction of bandwidth such that communication network processing and information network processing are completely transparent. Namely, the end user's experience is not determined by the type of network used to deliver the services, rather, by the desired level of experience that the end user perceives when the service is received by the end user.

Figure 3:
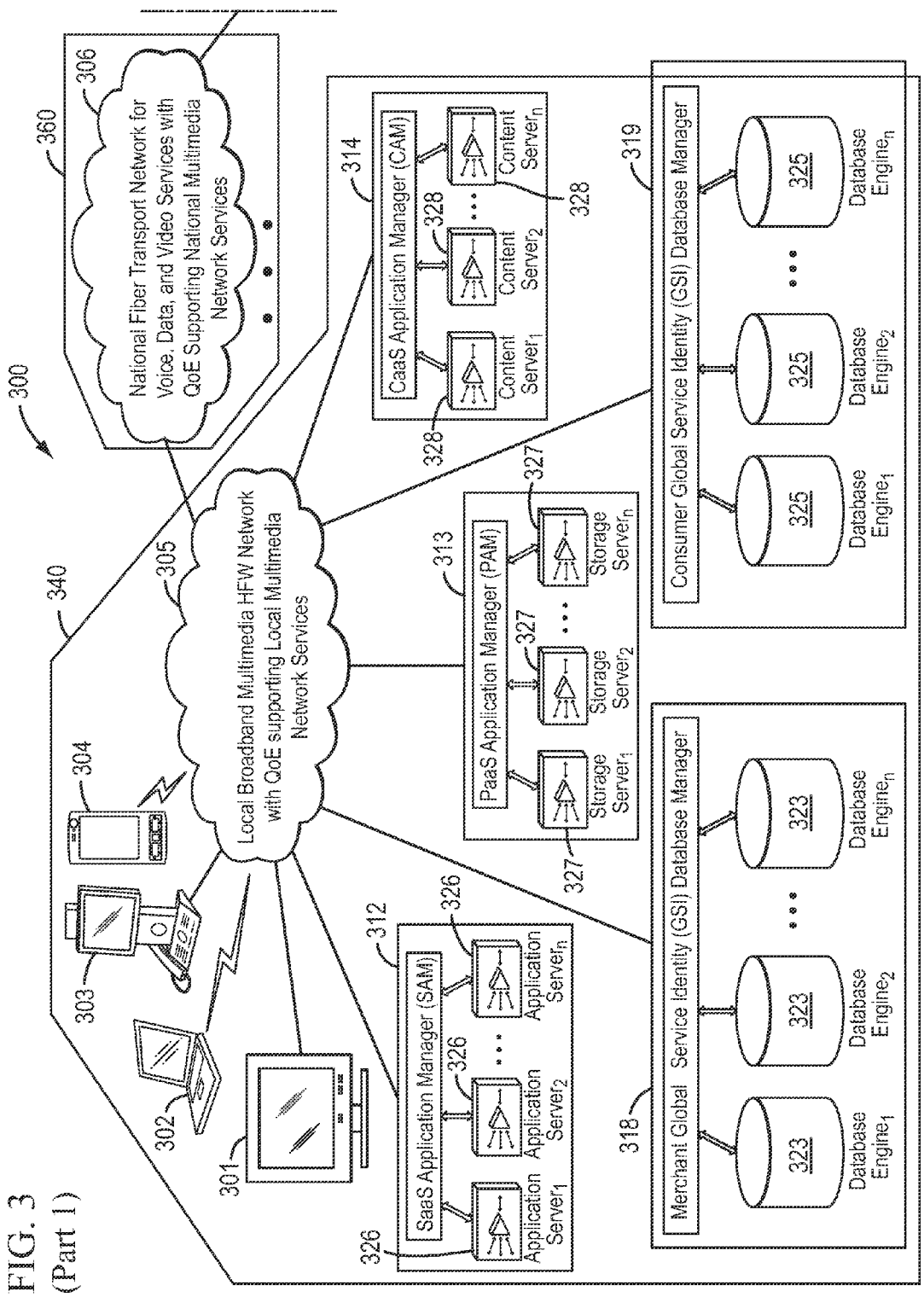
FIG. 3 illustrates an exemplary embodiment of a Smart Multi-Services (SMS) communication network utilizing Hybrid Fiber-Wireless (HFW) networks for implementing the features of the present teachings.

The QoE model 200 may be configured based on one or more dimensions that control the services from the perspective of the perception of the sensation that the end user experiences when the service is delivered, i.e., the service experience. For example, QoE model 200 may be based on four dimensions of service experience, such as a mobility dimension, an audio dimension, a visual dimension, and a velocity dimension. The design of the exemplary SMS network 300, as shown in FIG. 3, enables the QoE dimensions of FIG. 2 to be integrated into a service delivery and pricing model such that the end user can be billed for the QoE service level received, rather than a voice, video, or data service that is based upon the QoS of a network connection which is typically a function of bandwidth and other service feature parameters.

For example, the mobility experience dimension 201 can be designed to measure the degree of mobility of a particular service such as audio "voice", visual "video" or velocity "speed of data" as the service travels from one environment, such as within a building on a "Small Cell" based Broadband Wireless Network, to another environment, such as outdoors in a wide-area "Large Cell" based wireless network environment. The mobility experience dimension 201 can be configured so that the network has the capability to dynamically adjust the bandwidth and other radio channel parameters to ensure that the QoE Service Level priced to the end-user is maintained throughout a requested communication session or transaction as the device transitions from one wireless network environment to another.

Another example is that the audio experience dimension 202 can be designed to measure the quality of an auditory signal delivered to the end user when the user requests to listen to an audio transmission such as monophonic sound, stereophonic sound, multi-channel sound, and the like. One feature of the audio experience dimension 202 is the ability to increase the pleasure of the audible range of sound in a manner that enhances and improves the quality of sound as perceived by the end-user. This feature enables the user to dynamically vary the QoE listening levels as a function of price.

A further example is that the visual experience dimension 203 can be designed to measure the quality of viewing a motion picture delivered to the end user, wherein the motion picture can be broadcasted according to a format such as standard definition television, high definition television, HD 480p, HD 720p, HD 1080p, and the like. One aspect of the visual experience dimension is to provide the ability to increase the user's viewing pleasure, for example, of a motion picture in a manner that enhances and improves the viewer's perception by enabling the user to dynamically vary the QoE viewing levels on demand as a function of price for the service.

Another example is that the velocity experience dimension 204 can be designed to measure the speed of viewing data or information delivered to the end-user to determine how rapid a specific unit of data can be displayed on a screen for viewing such as one megabyte per second, ten megabyte per second, one hundred megabyte per second, and the like. One of the features of the velocity experience dimension 204 is to increase the user's pleasure of viewing data or information as a function of speed that enhances the user's perception while viewing the requested unit of data by varying the QoE speed levels as a function of price of the service. It should be understood that the QoE dimensions shown and described with reference to FIG. 2 are nonlimiting and exemplary. Those skilled in the art would understand that other features of the network may be envisioned as QoE dimensions without departing from the scope of the present teachings.

In one or more embodiments, the multi-services network design and technology 300, such as shown for example in FIG. 3, facilitates the integration of the service dimensions, for example shown in FIG. 2, to provide services to the end user based upon a predefined or customized QoE Service Level (QSL) concept. The QSL feature of the present teachings enables the service providers of SMS networks to deliver services that are based on the QoE paradigm which is designed or configured to stimulate human perception of the information and communication service experience. The level of service provided by each QSL can be configured by dynamically selecting and varying different parameters such as voice codec, video code, wired bandwidth speeds, and wireless bandwidth channels to uniquely configure a QSL to match an end user's request for a unique and user-specific converged information and communication service experience. One of the metrics that can be defined for measuring the end users satisfaction with a communication service experience on a SMS network can be referred to as the Latency Quality Index (LQI) Rating. When the user initially registers with the network, the LQI can be used as a means for the user to test and sample the various QoE service levels provided by the network. This LQI can also be employed within the SMS network to provide a means for measuring the experience that a particular user experiences on the network during a dynamic service transaction as a function of time measured, for example, in seconds, network resources utilized and physical location. This QoE measurement system and method may be configured, for example, to provide multiple QSL service levels such as QoE Silver Service, QoE Gold Service, QoE Platinum Service and/or QoE Custom Engineered service levels. In this example, the prices can be established such that they increase as the service level increases such as starting from a silver level service to a gold level service. By way of example, one dimension of the QoE Silver Service can be defined having a LQI range of x to y milliseconds with a statistical variation of plus or minus z milliseconds; the QoE Gold Service can be defined having a LQI range of x to y milliseconds with a statistical variation of plus or minus z milliseconds; the QoE Platinum Service can be defined having a LQI range of x to y milliseconds with a statistical variation of plus or minus z milliseconds; and QoE Custom Engineered Service can be defined having a LQI range of x to y milliseconds with a statistical variation of plus or minus z milliseconds, where the x, y and z parameters are defined to differentiate between the different QoE Levels. This approach allows the end user to uniquely value a service experience such that a pricing model for converged information and communication service on a SMS network can be established based on QSLs, and not on the QoS of a communication service connection that is provided on different types of networks, such as the PSTN, broadcast cable networks, wireless networks, Internet, etc.

The predefined QSLs may be classified, for example, as silver, gold or platinum levels. In such an example, the QSL for a platinum level of service may be higher than a gold level of service, and the gold level of service may be higher than a silver level of service as a result of the QLI. In such an arrangement, a user selecting their level of service will be allowed to choose between these predefined levels of service parameters. The SMS network permits the user to initially test and sample the different QSL levels during registration in order to assist the user in deciding which level based on cost is the most appropriate level of services. The SMS further provides the user with the ability to continuously modify or change the QSL Level initially selected. During the use of the service in response to a request for a predefined QSL, the network may automatically vary one or more of the level of service parameters during the transmission or communication session to guarantee that the end user receives the experience that corresponds to the selected QSL. In addition, the SMS network design 300 affords the end user the ability to customize their level of services through the use of self-provisioning capabilities under control of the end user. This end user self-provisioning network capability allows the customization of end user's service features to be managed and controlled by the end user to meet the individual needs of the end user as a function of time and physical location. This self-provisioning service customization capability may be offered as an alternative or in conjunction with the predefined levels of service provisioned by the network owner. For example, in some embodiments, the system may provide the user the ability to select the predefined levels for some services and allow the user to customize other types of service parameters. During the use of the service in the customization embodiments, the network may enable the user to specifically select, control, and vary the service level parameters prior to the transmission, as well as during the transmission or session. For example, if the user wishes to modify any of the QoE dimensions to change their current experience level during the requested transmission, using the network, the user can dynamically vary one or more service level parameters as a part of the service policy management capability of the SMS network. If the user initially elects to customize his or her services during registration but later wishes to select one of the predefined QSLs, the SMS enables the user to reconfigure the initial set-up to select one of the predefined QSLs.

The system and method may employ a network architecture configured, such as, for example, a Hybrid Fiber-Wireless (HFW) Network. The network architecture can be based on IP networking or Ethernet networking over HFW networks. The network architecture can also be based on the use of Ethernet over fiber such as Gigabit Ethernet Passive Optical Networks (GEPONs) and can connect the GEPONs to Broadband "Small Cell" based cellular networks, which are referred to as CelluLAN® networks. The combination of these two different types of network architectures, the GEPONs and the CelluLAN® networks, provides a converged (SMS) network, which may be referred to as a Broadband Mobility Hybrid Fiber-Wireless Network. This network design removes the restriction on bandwidth for information and communication services delivered for both wired and wireless services to end user devices. By enabling seamlessly IP networking between both the GEPONs and the Broadband "Small Cell" based CelluLAN® network, a SMS network can be provided that facilitates the design and delivery of QSLs. The HFW networks can be implemented by using Gigabit fiber Ethernet within the core network design, as shown for example in FIG. 3 as the National Fiber Transport Network, 306, and utilizing HFW networks for local access network design based on GEPONs and CelluLAN® as shown for example in FIG. 3 as the Local Broadband Multimedia HFW Access Network 305, 311.

Figure 8:
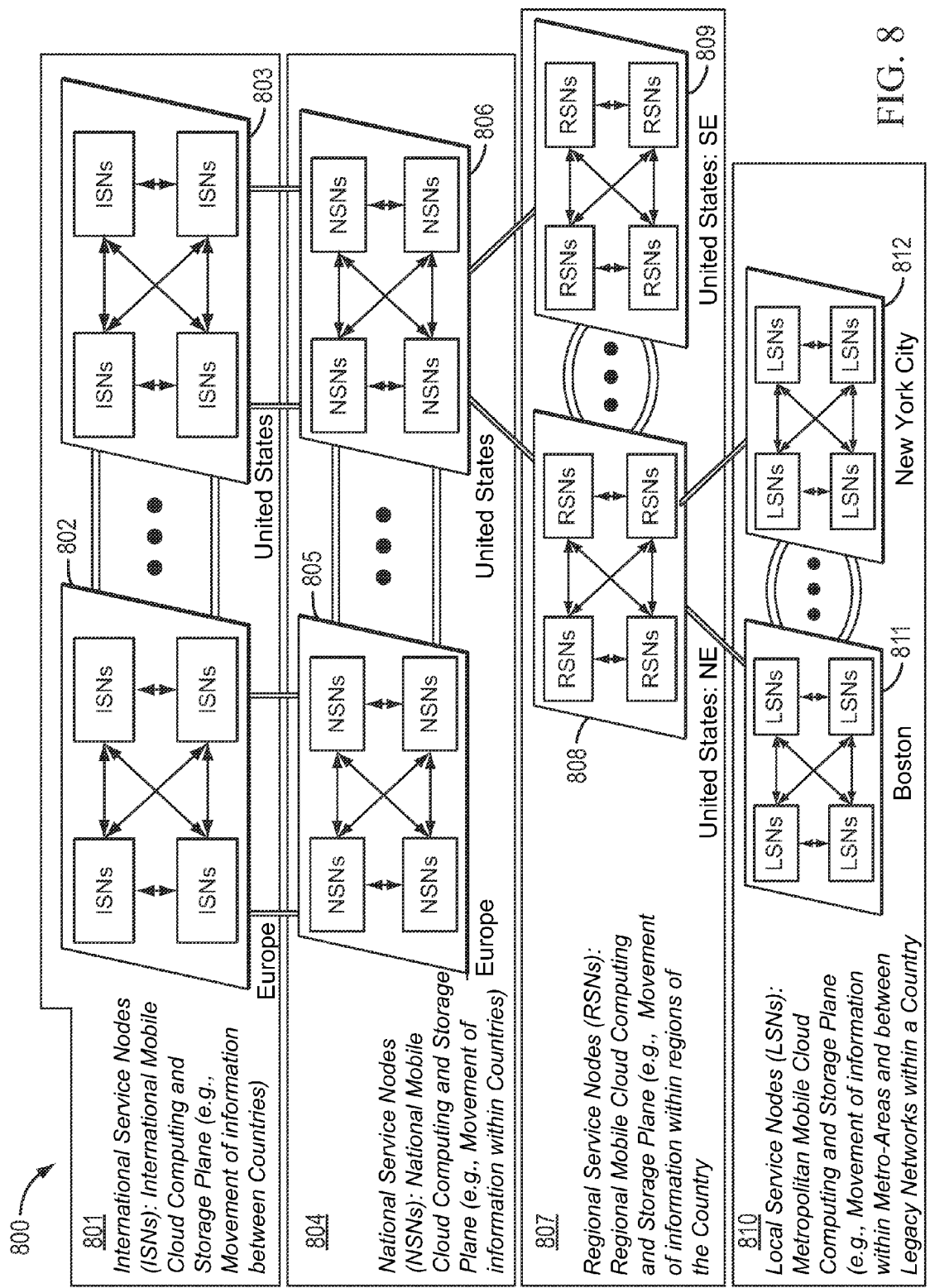
FIG. 8 illustrates an exemplary embodiment of a shared-value consumer-merchant e-commerce GSI Naming Architecture in accordance with the present teachings.

As shown in the exemplary embodiment in FIG. 3, the SMS Networks can be designed to be multi-level hierarchical networks wherein the network architecture is capable of being scaled or built from very small local SMS networks to very large national or international SMS networks to permit the sharing of common SMS Network services and resources among end users of the SMS Network at different levels of the network hierarchy. Various network hierarchical levels are illustrated in FIG. 8 as local, regional, national and international levels. One feature of these types of networks is the ability of the SMS Network to allow end users at the same or at different levels that have a common interest or an affinity to each other to dynamically share the network services and/or resources that support that common interest. Sharing services and/or resources hosted on the network reduces cost, increases the access speed to information, and/or improves or simplifies the ability of the end users with a common interest to easily collaborate with and among each other. As depicted in the example of FIG. 8, the lowest level of the SMS Network hierarchy is referred to as the Local Level which can be an enterprise building network, a home network, and/or a community or neighborhood network. These Local Level SMS Networks can be designed such that they are scaled or built to very large national or international networks depending on the end users' common interest or affinity to each other. The SMS Networks at any level can be established as public or private network or a combination of public and private network depending on the end user community for which the network is designed. These SMS Networks can be clustered together to form different types of networks for different purposes such as connecting two different communities within a particular region of a country that have a common affinity to each other. For example, two biomedical universities located at a local level in Atlanta that share resources hosted on a local network can be clustered together with another biomedical university located at a local level in North Carolina to form a biomedical research consortium that has shared access of a common database that hosts research information at a regional that is of a common interest to all three universities. This example illustrates an SMS Clustered Network designed as a Regional SMS Network that supports two or more Local Community SMS Networks with Local Shared Services and Resources within each Local Community SMS Network for the purpose of allowing the end users within the local community network to share network services and resource. After initially building the local level, adding a next level of hierarchy to the network design, in this example, forms a Regional SMS Network where all of the network services and resources that are common to all the communities are shared at a regional level which can be referred to as a Regional SMS Network with Regional Shared Service and Resources. This scaling approach can be expanded to build a network from the lowest level to a higher level to form, for example, National SMS Networks, International SMS Network, as shown, for example, in FIG. 8. This approach can also be extended or expanded to use other similar techniques or non-geographical techniques to build and design Clustered SMS Networks.

When Local SMS Networks are designed within a Clustered SMS Network configuration, they are typically architected to internetwork with each other through the highest level of the Clustered SMS Network Architecture such as at the regional level, national level, international level, etc. This approach is used to optimize the use of Local, Regional, National, and International Network Shared Services and Resources. This approach further allows end user to reduce their cost because a local end user can share services with different groups of end users at the local, regional, national or international levels as the end user's service and/or resource requires. Another important dimension of SMS Networks is the ability to connect to other SMS Network and/or Legacy Communication Networks such as the PSTN, Cellular, Cable, Wireless, etc. The ability to connect to various types of SMS Networks and Legacy Networks facilitates the exchange of the end users' information or the establishment of communication sessions connections between the end users within an SMS Network to other end users within a Legacy Communication Network. The connectivity between the various types of networks can be implemented using Gateway Service Nodes (GSNs). These GSNs are designed to perform network protocol conversion, which allows different networks to interact with each other without changing their internal networking protocols. These GSNs typically exist at the highest level of the SMS Network Architectural design. However, a GSN can exist within a Local SMS Network, if the requirement for the network design is to allow the exchange of end users information, to connect communication sessions between end users at the Local SMS Network Level, or allow a Local SMS Network to connect to other end users within a Legacy Communication Network. In FIG. 8, the GSN are shown at the international, national, regional, and local level as International Service Nodes (ISNs), National Service Nodes (NSNs), Regional Service Nodes (RSNs), and Local Service Nodes (LSNs).

In general, the exemplary network environment in FIG. 3 is configured based on the "virtualization" concept. The network environment may be configured to include one or more local shared services networks 340, 350 and global shared services networks 360. A local shared services network 340, 350 can be configured to provide virtual individual security zones (Virtual DMZs) for shared services among users physically located within a defined local area or community, such as a particular building, college campus, business complex, a defined geographic region, such as New York City. Through the use of virtualization, users connect to the local shared services network 340, 350 to access virtual security zones to share services or resources that are commonly needed among the users. With the use of security zone virtualization software, a hardware computing platform can serve as a common hardware computing environment which allows multiple enterprises, such as several business enterprises, to share the cost of commonly used software applications, thereby, reducing the cost to each business enterprise. The advantage of this local shared services concept is the use of virtualization technology to provide the ability to run multiple virtual DMZ machines on a single hosted hardware platform within a locally shared computing environment. Virtualization enables multiple servers spread across an enterprise to share applications and databases along with other infrastructure and resources within the virtual DMZ. This reduces the number of actual servers and hardware devices required to be purchased and maintained by the business enterprise, which reduces infrastructure and maintenance cost. Similar to the concept of a local shared services network 340, 350, a global shared services network 360 can be configured to provide shared services among users connected to the network, wherein the users are not physically located within a local community, but are a part of a common business segment such as law firms, real estate firms, and financial firms. In other words, the global shared services enable user located at various locations to access shared services or resources based on the similarity of their business enterprise segmentation. These types of shared services networks are referred to as "adhoc" shared services network within the context of SMS networks.

The exemplary embodiment of FIG. 3 illustrates two local shared services networks 340, 350 and a single global shared services network 360. In FIG. 3, the first local shared services network 340 can be configured to include, for example, Local Broadband Multimedia HFW Network (LBMHN) 305; service application managers such as Software as a Service (SaaS) 312, Content as a Service (CaaS) 314, and Platform as a Service (PaaS) 313; databases such as Consumer and Merchant Global Service Identity Database Managers, 318, 319; and end user devices such as cellular device 304, a PSTN phone 303, a personal computer 302, and a television 301. The second local shared services network 350 in FIG. 3 can be configured to include, for example, Local Broadband Multimedia HFW Network (LBMHN) 311; service application managers such as Software as a Service (SaaS) 315, Content as a Service (CaaS) 317, and Platform as a Service (PaaS) 316; databases such as Consumer and Merchant Global Service Identity Database Managers, 320, 321; and end user devices such as cellular device 307, a PSTN phone 308, a personal computer 309, and a television 310. As mentioned above, the global shared services network 360 operates on the same principles with similar components as associated with the local shared services network. One minor difference is that, typically, end user devices do not connect directly to the global shared services network 360, because they can only gain access to the global shared services network 360 and resources through their access connections within the local shared services network 340, 350. In FIG. 3, the exemplary global shared services network 360 is illustrated as the National Fiber Transport Network with application server capabilities 306; however, the details of the specific components of the processors, mass storage and various other devices have been omitted for the sake of clarity.

In FIG. 3, during use, for example, at the local shared services network 340, 350, the system operates as a distributed network capable of enabling users of a local community to access virtual security zones to share services and resources on a local shared service hardware platform using virtualization software technology. According to the present teachings, the network enable users to access the shared services network and resources such as the SaaS, CaaS, PaaS service application managers by paying an agreed upon service fee, for example, a monthly rental fee. The security zone virtualization software application of the network provides the user with the appearance of possessing the actual hardware and software capabilities provided by the local shared services resources and application software. Actually, a virtual machine that implements the virtualization concept is an abstraction of an actual physical computer system. In the present teachings, the DMZ virtual machine of the users can be installed on a host hardware platform, which can include system hardware, and one or more layers or co-resident components comprising system-level software, such as an operating system and other software applications. The present network can be configured such that the hardware can be shared as a common software resource, and the software is virtually partitioned into individual security zones or virtual DMZs to serve each individual business enterprise. The virtualization software technology enables partitioning and secure isolation of each individual business enterprise virtual software environment, which gives the appearance that each business enterprise has access to its own private software and hardware application system. The users of the local shared services networks can access and obtain the local shared services resources, which are provided as a pool of common services and resources. If a service or resource is unavailable on the local shared network 340, 350, the user can then seek to access the pool of shared services offered on a regional, a national, or a global shared services network 360, as illustrated in FIG. 3 to obtain such services and resources.

Specific details of the components of FIG. 3 will now be further described. The Local Access Networks can be configured as the networks that control the delivery of converged information and communication services either wired or wirelessly through the use of local access service nodes that support the identity of the end user databases such as Consumer and Merchant Global Service Identity Database Managers, as well as Software as a Service (SaaS) 312, 315, Content as a Service (CaaS) 314, 317, and Platform as a Service (PaaS) 313, 316 service application managers. The Consumer and Merchant Global Service Identity Database Managers 318, 319, 320, and 321 can be designed to allow the network to assign a single Global Service Identity (GSI) to all end-users within the network for the purpose of accessing, requesting, and receiving services. The GSI Database Managers, 318, 319, 320, 321, can also be used to facilitate the end user policy management capabilities of the SMS network by allowing the end user to execute network based transactions based on the LQI which can control the QoE for the end user on the network. In addition, the Global Service Identities (GSIs) Database Managers 318, 319, 320, 321, can be configured or architected to allow all GSIs to communicate with each other directly without the use of intermediaries for the purpose of social networking or e-commercial networking. The GSIs can also be used as a security feature for an end-user to control his or her personal identity on the network by restricting access to secure information about the individual who is identified by a particular GSI. The GSIs can also be used to instruct the network to perform tasks or transactions at the request of the GSI. By way of example, the task or transaction may include searching for, retrieving and displaying information regarding a particular product or service on the network for the GSI in real-time as a function of a physical location while the GSI is mobile and traveling from one location to another location. Another example is that the task or transaction may include searching for, retrieving, and displaying information regarding the discounted sale price of a particular product or service on the network for the GSI as a function of the specific physical location of the GSI within the network. The GSIs can be assigned such that the end user is represented, for example, as a predefined commercial entity depending upon the type of service requested by the end user. For example, the GSI can be defined by the Merchant Service Identity Database Manager 318, 320 as a merchant within one or more of the Merchant Service Identity Provisioning Databases 322, 323 or defined as a consumer by the Consumer Service Identity Database Manager 319, 321 within one or more Consumer Service Identity Provisioning Databases 324, 325. The features and services of the Merchant Service Identity Database Manager 318 and 320 and the Consumer Service Identity Database Manager 319 and 321 will be described in further details below.

Furthermore, the present teachings provides a peer-to-peer relationship that converges the benefits of a hierarchy network with a flat IP protocol network so that any point can be virtually connected to another point in the network. The SMS network virtually connects points within the network by leveraging the Internet protocol to combine the hierarchal capabilities of a switch network with a flat IP network. Thus, the SMS network creates a hybrid-formed network having hierarchical capabilities in combination with the flat IP network. The peer-to-peer networking capability of the SMS network allows a Multi-Network Client (MNC) device to travel to a foreign network and be virtually connected back to its home SMS network, thereby, allowing the MNC device to utilize the network local shared resources and services that are supported by the MNC device's home SMS network. These foreign networks can be other SMS networks or legacy networks such as the Public Switched Telephone Network (PSTN), Cable Networks, Cellular Networks, IP Packet Networks, etc. This SMS Network peer-to-peer networking capability can utilizes one or more signaling network protocols to perform this peer-to-peer networking feature. For example, which are the SIGTRAN IP networking protocol for IP networks like the SMS network and the SS7 circuit switch network signaling protocols for circuit switch networks like the PSTN and Cellular Networks can be used to perform the signaling interworking to allow these two different types of networks to peer with each other. If the foreign network is an IP Packet Switching network or another SMS network, which is also an IP network, they these networks will peer automatically because they use the same IP network signaling protocols. However, if the foreign network is a legacy circuit switch network then the SIGTRAN IP networking protocol can be used to convert the SS7 signaling messages into IP signaling messages, thereby, allowing an MNC device that is physically connected to a circuit switch networks like the PSTN and Cellular Networks to be virtually connected to and IP network like the SMS Network.

Figure 6:
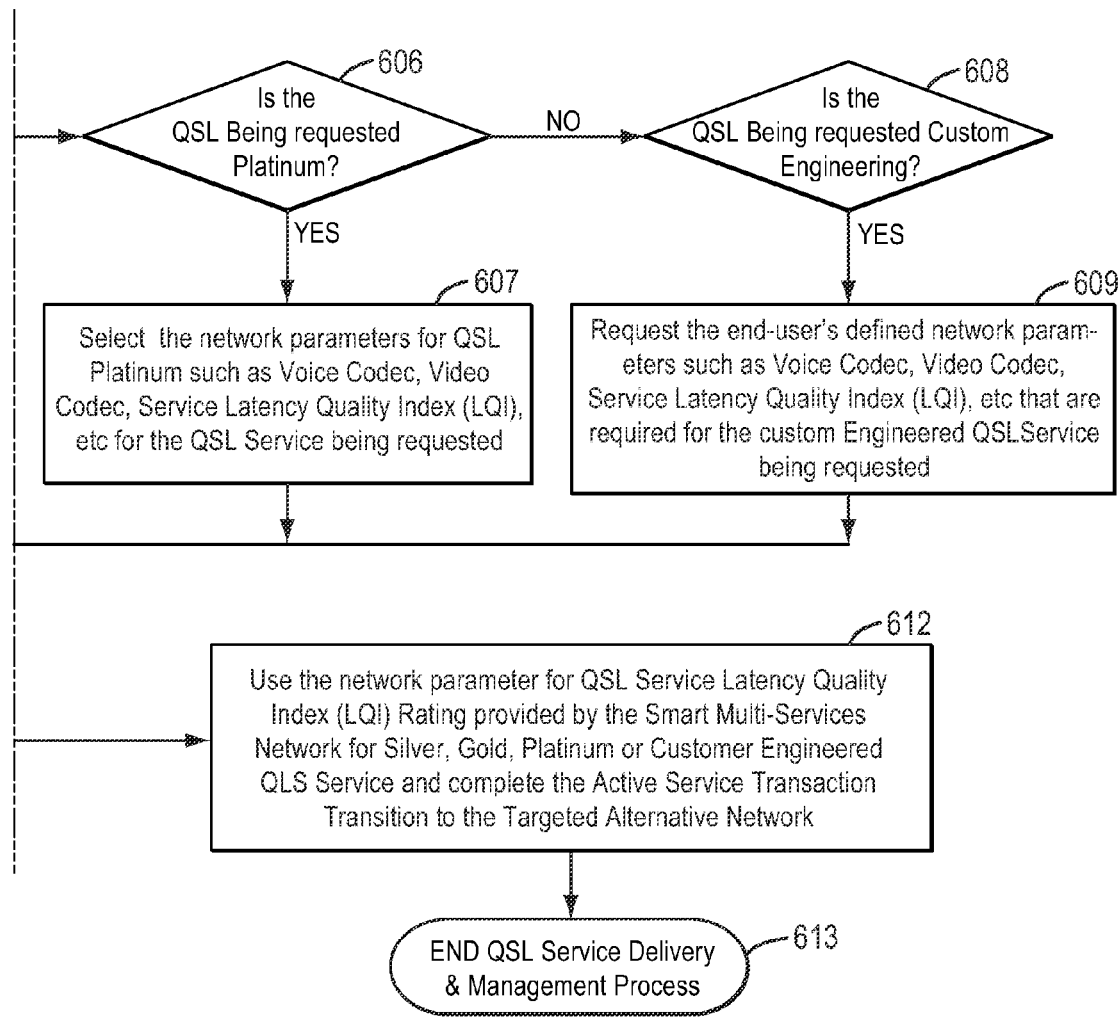
FIG. 6 is an exemplary flow chart illustrating the features and operations of a service delivery and management algorithm that enables the SMS network to seamlessly transition services to an alternative network by adjusting the Service Latency Quality Index (LQI)

The SMS Network peer-to-peer capability can be activated once a MNC device, which is registered as a device with its Home SMS Network, travels to another network (e.g., a foreign network), and then requests service from its Home SMS Network. The MNC device must request service access from the foreign network. Once service access is granted by the foreign network. The foreign network launches a SS7 broadcast of a SS7 signaling message to all networks that are connected to the Public Switched SS7 Signaling Network which includes all Circuit Switch Networks as well as IP Network if they are equipment equipped with Network Signaling Nodes that support the SIGTRAN internetworking IP signaling protocol such as SMS Networks. Once the SS7 network broadcast a SS7 signaling message from a foreign network and it is received by the home SMS Network of an MNC device, the home SMS Network of the MNC device acknowledges that the MNC device that is requesting service within the foreign network is registered as a device with its network. This home SMS Network's acknowledgement process launches the SMS network's peer-to-peer networking capability which allows the MNC device's home SMS Network to establish a peer-to-peer connection between the MNC device's home SMS Network with the foreign network where access services is being requested by the MNC device. Once the network peering interworking acknowledgment process is complete, a virtual access connection from the MNC device via the foreign network to the home SMS network for access to local shared resources and services within the home SMS network is activated, thereby, allowing all authorized services for the MNC device to be directly accessible from its home SMS Network. While the SMS network provides the MNC device the ability to access and share the resources and services provided by the home SMS network when located within the boundary of the foreign network, as illustrated in FIG. 6, the QoE Service Level that will be available for the MNC device access connection will be based on the LQI performance requirement provided by the foreign network. Although, the above example describes a device traveling from an SMS network to a foreign network configured as a legacy circuit switch network, it will be apparent to those skilled in the art that various modifications and variations can be made to the present disclosure without departing from the scope of its teachings. By way of example, in some embodiments, the device can travel from one circuit switch network to another circuit switch network or from an IP network to another IP network. In other embodiments, the device can travel from a circuit switch network to an IP network.

In general, using the SaaS 312 and 315, CaaS 314 and 317, and PaaS 313 and 316, the system and method can provide on-demand delivery of services by the SMS network. For example, the SaaS 312 and 315, which includes application servers 326, can provide software deployment for use as a service on demand with complete real-time digital rights management capability. The CaaS 314 and 317, which includes content server 328, can provide the management of hardware and software for the delivery of telecommunications as content services on demand with complete real-time digital rights management capability. The service application managers can be configured to include built-in Digital Rights Management (DRM) capabilities that allow the GSI owners of the software and content to directly and remotely manage the service delivery process for these services while protecting the software and content from piracy when the software and/or content is used by another GSI on the network or directly on the GSI's end user device. The PaaS 313 and 316, which includes storage server 327, can facilitate the deployment of applications and network platforms for use as a service on demand capability with complete security management that allows the owner of the application to directly remove the application from the network and/or the GSI's end user device via remote management of the application once the use of the application is completed by the GSI on a transaction by transaction case. In various embodiments, the SaaS 312, 315, CaaS 314, 317, and PaaS 313, 316, service application managers can be designed to support a variety of services that are provided by the SMS network, for example, such as renting software, renting computing and computer periphery resources (e.g., centralized computing machines, printers, data storages, etc.), renting content (e.g., movies, live concerts, lectures, television, etc.) and renting online applications (e.g., computer games, live games, video conference, etc.) as a function of an end user's request and physical location. The Local Broadband Multimedia HFW Network, shown, for example, in FIG. 3 can be publicly owned or privately owned. This arrangement permits, for example, a home owner, a small business, or an enterprise level business to own, operate, and control their personalized private HFW networks. These private HFW networks can be configured with service node capabilities, which afford these networks the ability to perform Service-Centric Policy Management functions, shared services and resources as well as the ability to connect to a publicly provided HFW network such that the private networks can establish peer-to-peer connections with other private HFW networks for internetworking and exchanging of information between privatively peered networks to form adhoc SMS private shared services networks.

According to an exemplary embodiment of the present teachings as shown in FIG. 3, the SMS HFW network 300 for delivery of QSLs may include a National Fiber Transport Network (NFTN) 306 connected to one or more Local Broadband Multimedia networks (LBMHN) 305, 311. For the SMS HFW network 300, the NFTN 306 may serve as the core gigabit fiber Ethernet network, which utilizes fiber optics for multiple interconnections within the backhaul segment of the network. In some embodiments, the NFTN 306 may utilize fiber optics for all interconnections. In such a network, this configuration ensures that any bandwidth requirement for the requested QSL can be provided by the NFTN networks on a real-time demand basis. One of the primary functions of the NFTN is to enable peering of all LBMHNs 305 and 311 to ensure that the real-time bandwidth on-demand requirement is met for QLS service delivery. It should be understood that the LBMHNs shown and described with reference to FIG. 3 are nonlimiting and exemplary only. Those skilled in the art would understand that various configurations and numerous LBMHNs may be envisioned without departing from the scope of the present teachings.

The LBMHN 305 and 311 may provide local wireline and wireless services access which controls the delivery of converged information and communication service either wired or wireless through the use of local access service nodes that supports the identity of the end user databases such as the Consumer Service Identity Database Managers 318 and 320, and Merchant Service Identity Database Managers 319 and 320 as well as Software as a Service (SaaS) 312 and 315, Content as a Service (CaaS) 314 and 317, and Platform as a Service (PaaS) 313 and 316, service application managers. Wireline and wireless service access may be established with the network using one or more access devices, for example, such as a cellular device 304, 307, a personal computer 302, 309, a PSTN phone 303, 308, and a television 301, 310.

As discussed above, the Consumer and Merchant Service Identity Database Managers 318, 319, 320, and 321 can be configured to allow all end-users of the network to be assigned a single GSI within the network for the purpose of accessing services. The GSIs Database Managers can be configured or architected to allow all GSIs to communicate with each other for the purpose of social networking or conducting electronic commercial (e-Commercial) networking. The GSIs can also be used as a security feature for an end-user to control his or her personal identity on the network by restricting access to secure information about the individual who is identified by a particular GSI. For example, the task may include searching for, retrieving, and displaying information regarding a particular product or service on the network for the GSI. Another example is that the task may include searching for, retrieving, and displaying information regarding the discounted sale on a particular product or service on the network for the GSI as a function of the particular physical location of the GSI within a particular LBMHN network.

Reference will be made to exemplary flow charts and diagrams of FIGS. 4-10 to describe how the QSLs are provisioned, priced, and processed. Although the embodiment of FIGS. 4-10 illustrate the manner in which services may be obtained, the present teachings is not limited to the sale offers for services and for generating sale offers for types of services. Instead, the present teachings also relate to sale offers that may be generated and accepted for particular types of goods and sale offers for goods in general.

The Quality of Experience Service Model Provisioning, Pricing, Delivery and Management Algorithm One of the features of the SMS HFW network according to the present teachings is the simplification of the process as to how customers and services are provisioned by using the self-provisioning capabilities of the SMS network under the control of and by the GSI. This differs from the approach of conventional networks in which the provisioning and pricing of communication services provided by the networks are not aligned with their networks' resource utilization as a function of both time and physical location where the service provisioning function is under the control of the GSI through the use of the network policy management capabilities of the SMS network. Currently, many conventional networks provision their customers based on the service type that the customer request, such as Internet access, voice services, video services, etc. and then assign the services to each customer's identity. Typically, once the service type has been assigned and priced to the customer, the service provider starts the process of pricing and selling add-on features and capabilities to the original services. For example, the provisioning of voice services by service providers enables the service provider to initially sell a voice service and immediately start the process of selling add-on features and capabilities such as call waiting, three-way calling, caller ID, etc. From the service providers' perspective, this conventional approach enables the service provider to sell their customers a basic service, such as a voice service offered at a good Quality of Service (QoS), for an initial low price and then to use the add-on features that are critical to making the service truly valuable to the customer as a way to increase the overall price of the service to the customer. However, there are several major drawbacks with this approach.

The first drawback of this conventional approach is that it requires the service providers to speculate in advance which features or add-on capabilities may be valuable to their customers and develop these speculated features as parameters on the network before the service provider can actually track and monitor their customers' usage pattern to determine which add-on features the customers are actually willing to pay for the additional charged fees. The SMS network can be designed to provide basic session's connectivity between and two or multiple end user devices on the network which allows the GSI to automatically provision any additional features and/or capability to a basic session's connectivity through the use of the network policy management capabilities of the SMS network all under the control of the GSI. This self-provisioning approach eliminates the cost of service feature provisioning by the owner of the network and other associated cost, because the function is performed by the GSI. In addition, the GSI is not charged for the utilization of sessions or session features on the network, because the charge to the GSI is based on the QLS service level which was selected by the GSI, when the GSI was originally provisioned on the network by the owner of the network.

Another related drawback with the conventional approach is that in many cases the pricing for the features have little or no correlation between the cost of services charged by the service providers and the network resources required to support the features provided to the customers. Typically, as the pattern of a customer's usage of the same services changes over time, it becomes apparent to the customer that the features were initially arbitrarily priced, which causes the customer to lose confidence in the pricing algorithm of the service provider and as a result causes the service provider to continue to lower the price of the service or service feature over time to prevent its customers from switching to a different service provider. The SMS network eliminates the need for this pricing approach because the GSI controls the session feature provisioning process and therefore, the pricing in real-time due to the self-provisioning capabilities of the SMS network. As such, the GSI is not charged based on the use of these sessions or session features, but charged based on the QLS service level that was selected by the GSI, when the GSI was originally provisioned on the network by the owner of the network.

An additional drawback is that the conventional approach which forces every customer to use the features in the same manner ignores the basic principle that each customer is unique and the customer's service needs most likely will change as a function of time, degree of mobility, and physical location. The conventional approach to the design of network services feature implementation, for example, voice, data, or video service's features, are based on treating the voice, data, or video service as having a fix allocation of network resources and as such these services cannot be changed or modified in real-time or by the user. Therefore, the voice, data, or video services' features can only work in the manner in which they were originally designed for a given network. The SMS network eliminates these restrictions because the SMS network utilizes a standard session connectivity approach which is the same for any service type or form such as voice, data, video, and/or multimedia service. In addition, the present teachings enable the GSI to utilize the network self-provisioning policy management capabilities of the SMS network to design and/or provision any service feature capabilities required for a voice, data, and/or multimedia service session. This capability allows each GSI to uniquely configure their own features and capabilities for any voice, data, video, and/or multimedia service session within the SMS network customized to the GSI's requirement for use. For example, conventional call-waiting programs are provided to every customer in the same manner. The end user is presented with a take-it-or-leave-it situation with no options to modify the parameters, terms and conditions as to how the end user receives the call-waiting feature. Therefore, the PSTN network is fixed and rigid. In contrast, the present teachings enable customers to customize their individual features. The self-provisioning capability enables customer A to establish its call-waiting parameters in a manner that differs from customer B such that the SMS network answers the call waiting calls for customer A differently than call waiting calls customer B. For example, customer A's call-waiting parameters can be configured by customer A such that, if a call from a predefined telephone number of a business associate is received while customer A is conducting another telephone conversation, the SMS network can be program to play the message, "I'm currently on another call which should be completed shortly. Please call back in 10 minutes." Another example is that, when calls are received from one or more telephone numbers within a specified group, such as from a member of the user's family, customer's A call-waiting parameters can be configured to play the message, "I'm currently on the phone, but should be home for dinner at 6:00 pm." Although the above examples relate to the call-waiting feature of a network, it will be apparent to those skilled in the art that various modifications and variations can be made to the user-controlled, -managed, and -programmed capabilities of the SMS network without departing from the scope of its teachings. By way of further examples, the present teachings of the SMS network can also be applicable to the delivery of any type of Internet services such as e-mail, downloading music, videos, television shows and movies, and the delivery of electrical and water services provided to a residence or business entity. Thus, the policy-centric SMS network enables the users to set and define the policies to control how they receive services delivered by the network. Intelligences and procedures are designed throughout every component and element of the SMS network to permit the end users to define how the types of services and net work resources will be delivered to and used by each end user. In other words, the SMS allows the end user to customize the network to work according to the end user's needs.

In additional to changes within the customer's usage pattern of the same service, a customer's usage pattern can change from an existing service to a new, more technological advance service. For example, voice services were once considered by the network service providers as the most important communication service and as such all voice services were priced at very high service pricing levels, non-negotiable pricing levels although the voice services, as well as the voice supplemental services such as call waiting, three-way calling, caller ID, required the use of very limited network resources. However, once its customer usage patterns changed from voice services to mobility, messaging, and the use of the Internet with cellular phone, the service provider, while providing its services based on a QoS platform, has had to substantially reduce the price for basic voice services to match the real network resource utilization cost and as such provide voice supplemental services such as call waiting, three-way calling, caller ID, etc. as free services. Oftentimes, the needs of customers may change overtime and the network may fail to adjust accordingly to its customers' needs. Therefore, the services provided to the network service provider's customers may become less valuable to the customer and as such the customer may place less value on having the service because the service cannot be readily adapted to the customer's needs. However, the present teachings enable customers to change the service LOGIC through the utilization of the network policy management capabilities of the SMS network, such that the service can be easily adapted and customized to the changing needs of the customer by the customer and as such be can continuously updated based on the customer's changing needs through service LOGIC that is readily available to the customer and manageable by the customer using the network policy management capabilities.

Use of the SMS HFW network according to the present teachings addresses the drawbacks and problems of the pricing of communication services not being aligned with the network resource utilization of conventional networks. The multi-service HFW network, in comparison to conventional networks, redefines how communication services are delivered and priced. The design of low cost SMS HFW networks are based on Internet Protocol (IP) networking, which dramatically reduces the expense, time, and complexity of the network configuration such that the pricing of communication services can more accurately match the real network resource utilization. Various embodiments of the SMS HFW network also provide an Intelligent Service Management (ISM) Platform which is configured with the flexibility to allow the customers to conveniently change or modify their services as the customers' needs change over time through the utilization of the network based policy management capabilities of the SMS network, thereby, enabling the end user self-provisioning of network based communication services. The ISM Platform design can be designed based on the Quality of Experience (QoE) of communication services, shown for example in FIG. 2, as opposed to the conventional Quality of Service (QoS) for a communication connection approaches. This feature of the present teachings allows each customer to provision his or her own communication service experience by selecting a QoE Service Level (QSL) such as, for example, a silver, gold, or platinum level by using the ISM Platform, referred to as the Service Access Manager (SAM) 312, 315. Alternatively or conjunctively in various embodiments, the customer can use the SAM 312, 315 to custom engineer his or her own communication service level experience.

The SAM 312, 315 can be designed to determine QSLs such as, for example, a silver, gold, or platinum level for each customer during the service self-provisioning process based upon the network resources required to deliver all communication sessions and transactions on the network for a particular customer. For instance, the QSL silver, gold or platinum level service price calculated for one customer may differ from the QSL silver, gold or platinum level service price calculated for another customer. Using an algorithm such as a network resource pricing algorithm, the SAM QSL provisioning algorithm can be designed to compute the minima network resources required to implement the QSL requested by the customer and as a result allow the end user to automatically engineer their own communication service price. This capability allow the end user to test and experiment with different types of service experience settings that provided by the SMS communication network and automatically select the best price that match the end user's communication needs at that particular time. The network resource pricing algorithm can be based on one or more attributes such as the pricing for computer memory and storage resources, central processor and controller resources, transmission bandwidth resources, network operation support resources, customer care resource, etc. coupled with an overhead and profit mark-up. The SAM 312, 315 can manipulate the numerical information and data associated with the relevant attributes to calculate the prices for the QSL communication services and to produce a display indicating the prices available to the customer for communication service selection at that time.

However, as mentioned above, should the customer decide not to select a calculated QSL, the SAM 312, 315 enables the customer to customize his or her own QSL. If a service price calculated at a particular service level exceeds the affordability of the customer, the customer has the option to select a different QSL or the customer can enter the SAM custom engineering mode and custom engineer his or her own QSL communication service price to match customer's affordability. Once the customer has selected the QSL, the customer has the option to add features and capabilities to his or her selected QSL and the SAM 312, 315 will automatically recalculate the new price based on the network resource pricing algorithm. The customer also has the option to re-enter the SAM at anytime and change his or her QSL selection or any capability or add-on feature as the customer's needs and financial circumstances change.

The pricing model of the SMS network may be configured to provide the same communication service for various experience levels through a unique broadband access service portal design that allows any capable end user device to dynamically connect through other broadband private or public wireless networks or through other private or public wireline networks and provide the same service level experience as a function of price via a secure connection. The SMS network enables each end user to provision his or her own virtual network through the use of web portals. By provisioning their own networks, each end user establishes a commercial relationship with the owner of the SMS network.

The Quality of Experience Service Model Provisioning Process

Figure 4:
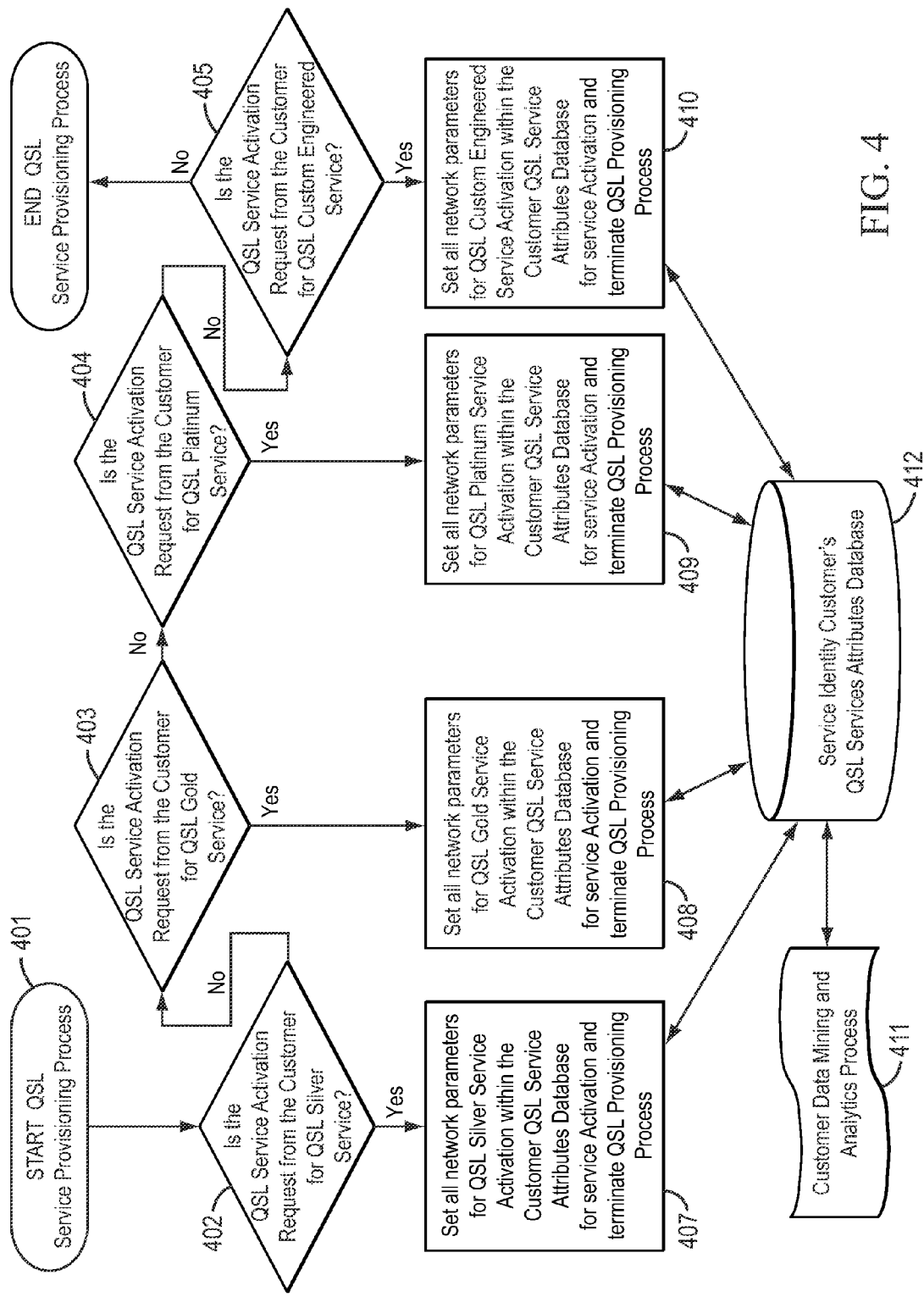
FIG. 4 is an exemplary flow chart illustrating how a user interacts with a Service Access Manager (SAM) of the SMS communication network to provision services received from the network.

FIG. 4 is an exemplary flow chart illustrating the features and operations of the SAM for providing the service provisioning process. FIG. 4 illustrates steps used by the SAM 312, 315 to manipulate the numerical information and data to calculate and produce the QSLs. The SAM 312, 315 database can be configured to receive a personalized identifier, such as a QSL, that identifies the customer and receive service activation requests from the customer. Generally, as shown in FIG. 4, the process begins in Step 401 where the SAM service provisioning algorithm determines what QSL level of service the end user is requesting. This process advances to Step 402 where it determines whether the end user is requesting to be assigned Silver QSL service. If in Step 402, the service provisioning request is for the Silver QSL service, the provisioning algorithm advances to Step 407 to initiate the Silver QSL services. At Step 407, the provisioning algorithm sets all network parameters for QSL Silver Service Activation such as Global Service Identity (GSI), GSI Secure Preferences (e.g., User Names, Dial Number, Address, etc), GSI Service Quality Preferences (e.g., Voice Codec, Video Codec, Service Bandwidth, etc.), GSI Service Form Preferences (e.g., Voice, Data, Video, Multimedia, etc.), GSI Service Provisioning Preferences (e.g., Non-Provisioned Service, Provision Service, Combination, etc.), and GSI Service Location Preferences (e.g., fix service, mobility service, combination, etc.) within the Customer QSL Service Attributes Database 412 for service Activation.

If in Step 402, the customer is not requesting the Silver QSL service, the provisioning algorithm proceeds to Step 403 and checks to determine if the customer is requesting to be assigned Gold QSL service. If in Step 403 the service provisioning request is for Gold QSL service, the provisioning algorithm advances to Step 408 to initiate the Gold QSL services. At Step 408, the provisioning algorithm sets all network parameters for the QSL Gold Service Activation such as Service Identity (SI), SI Secure Preferences (e.g., User Names, Dial Number, Address, etc), SI Service Quality Preferences (e.g., Voice Codec, Video Codec, Service Bandwidth, etc.), SI Service Form Preferences (e.g., Voice, Data, Video, Multimedia, etc.), GSI Service Provisioning Preferences (e.g., Non-Provisioned Service, Provision Service, Combination, etc.), and GSI Service Location Preferences (e.g., fix service, mobility service, combination, etc.) within the Customer QSL Service Attributes Database, 412, for service Activation.

In Step 403 if the customer is not requesting Gold QSL service, the provisioning algorithm advances to Step 404 and checks to determine if the customer is requesting to be assigned the Platinum QSL service. In Step 404 if the service provisioning request is for Platinum QSL service, the provisioning algorithm initiate the process in Step 409 for the Platinum QSL services by establishing all network parameters for QSL Platinum Service Activation such as Global Service Identity (GSI), GSI Secure Preferences (e.g., User Names, Dial Number, Address, etc), GSI Service Quality Preferences (e.g., Voice Codec, Video Codec, Service Bandwidth, etc.), GSI Service Form Preferences (e.g., Voice, Data, Video, Multimedia, etc.), SI Service Provisioning Preferences (e.g., Non-Provisioned Service, Provision Service, Combination, etc.), and GSI Service Location Preferences (e.g., fix service, mobility service, combination, etc.) within the Customer QSL Service Attributes Database 412 for service Activation.

In Step 404 if the customer is not requesting the Platinum QSL service, the provisioning algorithm advances to Step 405 and checks to determine if the customer is requesting to be assigned Custom Engineered QSL service. In Step 405, if the service provisioning request is for Custom Engineered QSL service, the provisioning algorithm initiates a Custom Engineered QSL process in Step 410. The provisioning algorithm in Step 410 sets all network parameters for QSL Custom Engineered Service Activation that has been defined by the end user such as Global Service Identity (GSI), GSI Secure Preferences (e.g., User Names, Dial Number, Address, etc), GSI Service Quality Preferences (e.g., Voice Codec, Video Codec, Service Bandwidth, etc.), GSI Service Form Preferences (e.g., Voice, Data, Video, Multimedia, etc.), GSI Service Provisioning Preferences (e.g., Non-Provisioned Service, Provision Service, Combination, etc.), and GSI Service Location Preferences (e.g., fix service, mobility service, combination, etc.) within the Customer QSL Service Attributes Database 412 for service Activation.

If in Step 405 the customer is not requesting Custom Engineered QSL service the Services provisioning the process ends at Step 406. Once all provisioning parameters are set for the customers within the customer database 412, the data is then used by the data mining and analytics system 411 for the purpose of collecting data regarding, for example, a customer's usage patterns and the number of merchant transaction conducted by the customer as a function of time and physical location. The data mining and analytic system may also collect data in real-time such as recording the physical location where the merchant transaction occurred by using the coordinates and information gathered by global positioning satellites (GPS) or other similar methods such as for example cell site triangulation within private wireless access networks to collect data and/or to record the physical location where the merchant transaction occurred to offer real-time service discounting to the customer. The real-time offerings can be implemented using the GPS or a similar method such as for example cell site triangulation within private wireless access networks in conjunction with data comparisons of the customer's network transactions history. The system and method can track, collect and store data regarding the customer's network transaction usage to establish each customer's buying pattern as a function of time and physical location, etc. In various embodiments, the process in FIG. 4 may be configured to determine the customer's network usage pattern prior to initiating the pricing algorithm. The pricing algorithm can use data from the Customer QSL Service Attributes Database 412 to compute pricing for the utilization of network resources.

The Service Access Manager (SAM) QSL Preferred Lowest Cost Automatic Pricing Algorithm In accordance with the principles of the present teachings, FIG. 5 is an exemplary flow chart that illustrates the major processes of the SAM service QSL preferred lowest cost automatic pricing algorithm, which is determined based on the end customer's QSL service level requirement. The Price Assignment Process Algorithm initiates the process in Step 501, by first determining whether or not a customer has requested to receive Silver, Gold, or Platinum QSL service. In Step 502, if the customer is a Silver, Gold, or Platinum QSL service level customer, the QSL Price Assignment Process Algorithm begins the Standard Price Assignment Process in Step 503, by collecting Service Identity Network Parameters from the Customer Database 508 to be used for the preferred pricing to the customer for service transactions. This approach ensures that the end customer always gets the lowest price for any standard service transaction available via the Silver, Gold, or Platinum QSL service level. In addition, the Standard Price Assignment Process, in Step 503, also assigns a Standard Pricing Factor that is a function of the number of financial transactions conducted by an end user occurring over a predetermined period of time such as a day, a week, a month, etc., which can be based on the customer's Network Resource Utilization Parameters for Silver, Gold, or Platinum QSL Services. Once the Standard Price Assignment Process computes the Standard Pricing Factor in Step 503, it then assigns a Customer Discount Pricing Factor based on specified discount levels for network based merchant financial transactions that have been completed by the customer and the value of those transactions over a predetermined period of time such as a day, a week, a month, etc. The Standard Price Assignment Process in Step 503 then checks for any additional Customized Service Charges in Step 504 that may be attached to the service transaction depending on the end customer's request for additional services. If a customer requests additional customization of standard services in Step 504, then the process requests the Customized Price Assignment Process in Step 507 to collect the Global Service Identity QSL Service Network Parameters from the Customer Database 508. The process then activates the customer input data analysis and price calculation process in Step 506 to compute a One-time Customized Service Usage charge. In addition or in conjunction therewith, the process can set the One-time Customized Service Usage charge calculation to be subsequently designated as the standard (per-time) usage charge and may then request an additional calculation for a new Monthly Service Charges that can be stored in the Customer Database 508 for use as the standard monthly service charge.

The process can conduct further data analysis in Step 506 based on the customer's historical usage data, which has been collected over time to provide additional cost reductions based on the Standard Price Assignment Process in Step 503 and/or the Customized Pricing Assignment Process in Step 507. The Customer's QSL Services Pricing and Service Management Database 508 can also be configured to process and manage the customer's QSL service request, as well as additional customized service requests. If a customer declines the option to select the additional customized service options, the process then activates the Standard Price Calculation Process in Step 505 and enters for the customer a standard Monthly Service Charge, which is computed by the customer input data analysis and price calculation process in Step 506. The Standard Price Calculation Process in Step 505 may also be configured to include any discounts due to the customer based on historical usage data that has been collected over time and stored in the Customer's QSL Services Pricing and Service Management Database 508 and terminate the QSL service pricing process.

The process can be configured such that a customer has the option to reject the Silver, Gold, or Platinum QSL service and, instead, requesting pricing for Custom Engineered Service in Step 509. The process also provides the customer with the option not to accept the Custom Engineered Service option, and if so, the Price Assignment Process Algorithm ends in Step 510. However, if the customer accepts the Custom Engineered Service option in Step 509, the process activates the Custom Engineering Price Assignment Process in Step 513 such that the Service Identity Network Parameters from the Customer's QSL Services Pricing and Service Management Database 508 can be accessed and used for preferred pricing to the customer for service transactions in Step 513. This approach ensures that the customer always gets the lowest price for any custom engineered service transaction available via the Custom Engineered QSL Service Level. In addition, the Custom Engineering Price Assignment Process in Step 513 can also be configured by the SMS network to assign a Pricing Factor which was selected based on the specific customer during the service provisioning process which can be determined as a function of the number of financial transactions conducted by a customer occurring over a predetermined period of time such as a day, a week, a month, etc., which can also be based on the customer's Network Resource Utilization Parameters for the Custom Engineered QSL Service. After computing the Custom Engineered Pricing Factor, the Custom Engineering Price Assignment Process in Step 513, then assigns the customer preselected Customer Discount Pricing Factor based on specified discount levels for network based merchant financial transactions that have been completed by the customer and the value of those transactions as determined for a fixed period of time such as a day, a week, a month, etc. This approach allows the SMS network to continuously evaluate the value of each customer such that the network automatically offers to the customer the current lowest possible price.

The Custom Engineering Price Assignment Process in Step 513 then advances to Step 511 to check whether any additional Customized Service Charges, 504 should be charged to the service transaction depending on the customer's request for additional services. If a customer requests additional customization of Custom Engineered Services in Step 511, then the process sends a request to the Customized Price Assignment Process in Step 507 to collect the Global Service Identity QSL Service Network Parameters from the Customer Database 508. The process then activates the customer input data analysis and price calculation process in Step 506 to compute a One-time Customized Service Usage charge and/or set this calculation to be subsequently designated as the Custom Engineered (per-time) usage charge. The process may then request an additional calculation for a new Monthly Service Charges that may be stored in the Customer Database 508 for use as the Custom Engineered monthly service charge.

The process can conduct further data analysis in Step 511 based on the customer's historical usage data that has been collected over time to automatically provide additional cost reductions based on the Custom Engineered Price Assignment Process in Step 513 and/or the Customized Pricing Assignment Process in Step 507.

The Customer's QSL Services Pricing and Service Management Database 508 can be configured to process and manage the customer's QSL service request, as well as additional customized service requests. If a customer declines the option to select additional customized services, the process then activates the Customized Price Calculation Process in Step 512 and enters for the customer the Custom Engineered Monthly Service Charge, which is computed by the customer input data analysis and price calculation process in Step 506, as well as any discounts due to the end user based on historical usage data that has been collected over time and stored in the Customer's QSL Services Pricing and Service Management Database 508.

The Multi-Network QLS Service Delivery and Management Algorithm Based on the Service Latency Quality Index (LQI) Rating FIG. 6 is an exemplary flow chart illustrating the features and operations of the Algorithm that enables the SMS Network to seamlessly transition active service transactions to an alternative network by adjusting the Service Latency Quality Index (LQI) rating to match the alternative network performance capabilities when the customer's device requests a service transition to an alternative network. This algorithm can be configured to also perform interoperability between next generation networks such as SMS network hybrid fiber-wireless networks and legacy networks such as the PSTN, Cable, and Public Cellular Networks. This service interoperability can be based on the Service LQI Rating which defines the Quality of Experience (QoE) that a customer will experience on a communication network at any point in time. The Multi-Network QLS Service Delivery and Management Algorithm can be designed to dynamically control and adjust the customer's QoE on the communication network as the customer's device transitions from one type of network to another type of network to maintain the consistency of the customer's communication experience between networks that have different performance capabilities.

The system and method initiates the Multi-Network QLS Service Delivery and Management Algorithm in Step 601 when a customer's device sends a request to transition an active service transaction from one type of network channel to another type of network channel operating on a different network that does not have the same capabilities by first determining whether the customer is currently active on a Silver, Gold, Platinum, Custom Engineered QSL service transaction in Step 602, 604, 606 and 608. If the customer is actively engaged in a service transaction as a Silver, Gold, Platinum, or Custom Engineered QSL Service Level Customer in Step 602, 604, 606 or 608, the Multi-Network QLS Service Delivery and Management Algorithm activates the collection of the network parameters in Step 603, 605, 607 or 609 for the QLS Service Level of the particular customer type such as Silver, Gold, Platinum, or Custom Engineered. The Multi-Network QLS Service Delivery and Management Algorithm then determines whether the targeted network to be transitioned to has the Service Latency Quality Index (LQI) Rating capabilities in Step 610 to enable the Multi-Services Network to transition the active service transaction or session seamlessly to the targeted alternative network. If the targeted alternative network has the network performance capabilities to seamlessly receive the active service transaction or session, then the Multi-Network QLS Service Delivery and Management Algorithm uses the Service LQI Rating parameters as defined by the SMS Network to set the LQI rating parameters for the targeted alternative network in Step 612. Then, the process seamlessly transfers the active service transaction or session to the targeted alternative network and the Multi-Network QLS Service Delivery and Management Algorithm ends in Step 613. If the targeted alternative network does not possess the network performance capabilities to seamlessly receive the active service transaction or session, then the Multi-Network QLS Service Delivery and Management Algorithm in Step 611 modifies the Service LQI Rating parameters as defined by the SMS Network to create a new set of LQI rating parameters for the targeted alternative network. Then, the process seamlessly transfers the active service transaction or session to the targeted alternative network and ends the Multi-Network QLS Service Delivery and Management Algorithm in Step 613.

A Next Generation Converged Communication and Information Virtual Mesh Networking Model for Shared-Value Consumer-Merchant E-Commerce Networking The evolution in the Internet protocols technology has enabled the design of a Virtual Mesh Networking (VMN) architecture capability in accordance with the present teachings which allows any user on an all IP network within a private or public IP network to dynamically connect to each other directly with the intervention of third party networks. This VMN network architecture model, in turn, provides an all Internet Protocol (IP) converged information and communication network that enables consumers and merchant to interact directly with each other. This VMN model also can allow any end user entity, consumer or merchant, conducting transactions on an VMN architected network to create virtual IP communication channels via wired or wireless access network connections to any other end user entity, consumer or merchant, on a global VMN network for the purpose of e-commerce networking, social networking, and/or advertising between end user entities, consumers and/or merchants, without the need for conventional intermediaries. Use of this converged communication and information VMN Model to conduct e-commerce, social networking and advertising can substantially reduce the cost for both consumers and merchant. One of the features of the VMN Model is the design of a next-generation converged communication and information network shared-value consumer-merchant e-commerce networking model that rewards both consumers and merchant for interacting directly with each other using a unique biometric based security transaction algorithm, thereby, reducing the cost of communication services to consumers and reducing advertising cost to merchants. One of the keys to encouraging both consumers and merchants to use the shared-value consumer-merchant e-commerce networking model is its security approach which can be implement using a Secure Channel BioMetric Transaction (SCBT) Algorithm. This SCBT Algorithm uses a combination of finger printing and voiceprint sampling to uniquely identify the Consumers GSI independent of the end user device that the Consumers might use to complete the e-commerce transaction with the merchant. In addition, this shared-value consumer-merchant e-commerce networking model can be configured to use a Smart Multimedia Broadband Hybrid Fiber-Wireless (HFW) Network, which is based on the concept of virtual mesh networking that utilizes relational databases, search engines, and data mining technologies that allow consumers and merchants to establish secure virtual e-commerce networking relationship, similar to social networking relationships, to conduct Secure e-commerce transactions based on the SCBT Algorithm through a real-time automated secure relationship facilitated by a Smart Multimedia Broadband HFW with VMN capabilities.

This smart multimedia network enables both the consumers and merchant to establish databases that can automatically interact with each other when required, but only under the control of the consumers and/or the merchant to facilitate privacy and security for all interactions or transactions. Descriptions of the basic concepts, privacy and security features of the consumer and merchant database are provided below. In general, the smart multimedia network enables the consumer to enter data to configure a consumer database based on the consumer's Global Service Identity (GSI) data which is controlled by the consumer. When the user enters the data, the network is configured to permit the consumer to segment the consumer data into a relational database that uniquely characterizes the consumer from the perspective of stored consumer biometric data such as fingerprint and voiceprint which can be used in combination to strictly control and secure the consumer's private data through the use of the SCBT Algorithm. Examples of such secured data may include the actual name of the consumer, the actual home address, and additional information such as yearly salary, employer, business affiliations, country of origin passport number, etc. The consumer can enter his or her information via the self-provisioning process of the SMS network such that it is segmented into confidential and private data that is known only to the network and the consumer such that the consumer is protected during any transaction through the use of the SCBT Algorithm. The network can be configured such that disclosure of this secured data is controlled by the consumer through the use of secure electronically transaction supported by the SMS network in real-time through the use of biometric technology such as electronic fingerprint, voiceprint or a combination of multiple biometric features which is embodied in the use of the SCBT Algorithm. This information can be stored in each consumer's database and referred to as the Consumer's Security Identity Attributes (SIAs). In addition to restricted access, there is also restricted use of the SIAs such that they are used only to complete a final transaction between a consumer and a merchant under the control of the consumer and the network through the use of the SCBT Algorithm.

The consumer's database can also contain additional consumer demographic and transactional data defined as Networking Identity Attributes (NIAs). Exemplary NIA transactional data regarding a consumer can include information such as commercial products purchased over a predetermined period of time, commercial services purchased over a predetermined period of time, and locations traveled to within a predetermined period of time, etc. Exemplary NIA demographic data can include consumer profile information such as age, sex, race, national origin, etc. The system can also be configured to dynamically monitor, track, store and update the NIAs as a function of physical location. For example, the system can monitor and record NIAs, in real-time, to gather information regarding a consumer's physical location during a commercial transaction or to gather a consumer's current physical location relative to a merchant's physical location to offer specials products or services or special discounts on products or services. The consumer database can also be configured to contain other information such as Communication Services Attributes (CSI), which identifies the type of communication devices owned and used by the consumer when interacting with and conducting e-commerce transactions over the network. Based upon the user's devices, the consumer can enter the CSI information to identify the communication and information services that the consumer wishes to utilize from the smart multimedia network on a local, national or global basis. Different consumer devices can be equipped and programmed with different features and capabilities to support different forms of communication services such as voice, data, video, or multimedia based on the particular device. For example, the communication device can be a cellular phone and/or PC equipped display and camera capabilities such that the merchant's product can be displayed during a real-time interaction with the consumer via a video chip. Likewise, the user can employ a cellular phone and/or PC to show the merchant in real-time a picture or video of exactly the product or service that the consumer is seeking to purchase.

In addition, the consumer's database can also be configured to include information that may be compiled based on a complete and continuous analysis of the commercial economical value of each consumer and merchant registered on the network from the perspective of the e-commerce transactions conducted on the network within a predetermined period of time. This information can be referred to as the consumer's E-Commerce Value Attributes (EVA). One of the differences between the consumer's EVA and the consumer's SIA, NIA, and CSI is that the EVA is not a parameter used by the consumer, but rather by the network service provider and/or merchants on the network. Based on the consumer's EVA, the network service provider and/or merchants can offer to the consumer automatic communication service discounts and automatic commercial products and services at discount rates provided by merchant on the network as a function of a particular customer's EVA. The EVA is one of the parameters that can be used by the network service provider and merchants for offering product and service discounts to a particular customer on the network because the EVA is the parameter that determines the relative value of each customer on the network. The network service provider can also use the EVA to offer discount pricing to high value merchants that earn a high Value Rating Factor based on the number of transactions conducted with consumers over the smart multimedia network within a predefined period of time. The combination of the SIA, NIA, CSI, and EVA parameters can be used to uniquely identify a consumer within the context of an all-IP smart multimedia global network for conducting e-commerce networking, social networking, and advertising between consumers and merchants.

Similar to the consumer database, the smart multimedia network also enables merchants to configure a merchant database based on the merchant's Global Service Identity (GSI) data which can be entered into the merchant database and controlled by the merchant. The network also enables the merchants to segment merchant data into a relational database that uniquely characterizes the merchant's products and services from the perspective of the merchant's proprietary information such as business and marketing strategy data which the merchant wishes to strictly control. Examples of the merchant secured data can include information such as pricing plans and strategies, discounts schedules, product suppliers, other business relationships, employee information, etc. that the merchant wishes to keep confidential and private. Disclosure of the merchant secured data can be controlled such that it is only known to the network and the merchant and can only be disclosed through a secure electronically real-time transaction by an authorized employee of the merchant's business through the use of biometric technology such electronic fingerprint, voiceprint or combination of biometric features provided by the SCBT Algorithm. This information can be stored in each merchant's database and referred to as the merchant's Security Identity Attributes (SIAs). The SIAs can also be established having restricted use such that they are only used when authorized by the merchant for the purpose of conducting authorized business transactions through the use of the SCBT Algorithm. The merchant's database can also be configured to establish Merchant Networking Identity Attributes (NIAs), which define information for conducting e-commerce transactions such as commercial products and services available for purchase, product and services marketing information, products and services pricing information, direct and targeted product and service advertising information, etc. The merchant's database can further be configured to contain information such as Merchant Communication Services Attributes (CSI), which specifies the type of communication devices and communication service connections such as voice, video, or data that can be used when conducting e-commerce transactions with merchant. The merchants can also use the CSI to identify the communication and information services that the merchant wishes to utilize for conducting e-commerce transactions over the smart multimedia network on a local, national or global basis. In addition, the merchant's database can include information collected from continuous profiling of customers such as their purchasing habits, their buying patterns, and the effectiveness of marketing strategies, etc. in order to understand and assess the commercial economical value of each consumer registered on the network from the perspective of the e-commerce transactions conducted with a merchant within a predefined period of time. In addition, to e-commerce transactions conducted with a merchant within a predefined period of time the SMS network can collect other marketing and/or profiling data about the consumer to enhance the potential of the consumer becoming a customer of the merchant. This information can be tracked by the network for each consumer on behalf of the merchant and stored in the merchant's database as the consumer's E-Commerce Value Attributes (EVA). A merchant on the network can use the consumer's EVA data to offer consumers automatic product and service discounts and special products and/or services based on the consumer's unique demographic profile. Another attribute that can be calculated on behalf of a merchant by the SMS network is a risk rating of conducting a transaction with a merchant. This risk rating can be determined by performing a risk assessment that calculates the risk for a consumer to engage in a commercial transaction with a merchant over the network. The SMS network can be configured to make a determination, based on the calculated risk rating and risk assessment, whether to submit a request from the consumer to a particular merchant. If the SMS network determines that a merchant's risk rating and risk assessment fall within an acceptable risk threshold, then the network will transmit the consumer's request to the merchant. It is further noted that the merchant EVA can be used by the merchant to operate in a consumer mode to purchase goods and services from other merchants registered on the SMS network. The SMS network can be configured such that each time the merchant conducts a transaction as a consumer the merchant receives a negotiated discounted price or various discounts and specials that the SMS network negotiates on behalf of the merchant. As a result, the network can be configured to receive compensation for every type of transactions, such as business-to-business transactions and business-to-consumer transactions, conducted over the SMS network.

Figure 7:
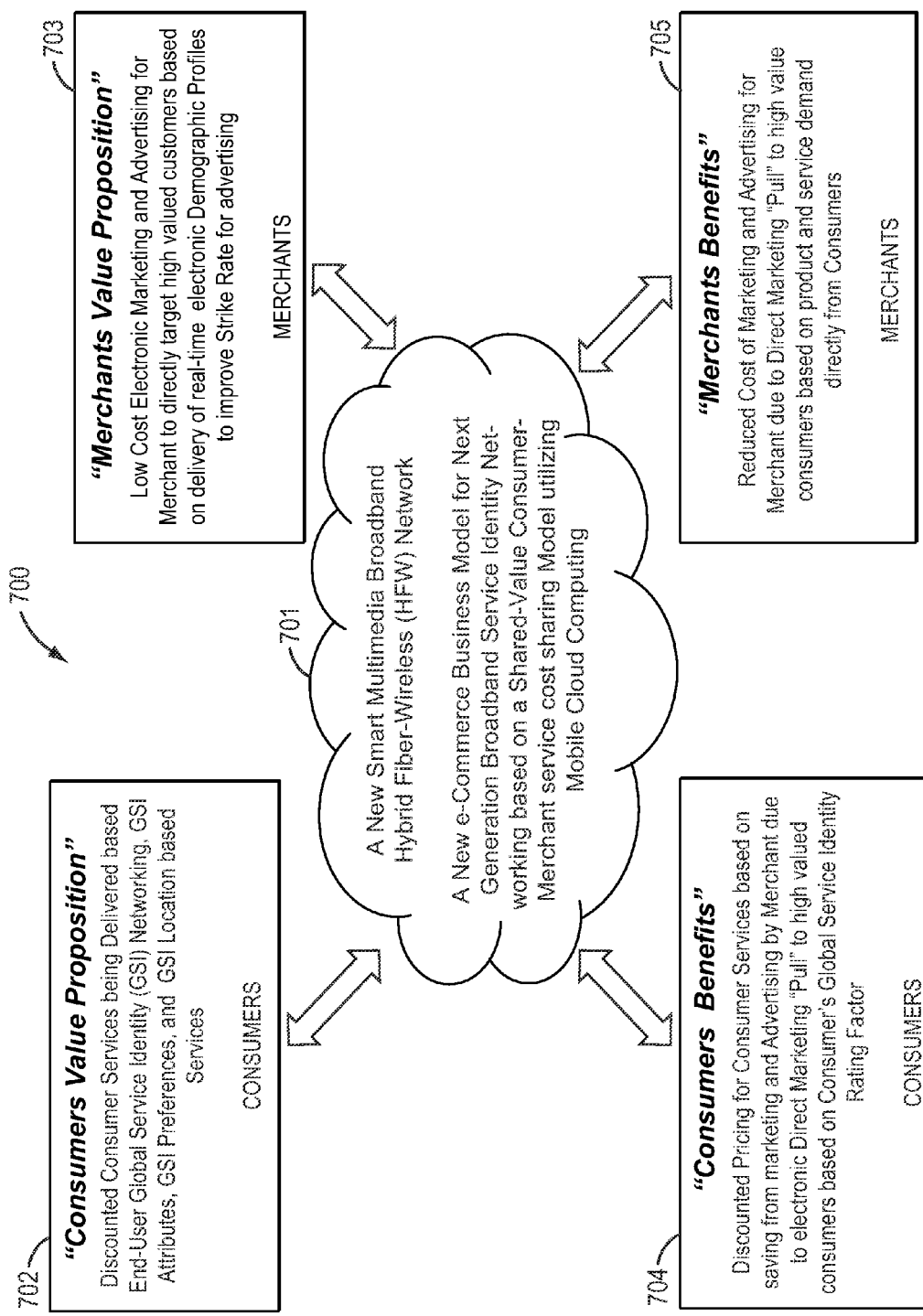
FIG. 7 illustrates an exemplary embodiment of a shared-value consumer-merchant e-commerce Global Service Identity (GSI) Networking Model in accordance with the present teachings.

The Shared-Value Consumer-Merchant E-Commerce Global Service Identity (GSI) Networking Model FIG. 7 illustrates the features of an exemplary shared-value consumer-merchant e-commerce Global Service Identity (GSI) Networking Model 700, which allows consumer and merchants to virtually interact over a Multi-Services Network to conduct private commercial transactions without the merchant having access to the consumer secure identity information until the commercial transaction is agreed to by the consumer and merchant. The consumer can conduct the commercial transaction using a GSI that is assigned to the consumer by the Multi-Services Network for the purpose of automatically requesting, for example, the same or a better commercial pricing, product and services features, product and services availability data simultaneously from different merchants regarding similar products and/or services. This feature enables the Multi-Services Network to perform a complete competitive analysis of products and services for the consumer in real-time such that the consumer can make a selection of products and/or services based on the most current data available from all merchants that are willing to compete simultaneously to sell the product to a particular GSI "consumer". One feature of this approach is that the consumer and merchant are connected to each other in a peering relationship on the same Smart Multimedia Broadband Hybrid Fiber-Wireless (HFW) Network 701, which provides the consumer real-time access to, for example, all pricing, product and services features, product and services availability data regarding similar products and services being offered simultaneously from all merchants that are registered on the Smart Multimedia Broadband Hybrid Fiber-Wireless (HFW) Network 701 that are interested in selling the product and/or service to the consumer. In other words, the network can be configured to monitor and collect such consumer product and services information at any point in time, as well as in real-time as a function of the consumer's physical location to aid consumers in their purchasing decisions.

In FIG. 7, the GSI Networking Model can include a consumer value proposition database 702 for retrieving and storing at any time for the consumers the best available prices for the products and/or services being offered by the broader merchant community that is registered on the SMS network. Having access to the consumers' NIA, CSI and EVA information serves as an incentive to the merchant to provide the consumer's GSI with the best offer because the SMS network can determine the statistical probability of completing a successful sale for the merchant if the merchant can make the most compelling sales offer to the consumers' GSI based on the merchant's current business constraints or strategies automatically as currently defined within the network by the merchant. The shared-value consumer-merchant e-commerce Global Service Identity (GSI) Networking Model can be designed to allow the consumer's GSI to make direct requests for products and services that may be available from all merchants that are registered on the SMS network. This feature potentially eliminates the need for broadcast type "Push" Advertising system where the merchant offers unsolicited products and services to the consumer, which is inherently expensive for merchant with very low probabilities of making successful sales. The shared-value consumer-merchant e-commerce Global Service Identity (GSI) Networking Model can be further configured to allow merchants to view the statistical probability of completing a successful sale before the merchant makes an offer to sell the product or service.

The merchant value proposition database 703 stores data that allows merchants to dynamically lower their marketing and selling cost while increasing the probability of a success sale. The shared-value consumer-merchant e-commerce Global Service Identity (GSI) Networking Model also allows the merchant to access electronic demographic profiling information regarding high-valued consumers for electronic marketing and advertising purposes within the SMS networking community based on the consumer's EVA. The consumer benefit database 704 stores information to analyze the cost reductions calculated based on the cost that has been traditionally paid by the merchant for access to consumer sales opportunities because the merchant is now provided direct real-time access to the consumer's GSI profiling information through the SMS network. This approach allows merchant and the owner of the SMS network to collaborate with, pass onto and share with the consumers some of the cost reduction savings that will result from reduced marketing and advertising cost by utilizing the shared-value consumer-merchant e-commerce Global Service Identity (GSI) Networking Model. This cost reductions and savings sharing arrangement can be used to encourage consumers to make more frequent e-commerce transactions on the SMS network. For example, the cost saving passed to the consumer can be determined as a combination of lower monthly communication service charges as function of the number of transactions that are performed by the consumer within a given month or determined based simply on savings on products and services purchased directly from merchants that resulted from lower marketing and advertising costs. The merchant benefit database 705 can be provided to offer real-time access to consumer's GSI profiling information, reduction in marketing and advertising costs and the utilization of a "Pull" based advertising approach which means the consumer is requesting or soliciting the product and/or service directly from the merchant verses the "Push" based advertising approach where the merchant must advertise to the consumer to convince the consumer to request the product and/or service. The "Pull" based advertising approach is less expensive than today's "Push" based advertising approach because the merchant does not have to advertise to the consumer to convince the consumer to request the product and/or services. For example, in today's broadcast "Push" advertising approach, the merchant does not have access to any real-time direct data on a specific consumer that might view the advertisement of their product or service in real-time and as such the merchant does not have the ability to automatically customize the advertising messages to a particular consumer in real-time to improve the probability of making a sale to the consumer. However, through the shared-value consumer-merchant e-commerce Global Service Identity (GSI) Networking Model of the present teachings, the merchant is capable of receiving a direct request from the consumer's GSI which is a "Pull" based advertising approach for the product and/or service that the consumer is seeking electronically and as such the merchant has direct access to the consumers' profile and EVA. As a result, the merchant can make adjustments to the product or service advertisement, pricing, delivery date, etc, in real-time while electronically interacting with the consumer, thereby, increasing the probability of successfully completing a sale to the consumer.

The Shared-Value Consumer-Merchant E-Commerce Global Service Identity (GSI) Naming Architecture FIG. 8 illustrates an exemplary shared-value consumer-merchant e-commerce Global Service Identity (GSI) Naming Architecture 800 which defines how consumers and merchants are interrelated with each other and communicate with each other within the shared-value consumer-merchant e-commerce Global Service Identity (GSI) Networking Model to form peering relationships for networking and utilizing shared network services and resources. The GSI Naming Architecture 800 can also be configured to allow an optimized management and movement of consumers demographic profiling data and merchants products and services data within a closed public or private SMS network platform for real-time secure e-commerce transactions between consumer and merchant on a worldwide basis. By way of example, the GSI Naming Architecture 800 can be configured to consist of four or more layers that enable a consumer and/or a merchant to be uniquely identified on a global basis within a given metro-area which can be designated based on a city, a community, a town, or neighborhood provided that the metro-area is connected to the SMS global network. Within the GSI Naming Architecture, a particular metro-area should have or should be capable of being configured to have a Gateway Service Node (GSN) in order to be identified and/or authorized to conduct consumer-merchant e-commerce transaction within the SMS global network. For illustration purposes, FIG. 8 depicts a four-layer architecture structure of the GSI Naming Architecture which includes, for example, a Local Service Node Layer 810, a Regional Service Node Layer 807, a National Service Node Layer 804, and an International Service Node Layer 801. Although, these layers are designed hierarchical layers as show in illustration 800, under certain performance requirements these layer can have direct transport connection between two service nodes at the same hierarchical layer to speed the movement of information or data between two high traffic areas such as the United States and Europe as shown between 805 and 806. These service node layers can consist of Mobile Cloud Computing and Storage Platforms that house the secure relational databases for both consumers and merchants that are used to facilitate consumer-merchant e-commerce transactions. These Mobile Cloud Computing and Storage Platforms are designed to provide a "Mesh like" data network configuration 802, 803, 805, 806, 808, 809, 811, and 812 for reliability and consumer and merchant database mirroring. The secure naming for a merchant within the Mobile Cloud Computing and Storage Platforms can be defined, for example, based on the merchant legal commercial business tax identity which can be used to uniquely identify a merchant business entity within a specific city, community, town, or neighborhood at the lowest layer 810 within the GSI Naming Architecture. The merchant legal commercial business tax identity can be used to anchor all other data and information about the merchant such as business address, commercial business sector category, products and services, etc. The merchant legal business tax identity anchor can also be used at subsequent layers 807, 804, and 801 within the GSI Naming Architecture to uniquely identify a merchant business entity by adding additional name descriptor to the merchant legal commercial business tax identity to uniquely identify the merchant at difference levels of the GSI Naming Architecture. The secure naming for a consumer within the Mobile Cloud Computing and Storage Platforms can be defined, for example, as the consumer legal passport number which can also be cross referenced with other legal identity information such as social security numbers, driver license numbers, biometric data such as fingerprint and voiceprint, etc. to form a unique consumer identify, which can be used to uniquely identify a consumer with a specific city, community, town, or neighborhood at the lowest layer 810 within the GSI Naming Architecture. The consumer's passport number based unique consumer identify can be used to anchor all other data and information about the consumer such as home address, employment history, financial data, biometric data such as fingerprint and voiceprint, etc. The consumer's legal passport number based unique consumer identify anchor can also be used at subsequent layers within GSI Naming Architecture to uniquely identify the consumer by adding additional name descriptor to the consumer's passport number to uniquely identify the consumer at different levels of the GSI Naming Architecture.

Figure 9:
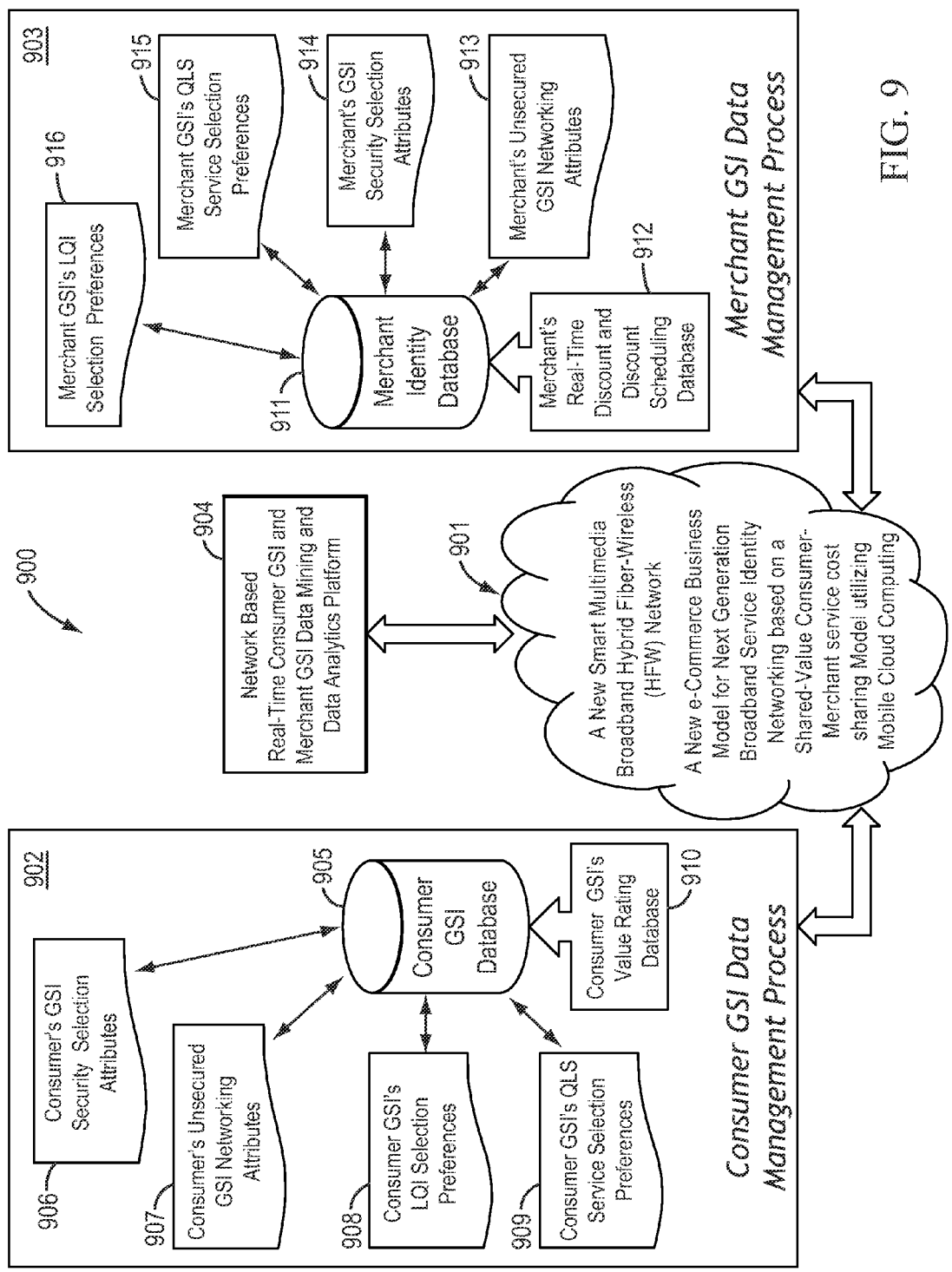
FIG. 9 is a block diagram illustrating an exemplary embodiment of a shared-value consumer-merchant e-commerce GSI Data Management Architecture, which defines how the SMS network establishes peering relationships between consumers and merchants.

The Shared-Value Consumer-Merchant E-Commerce Global Service Identity (GSI) Data Management Architecture FIG. 9 illustrates an exemplary shared-value consumer-merchant e-commerce Global Service Identity (GSI) Data Management Architecture 900, which defines how the SMS network 901 utilizes both consumers and merchants data to establish peering relationships between the consumers and merchants within the shared-value consumer-merchant e-commerce Global Service Identity (GSI) Networking Model. The SMS network 901 can also be configured to utilize a network based real-time consumer and merchant data analytics platform 904 to perform data mining and data analysis on both consumer and merchant data to support a specific e-commerce transaction. The shared-value consumer-merchant e-commerce Global Service Identity (GSI) Data Management Architecture may include a consumer GSI data management process 902, which serves as the repository for consumer data that is utilized by the SMS network 901 on behalf of the consumer for the purpose of conducting e-commerce transactions between the consumers and the merchants when the consumer initiates the transaction. This consumer data repository 902 can consist of multiple consumer data structures or data schema that are used to store information that characterizes the consumer such as the Consumer GSI's secure data attributes 906, the Consumer GSI's Networking data attributes 907, the Consumer GSI's LQI Selection Preferences Data 908, the Consumer GSI's QLS Service Selection Preferences Data 909, and the Consumer GSI's Value Rating Database 910. The Consumer GSI Database 905 can serve as the data repository for the consumer GSI data utilized by the SMS network 901 and the network based real-time consumer and merchant data analytics platform 904. The Consumer GSI's secure data schema 906 can be the storage location within the Consumer Data Repository 902 where the unique secure data about a consumer's GSI is stored for use by the SMS network 901 for conducting e-commerce transactions with merchants. The Consumer GSI's networking data schema 907 can be the storage location within the Consumer Data Repository 902 where the networking data is stored and used by the SMS network 901 to allow the consumers to dynamically interact with and conduct e-commerce transactions with merchants over the SMS network 901. The Consumer GSI's LQI Selection Preferences Data 908 can be configured as the storage location where the consumer's service performance preferences data is stored and used by the SMS network 901 for identifying the consumer services performance parameters in real-time and to guarantee that the requested consumer service performance preferences are delivered by the SMS network 901.

The Consumer GSI's QLS Service Selection Preferences Data 909 can be configured as the storage location for storing the consumer's service selection preferences data which is used later by the SMS network 901 to identify all consumer service requirement parameters in real-time, to guarantee that the consumer service selection preferences are delivered to the consumer, and to ensure that the SMS network 901 can meet the service quality level guarantees that were sold to the consumer by the owner of the SMS network 901. The Consumer GSI's Value Rating Database 910 can be configured as the storage location for the consumer's Value Rating data, which can be used by the SMS network 901 to identify the value of the consumer's GSI to a potential merchant that may wish to conduct e-commerce transactions with a specific consumer. The Consumer GSI's Value Rating Database 910 can also be used to store the results from all data mining and data analysis information computed by the network based real-time consumer and merchant data analytics platform 904 for subsequent use by the SMS network 901 for the purpose of supporting a particular e-commerce transaction between a consumer and a merchant.

The Merchant GSI data management process 903 can also be configured as the repository for the merchant data that is utilized by the SMS network 901 on behalf of the merchant for conducting e-commerce transactions between merchants and consumers when the transaction is initiated by the merchant. This merchant data repository 903 can include multiple merchant data structures or data schema that are used to characterize the merchant such as the Merchant GSI's secure data attributes 914, the Merchant GSI's Networking data attributes 913, the Merchant GSI's LQI Selection Preferences Data 916, the Merchant GSI's QLS Service Selection Preferences Data 915, and the Merchant GSI's Discount Scheduling Database 912. The Merchant GSI Database 911 can serve as the data repository for the Merchant GSI data that is utilized by the SMS network 901 and the network based real-time consumer and merchant data analytics platform 904. The Merchant GSI's secure data schema 914 can serve as the storage location within the Merchant Data Repository 903 where all unique secure data about a Merchant's GSI is stored for use by the SMS network 901 to conduct e-commerce transactions with consumer. Merchant identity experience attributes are selected and purchased by the Merchant GSI from the SMS network to define the quality of service experience interaction to be dedicated and delivered during a communication session to conduct a transaction over the network with a consumer. However, when the merchant identity experience attribute differs from the QoE level of service paid for by the consumer and guaranteed to be delivered by the SMS network during a communication session, in some embodiment, the system can be configured such that the merchant identity experience attribute will dictate the QoE level of service. In such an embodiment, the party which has registered for the lowest QoE level of service will stipulate the QoE level of service used during the communication session. This feature prevents the party with the highest QoE level of service from forcing the party with the lowest QoE to pay for services at a higher cost level than it wishes to pay. The Merchant GSI's networking data schema 913 functions as the storage location for storing networking data used by the SMS network 901 to enable merchants to dynamically interact with consumers to conduct e-commerce transactions over the SMS network 901. The Merchant GSI's LQI Selection Preferences Data 916 provides the storage location for the merchant's service performance preferences data which the SMS network 901 uses to identify all merchant services performance parameters in real-time and, thereby, guaranteeing that the merchant service performance preferences are delivered to the merchant by the SMS network 901.

The Merchant GSI's QLS Service Selection Preferences Data 915 can be configured as the merchant's service selection preferences data that the SMS network 901 uses to identify all merchant service requirement parameters in real-time, to guarantee that the merchant's service selection preferences are delivered to the merchant and to ensure that the SMS network 901 can meet the service quality level guarantees that are sold to the merchant by the owner of the SMS network 901. The Merchant GSI's Discount Scheduling Database 912 provides the storage location for the merchant's Discounts and Discount Scheduling data, which the SMS network 901 uses to identify the lowest price that can be offered to a consumer's GSI on behalf of the Merchant for a specific e-commerce transaction with a consumer's GSI. The Merchant's Discounts and Discount Scheduling data storage location can also be used by the network based real-time consumer and merchant data analytics platform 904 to perform data mining and data analysis for a specific real-time transaction by the SMS network 901 to support the specific e-commerce transaction conducted between a consumer and a merchant.

With the use of the GSIs, another feature of the SMS Networks is the ability to perform Location Relevance Advertising within any Level of an SMS Network Hierarchical due to the fact that all SMS Networks are Hybrid Fiber-Wireless Networks which allows every end user with a wired or wireless device to have their physical location within the Local SMS Network geographic coverage area tracked and monitor. The end user can elect during the initial registration of the selection preferences 908 (FIG. 9) or dynamically as the end user travels within the Local SMS Network's geographic coverage area to have the physical location of the wired and wireless devices tracked or monitored. Given that all Local SMS Networks support wireless connectivity and as such their physical locations can be identified and recognized by using the Local SMS Network presence capabilities, if activated by the end user, for the purpose of allowing other end users or merchants on the SMS Network to know which end users are active on any Local SMS Network as a function of both time and physical location. The SMS Network Presences capabilities can also be used to allow any end user to share products and services needs, as well as end user demographic profile information in real-time with any merchant on the SMS Network. This advertising as a function of time enables any merchant to use Directed Advertising on the SMS Network as a function time and physical location to directly advertise to an end user on the SMS Network which is referred to as Location Relevance Advertising. The SMS Network employs Location Relevance Advertising when an end user's device is detected, for example, entering a mall. Retailers, which are connected to the SMS Network and located within the mall, can be notified of the end user's location and the end user's affinity for high-priced designer shoes and handbags based on the end user's historical purchasing data stored in the Consumer GSI Database 905. Based upon the end user's current location, being within the mall, one or more retailers of designer shoes and handbags within the mall can decide to offer the end user an instantaneous discount or coupon to purchase such items. The retailers can decide to limit this broadcast of the discount or coupon only to similar end users that are currently within the mall at the present time. One purpose of Location Relevance Advertising is to improve the probability of a merchant to completing a sale of a product and/or a service with the end user because the advertisement is only sent to the end user because the coupon or discount for the product or services matches an identified need of the end user as a function of that particular time and physical location.

Figure 10:
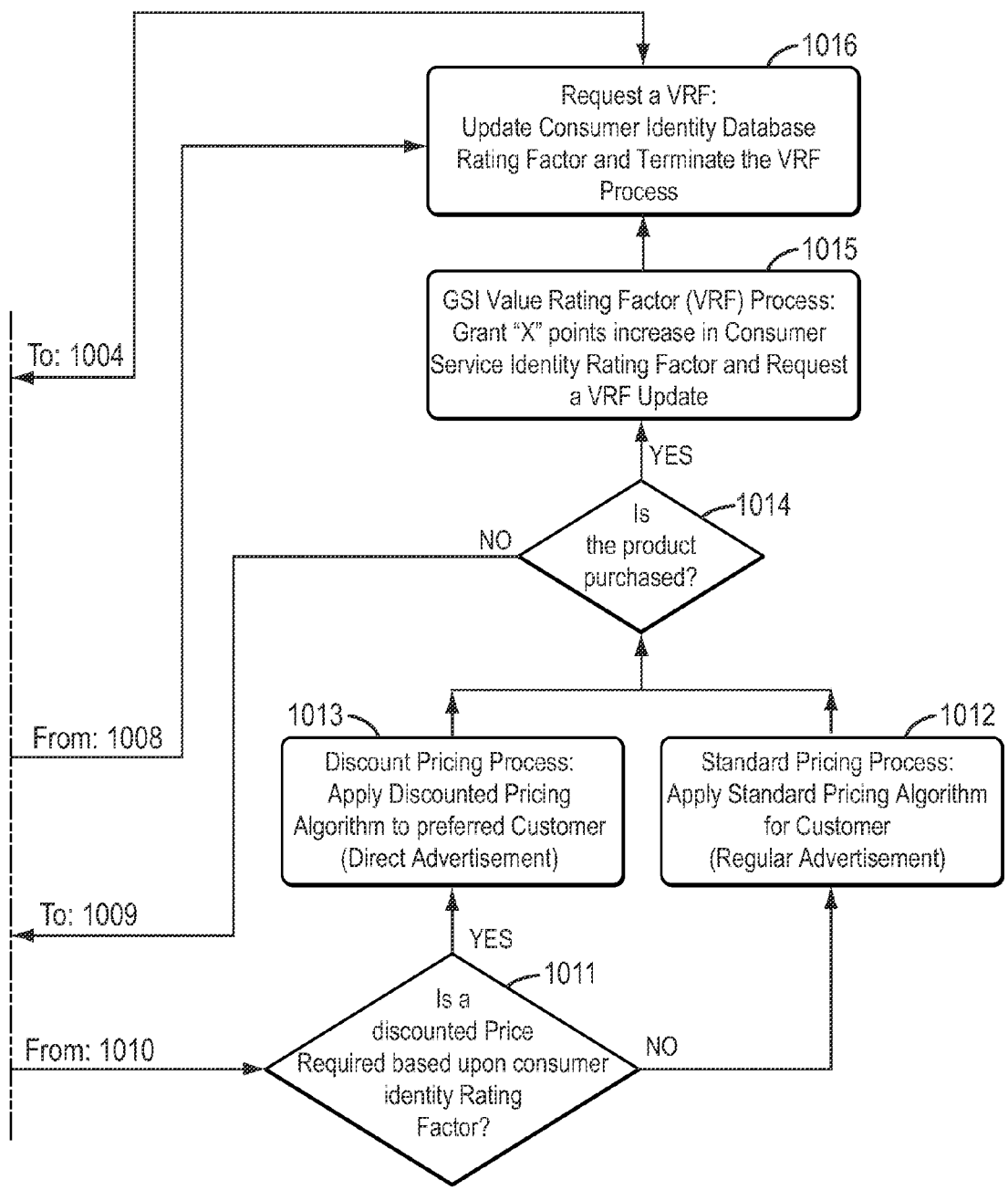
FIG. 10 is an exemplary flow chart illustrating the features and operations of a Transaction Pricing and Advertising Algorithm that facilitates transactions between consumers and merchants within the shared-value consumer-merchant e-commerce GSI Networking Model.

The Shared-Value Consumer-Merchant E-Commerce Global Service Identity (GSI) Transaction Pricing and Advertising Algorithm The general operation of the Transaction Pricing and Advertising Algorithm is summarized in the flowchart of FIG. 10. In general, the network employs the Transaction Pricing and Advertising Algorithm to facilitate transactions between consumers and merchants within the shared-value consumer-merchant e-commerce Global Service Identity (GSI) Networking Model. This algorithm allows the SMS network to identify the source of a transaction request. In other words, the SMS network can determine whether a transaction request is initiated by the consumer or the merchant. If a consumer initiates the request, the SMS network collects the consumer's data from the Consumer GSI's Database to perform the transaction and to automatically provide the pricing and advertising information. If a merchant initiates the request, the SMS network collects the merchant data from the Merchant GSI's Database to perform the transaction and to automatically render the pricing and advertising information. When a consumer's GSI enters a request for a transaction on the SMS network, this launches the shared-value consumer-merchant e-commerce Global Service Identity (GSI) Transaction Pricing and Advertising Algorithm 1001. This consumer request initiates the e-commerce transaction process in Step 1001, which in turn activates in Step 1002 a communication session between the consumer and the merchant over the SMS network such that the network monitors and stores, within the Consumer's GSI Database, the starting time and date of the session as well as the physical location of the consumer when the session starts. This approach allows the SMS network to correlate the purchasing of products and service with the physical location and store this data for later use by merchants on the SMS network to facilitate future sale of products and services. Once the consumer and/or merchant session starts, the Consumer Database Query Process in Step 1003 begins to collect all the relevant consumer GSI networking attribute data to initiate the consumer and merchant e-commerce transaction. Once the network collects the relevant consumer GSI networking attribute data, it launches the Merchant Database Query Process in Step 1005 to collect all the relevant merchant GSI networking attribute data to support the consumer and merchant e-commerce transaction session. Next, in Step 1007, the shared-value consumer-merchant e-commerce Global Service Identity (GSI) Transaction Pricing and Advertising Algorithm checks to determine if the proposed e-commerce transaction can be completed by verifying whether or not the products and/or services are available from the merchant. If merchant has the products and/or services available, then in Step 1010, the GSI Pricing Algorithm begins collecting the required data from the consumer GSI database 1004 and the merchant database 1006 to compute the price for the requested product and/or service for the specific e-commerce transaction.

Once the network computes the price, the shared-value consumer-merchant e-commerce Global Service Identity (GSI) Transaction Pricing and Advertising Algorithm checks in Step 1011 to determine if a discount should be applied to the purchase of a product or service based on the Consumer GSI's Value Rating Factor. If it is determined that a discount is applicable in Step 1011, then the network activates the Discount Pricing Process in Step 1013 to determine the discount amount to be applied to the product and/or service as well as the corresponding customized advertising that should also be sent to the consumer GSI for other products and/or services that may be of interest to the consumer's GSI based on the consumer physical location and the type of transaction that the consumer GSI most recently requested at that particular physical location. If in Step 1011 it is determined that the consumer's GSI does not qualify for a discount, then the network initiates the Standard Pricing Process 1012, which applies standard pricing for the product and/or service as well as the general advertising that may be sent to the consumer's GSI for other products and/or services that may be of interest to the consumer's GSI based on the physical location of the consumer and the consumer's demographic profile. If, the consumer's GSI decides not to purchase the product and/or service in Step 1014, then the shared-value consumer-merchant e-commerce Global Service Identity (GSI) Transaction Pricing and Advertising Algorithm terminates in Step 1009. If the consumer's GSI decides to purchase the product and/or service in Step 1014, then the Consumer GSI Value Rating Factor Process in Step 1015 begins to compute an updated Consumer GSI Value Rating Factor, which indicates the latest e-commerce transactions completed by the consumer's GSI. After computing the new Consumer GSI Value Rating Factor, the network begins the Consumer GSI Value Rating Factor (VRF) Update Process in Step 1016 to update the consumer's GSI Database 1004. Next, the Consumer Transaction Purchasing Process in Step 1008 records the purchased product and/or service for future pricing as well as advertising opportunities. Once the Consumer Transaction Purchasing Process in Step 1008 is completed, then the shared-value consumer-merchant e-commerce Global Service Identity (GSI) Transaction Pricing and Advertising Algorithm ends in Step 1009.

The Shared-Value Consumer-Merchant E-Commerce Global Service Identity (GSI) Networking Model: Automatic E-Commerce Value Attribute (EVA) Analysis and Pricing Algorithm FIG. 11 is an exemplary flow chart illustrating the general features and operations of the Automatic E-Commerce Value Attribute (EVA) Analysis and Pricing Algorithm which can be used by the network to automatically calculate the economical value of each consumer and merchant GSI on a continuous basis while consumers and merchants are conducting e-commerce transactions within the shared-value consumer-merchant e-commerce Global Service Identity (GSI) Networking Model. This algorithm enables the SMS network to continuously monitor all consumer and merchant transactions to evaluate the economical value to both consumers and merchants for the purpose of generating more e-commerce based transactions and providing cost savings to both consumers and merchants. This algorithm also allows the network service provider to offer QLS service discounts to consumers to stimulate more transactions over the SMS network. The algorithm further enables the network service provider to create a new revenue stream generated from the capture of customer information regarding high-valued customers that conduct frequent e-commerce transactions with merchants that are also registered on the SMS network. Due to their tendency to conduct frequent transactions, the high-valued customers will most likely conduct numerous transactions over the network with little or no advertising being issued from the merchants to the customers. This direct business relationship established with the customer by the network reduces the advertising cost to the merchant to complete a sale on the SMS network. The SMS network can take advantage of the benefits of this reduction in advertising fee to the merchants by enabling the owner of the network to charge the merchant a fee for the increase in sales generated by the network for the merchant These "network-generated" sales are not the direct result of merchant's "Push" based advertising for which the merchant pays for directly to the owner of the SMS Network in advertising fees. Thus, this algorithmic approach allows merchants to receive savings in advertising cost due to the direct e-commerce transactions conducted with the consumers without the need for paying high marketing and sales cost by the merchant because of the direct business relationship established with the consumer via the SMS network, thereby, decreasing the merchant's cost of advertising.

This algorithmic approach allows the consumers to receive savings on products and services purchased over the SMS network as well as receive savings on communication services from the network service provider based on their automatically calculated EVA. In addition, the consumer can also earn additional cost savings on their communication services received from the network service provider based on the network owner profits, which can be derived in part from the increased revenues generated from the merchant's direct business relationship with the consumer and the resulting consumer's EVA as viewed by the merchant on the SMS network. One of the features of this approach is the utilization of a consumer and merchant Learning based Value Rating Factor (VRF) concept that allows the owner of the SMS network to create a value rating process for both consumers and merchants based on their economical value to the owner of the network that can be used for automatic pricing and discounting of communication services. The SMS network can also automatically update the VRF existing data as new data is compiled about how both consumers and merchants are using the SMS network. For example, the owner of the SMS network may use the VRF to create automatic communication services discount table that can be automatically changed by the SMS network to give both consumers and merchant communication services discount as their VRF changes over time or within a fix time period. Initially, the VRF parameter can be established based on a standard subjective table of VRF Levels to set the initial pricing and discount levels by the owner of the SMS network. The initial pricing and discount levels selected for either a consumer or a merchant can be set based on factors such as the consumer's pre-established EVA rating or the initial level of advertising purchased by the merchant from the network owner. All the transactions are monitored such that new data is collected on the network utilization behavior of both consumers' and merchants' economic activities on the SMS network, the table of standard VRF levels can be adjusted. The consumer and merchant Learning based Value Rating Factor (VRF) algorithm can be configured to be continuously adjusted and automatically updated as the SMS network collects new data based on the economic activities of the consumers and merchants conducted over the SMS network.

The network can be configured to initiate the shared-value consumer-merchant e-commerce Global Service Identity (GSI) EVA Analysis and Pricing Algorithm 1101 in FIG. 11 when a consumer's or merchant's GSI makes a request for a transaction over the SMS network. If the request is a consumer VRF request in Step 1102, then the process advances to the consumer GSI value analysis and price process in Step 1103 to perform analysis and to collect data from the consumer Security Identity Attributes (SIAs), Networking Identity Attributes (NIAs) and Communication Services Attributes (CSI) in order to determine which consumer VRF level should be used to launch the Consumer GSI's VRF Calculation Process, 1106. In the example provided in FIG. 11, the consumer Value Rating Factor can be selected from a range of factors such as consumer Value Rating Factor (1) in Step 1104 to consumers Value Rating Factor (n) in Step 1105. The network can dynamically compute a real-time updated pricing level for the QLS service level for the consumer utilizing the Consumer GSI's VRF Calculation Process based on the GSI's SIA, NIA, and the CSI data and its interactions with the SMS network based real-time consumer and merchant data mining and data analytics platform 1109. Once the SMS network calculates the new pricing level for the consumer, the Consumer GSI's VRF Calculation Process in Step 1106 then updates the consumers GSI value rating factor database 1107. Once the consumers GSI value rating factor database 1107 is updated, the network launches the QLS Discount Process in Step 1108 to calculate the consumer GSI's discounts and the consumer's new VRF level. The consumer GSI discounts can be calculated, for example, based on advertising revenue generated from merchants to the owner of the SMS network. The new consumer's VRF level can be calculated by the Consumer GSI's VRF Calculation Process in Step 1106 to provide the consumer with automatic discount pricing. Once the consumer discount pricing levels are computed and assigned to the consumer's GSI, the Automatic E-Commerce Value Attribute (EVA) Analysis and Pricing Algorithm ends in Step 1110.

Returning to Step 1102, if the request is not a consumer VRF request, but rather a merchant request, then the network initiates the merchant GSI value analysis and price process in Step 1111 to collect and analyze data from the merchant Security Identity Attributes (SIAs), Networking Identity Attributes (NIAs) and Communication Services Attributes (CSI) to determine which merchant VRF level, merchants' Value Rating Factor should be selected to launch the Merchant GSI's VRF Calculation Process in Step 1114. Similar to the example of a consumer's request, the merchant Value Rating Factor can be selected from a range of factors such as merchant Value Rating Factor (1) in Step 1112 to merchant Value Rating Factor (n) in Step 1113. The network can employ the Merchant GSI's VRF Calculation Process as it uses the Merchant GSI's SIA, NIA, and the CSI data to interact with the network based real-time consumer and merchant data mining and data analytics platform in Step 1109 to compute a real-time updated pricing level for the QLS service level for the merchant. Once the new pricing level for the merchant is calculated, the Merchant GSI's VRF Calculation Process in Step 1114 then updates the merchant GSI value rating factor database 1116. Once the merchant GSI value rating factor database 1116 is updated, the network launches the QLS Discount/Charging Process in Step 1115 to calculate the merchant GSI's charges based on the volume of consumer e-commerce transactions conducted by the consumers over the SMS network with a specific merchant, as well as the new merchant's VRF level, which can be calculated by the Merchant GSI's VRF Calculation Process in Step 1114 to provide the merchant with automatic discount pricing for communication services. Once the merchant discount pricing and charging levels are computed and assigned to the merchant's GSI, the Automatic E-Commerce Value Attribute (EVA) Analysis and Pricing Algorithm ends in Step 1110.

The Shared-Value Consumer-Merchant E-Commerce Global Service Identity (GSI) Networking Model: Secure Channel Biometric Transaction (SCBT) Algorithm FIG. 12 is an exemplary of the features of the consumer e-commerce Secure Channel Biometric Transaction (SCBT) Algorithm which illustrates how the decoupling of the consumer who is requesting the e-commerce transaction from the end user device that is being used to conduct the e-commerce transaction. The SCBT Algorithm can be employed by the SMS network to monitor and automatically complete all e-commerce's transactions initiated by consumers with a merchant on the network as a part of the shared-value consumer-merchant e-commerce Global Service Identity (GSI) Networking Model. The SCBT Algorithm is designed to process all e-commerce transactions via a secure communication channel that is encoded by a special GSI security token which can consist of the consumer's password encrypted by the consumer's private GSI identity code or PIN. Each GSI can be configured to include at least one component known to the consumer and at least one component unknown to the consumer. The known component of the consumer's special GSI security token can be created, for example, by using the consumer's password and private GSI identity code which the consumer enters when registering for service on the SMS network. In addition, the component of the parameters of the consumer's special GSI security token, which is unknown to the consumer, can also be created as a part of the SMS network's consumer service registration process which is performed by the network service provider based on data collected from the consumer. For example, the network can perform the consumer service registration process to collect biometric information, such as a copy of the consumer's voiceprint, fingerprint, facial image, retina, and DNA, which can then be combined with the consumer password and private GSI identity code to create a unique special GSI security token for each consumer GSI that is activated on the SMS network. This SMS network's consumer service registration process ensures that each consumer's GSI that is registered on the SMS network is configured based on information from more than one information identity data source entered by the consumer that is known to the consumer and from more than one information identity data source gathered from data supplied by the consumer and manipulated by the network such that it is known only to the network, but unknown to the consumer. In some embodiments, the SMS network's consumer service registration process can be expanded to include more known and unknown consumer GSI information identity sources based on biometrics. This feature offers greater security for the transactions conducted on the network because the more combinations of known and unknown consumer GSI information identity sources, which are used to secure the consumer and merchant e-commerce transaction secure communication channel, enhances the security level that is provided by the SMS network for the consumer and merchant to conduct an e-commerce transaction. The SMS network encrypts the unknown component to generate an encrypted unknown and then takes the encrypted unknown to encode the known component. The SMS network uses the unknown consumer GSI biometrics identity information, which means that the network encrypts the biometric information provided by the consumer in a manner such that the encoded information is only known to the network. The network then uses the encrypted biometric information to encode the known consumer GSI identity information that is entered by the consumer into the network via the consumer's password and private GSI identity code or PIN. The SMS network then allows the consumer to enter a special sampling code for each piece of biometric data, for example, for both the voiceprint and fingerprint data, which can be used to determine the frequency by which the SMS network changes or modifies the consumer's special GSI security token for any e-commerce transaction conducted on the network. The network combines the sampling rate entered by the consumer with a random number generator to compute the actual special sampling code for each piece of biometric data (i.e., both the voiceprint and fingerprint data) to be used by the SMS network when conducting a consumer's transaction. One feature of this approach is that it allows the consumer to determine and control the level of security that will be afforded by the SMS network for any e-commerce transaction that is conducted by the consumer's GSI on the SMS network. Thus, this feature is an enhanced security feature made available to the consumer under the consumer's control, which extends beyond the basic security levels that are provided by the SMS network. The SMS network uses the security data collected from the consumer via the consumer's end user communication device to form the consumer's Biometric Data and GSI Security Token Table which is used by the SCBT Algorithm illustrated by way of example in FIG. 12. In FIG. 12, the network initiates the shared-value consumer-merchant e-commerce Global Service Identity (GSI) e-commerce Secure Channel Biometric Transaction (SCBT) Algorithm 1201 when a consumer's or merchant's GSI enters a request for an e-commerce transaction over the SMS network. Initially, in Step 1202, the SCBT algorithm determines whether this is the first time the consumer is requesting an e-commerce transaction or if the consumer is an already existing registered user, who is authorized to conduct e-commerce transactions on the network. If this is the consumer's first request in Step 1202, then the network launches the consumer SCBT registration process in step 1203. The SCBT registration process in Step 1203 starts the process of collecting the consumer's biometric data (fingerprint and voiceprint) and computing the GSI security token from data that is collected from the consumer's fingerprint, voiceprint, and GSI Security Token end user input device 1204. Once the consumer's fingerprint, voiceprint, GSI Security Token is computed, the network stores this data in the consumer's GSI database 1205. The SCBT registration process in Step 1203 also verifies that all security data from the consumer has been collected and verified in Step 1206 with the original information provided by the consumer when the consumer signed up for the service or self-provisioned their service. If the consumer's fingerprint, voiceprint, or computed GSI Token data cannot be verified in Step 1207, the network checks to confirm whether sufficient data has been gathered to register the process. If in Step 1207, there is sufficient data but the registration still cannot be verified, the SCBT Algorithm ends in Step 1208. If in Step 1207 there is not sufficient data to register the process, the network requests that the consumer continue the verification process by returning to the SCBT registration process in Step 1203. In Step 1206, if all security data has been collected from the consumer and verified, the SCBT Algorithm ends in Step 1208. If in Step 1202, the consumer is an existing registered user, the network advances the process to Step 1209 in order for the SCBT Algorithm to determine whether a secure channel is required to complete the e-commerce transaction. If in Step 1209, a secure channel is not required, then the SCBT Algorithm ends in Step 1208. However, if in Step 1209 a secure channel is required, then the SCBT Algorithm requests a copy of the consumer's biometric data (fingerprint and voiceprint) in Step 1210 from the consumer's GSI database 1205 for analysis. Once the biometric data (fingerprint and/or voiceprint) is verified in Step 1210, then a copy of the consumer's fingerprint, voiceprint, and/or GSI security token information is collected in Step 1211 from the consumer's fingerprint, voiceprint, and GSI Security Token end user input device 1204 for a comparative analysis of the consumer security data such as consumer's fingerprint, voiceprint, and GSI Security Token. Once the analysis of the consumer's fingerprint, voiceprint, and computed GSI Token data is complete, the consumer's voiceprint verification sampling process is launched in Step 1212. The consumer's voiceprint verification sampling process in Step 1212 requests a copy of the consumer's voiceprint sampling rate and GSI security token preference table from the consumer's GSI database 1205 for use during the processing of the specific SCBT e-commerce transaction requested by the consumer. Once the consumer's voiceprint sampling rate and GSI security token table is available from the consumer's GSI database 1205, the SMS network launches the consumer's SCBT Verification and certification process in Step 1213. The consumer's SCBT Verification and certification process in Step 1213 interacts with the consumer's fingerprint, voiceprint, and GSI Security Token end user input device 1204 to read out data to verify and certify the e-commerce transactions conducted over the SMS network in real-time using the consumer's voiceprint sampling rate and GSI security token preference table. Based on the consumer's SCBT Verification and certification process in Step 1213 if the certification of the consumer cannot be performed in Step 1214, the SMS network terminates the SCBT Algorithm in Step 1216. If, based on the consumer's SCBT Verification and certification process in Step 1213, the SMS network can perform the certification of the consumer and the required authorization in Step 1214, the SCBT e-commerce transaction is authorized and the SCBT Algorithm is terminated in Step 1215. Although the example described above and provided in FIG. 12 illustrates the biometric data as fingerprint and voiceprint data, it is known to one skilled in the art that other biometric data such as retina scan, an image (facial image), a sound, and DNA can be used without departing from the scope of the teachings.

Through the use of the SCBT algorithm, the SMS network is capable of providing dynamically allocated real-time end user secure channel session transactions that allow end users to establish secure channels for communication between two end points on the network. The SMS network provides an additional layer of protection to create the secured transactions. Once the transaction or session is completed, the SMS network deletes or erases any data associated with the session or transaction from the network. To establish the secure channels the SMS network creates a virtual connection between the two end points of the network through the use of the intelligent networking design built within the SMS network. The user can request the implementation of the secured channels for any type of transactions to prevent others from breaching or compromising the security of the transaction. The user can initially configure his or her virtual network during the registration on the SMS network to automatically establish secure channels for a predefined type of transactions, for example, all telephone calls dialed to and received from a specific telephone number. The SMS network also enables the user to dynamically request a secure channel at the beginning of a particular transaction or session. The user can configure the SMS to delete or erase any and all data associated with the transaction or session completely from all components of the network such that no permanent record of the transaction will be retained on the network or at any of the end points. For example, the end user can configure the SMS to erase all telephone messages recorded on a voice mail associated with a specific telephone number after a predetermined time period. Prior to receiving the message, a request to recipients at the end points to obtain their consent to the terms of service agreement to establish the secure channel. The recipient must agree to the terms of receipt as specified by the end user on the SMS network before the secured channel is established at the recipient's end point. Thus in this example, the recipient of the voice mail will not have the capability to override the instructions configured by the end user on the SMS network or will not be able to prevent the deletion of the e-mail message from the recipient's device. When the transaction or session is completed, the SMS network completely erases and permanently deletes all data associated with the transaction or session completely from the network and all the end points.

Referring FIGS. 3, 8, 9, 13, and 14, another feature provided by the present teachings is the introduction of the concept of "Mobile Cloud Computing." Mobile Cloud Computing expands the traditional concept of Cloud Computing. Traditionally, cloud computing, which is based on the metaphor of the cloud drawing used to depict the Internet in computer network diagrams, relates to the delivery of common business applications online which are accessed from a web browser, while the software and data are stored on servers owned and operated by a cloud computing provider. In general, cloud computing customers do not own the physical infrastructure of the network; instead they avoid capital expenditure on hardware, software, and services by renting usage from the cloud computing network providers. Multiple consumers can share as tenants the computing power offered by the cloud computing network providers. In this sharing-style per-use service-based approach, each consumer pays the provider only for the resources that they use.

Traditional cloud computing allows the data to be stored on a global network or local network resource. However, the Mobile Cloud Computing allows the data to be stored in a disturbed networking approach on both a global shared network and local shared network based on data aging and archiving techniques as a point of reference similar to the global network 360 and local networks 340, 350 in FIG. 3. Some of the end users' data can be stored on the global shared network server based on data mirroring and data archiving techniques which is referred to as the "Global Master Network Cloud" for sharing the network data storage resources as discussed above. In addition, the current active end user data can be stored on the local shared network server based on the data aging algorithm techniques which are referred to as the "Local Caching Network Cloud" at the local network level on shared network servers (similar to storage server 327) within a local access network to enable rapid access. Local caching network clouds are designed as shared storage memories locations within the local home network as close to end user devices as possible to provide a more efficient and faster lookup of data than much larger shared storage memories located on global master network clouds. Thus, the user is able to access the data quicker, to constantly maintain and update the data, and to receive a better quality of experience when the user's device is directly connected to or located nearby or within a local home network. However, when the user wishes to disconnect his or her mobile computing device, such as a laptop computer, from the local home network and travel to another local network and gain access as a visitor, access to the data on the visiting network using traditional cloud computing techniques presents a problem because the quality of experience for the end user will be different due to the rapid rate of access to end user data from the end user's original home network and the security permission controls enforced by the end user's original home network on any data queries from any foreign network and as such access to the end user's data within their original home network cannot be guaranteed while the end user is visiting a foreign network which from this point forward will be referred to as the "Visiting Network". Within these types of network designs, an end user can only gain access to data stored on a network through a wireless device connection or through a wired device connection at the lowest level in the network, which is referred to as the local access network. Thus, the customer must either download the data onto his or her mobile computing device prior to leaving the local home network or have the capability and resources to access the data stored on the local home network via a Virtual Private Network (VPN) connection from the Visiting Local Access Network. In general, some organizations or entities may install VPNs to provide secure communications through the public Internet so that their authorized users can remotely access their own secure local home network data. However, other entities, especially small businesses, may not have the resources to construct the network infrastructure to support such a VPN arrangement for data or network resource access.

Figure 13A:
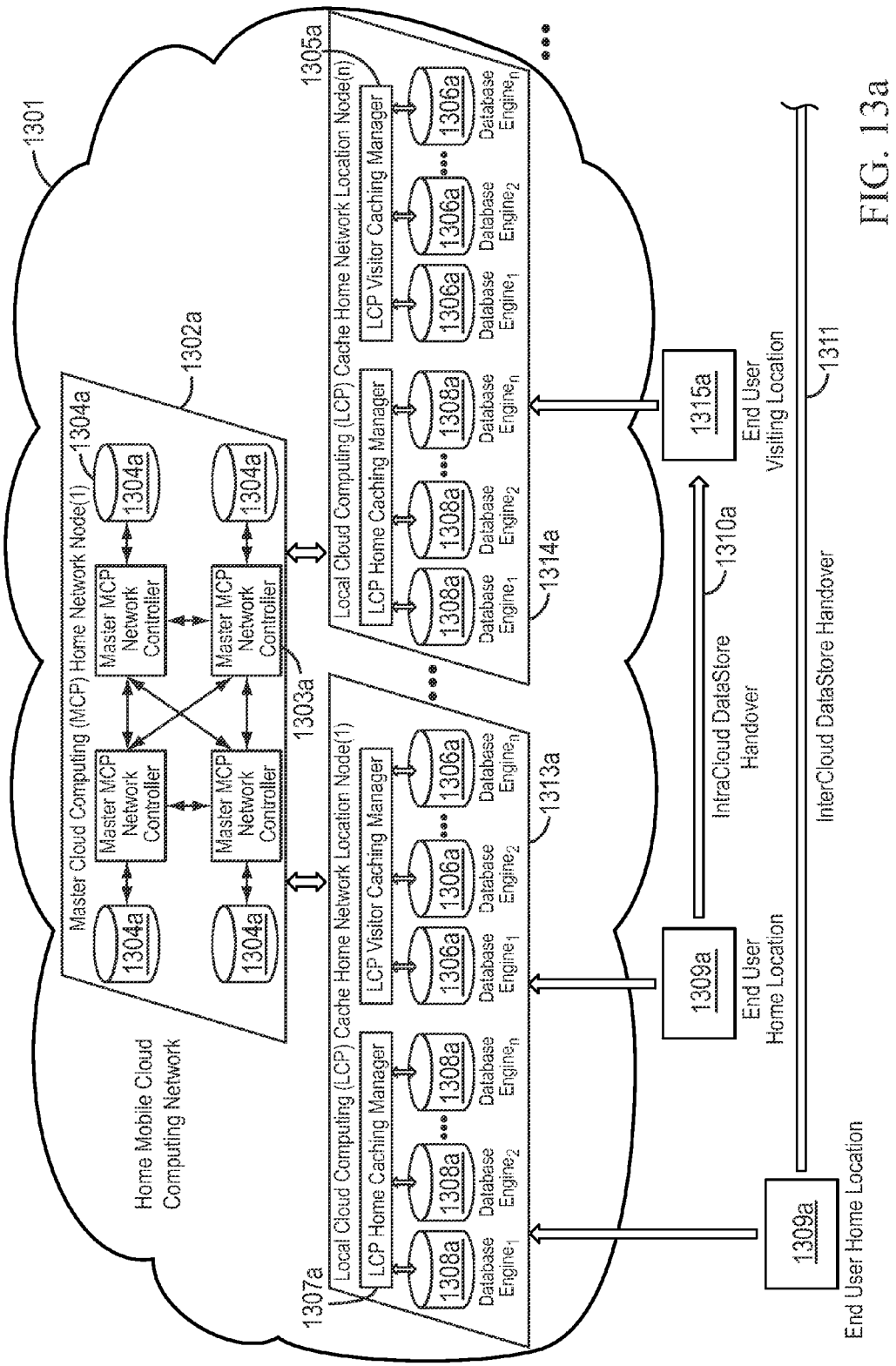
FIG. 13 illustrates an exemplary embodiment of a Mobile Cloud Computing (MCP) Network used by the SMS network to transfer an end user's data from a local home network to a visiting network.
Figure 13B:
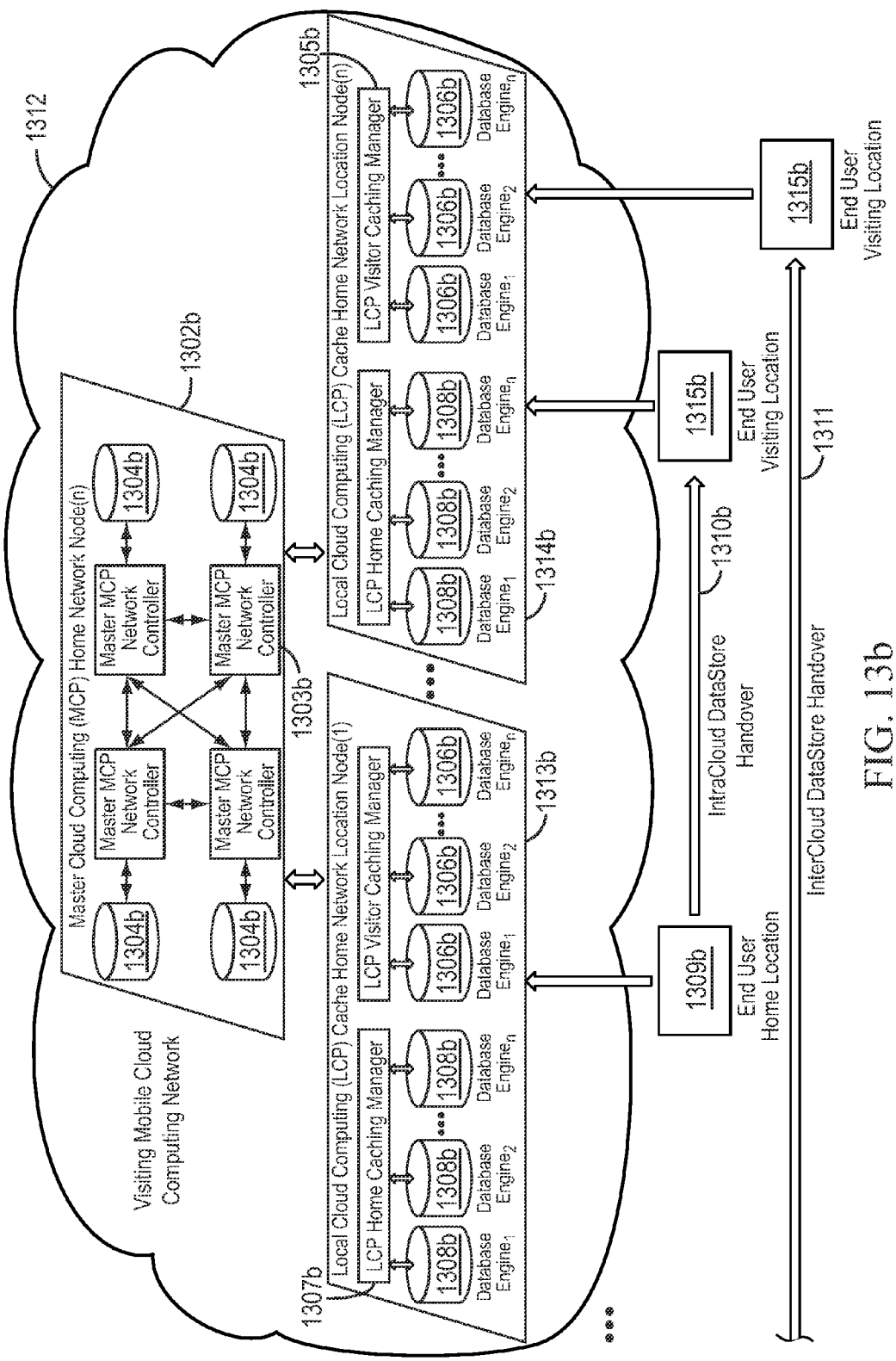
Figure 14A:
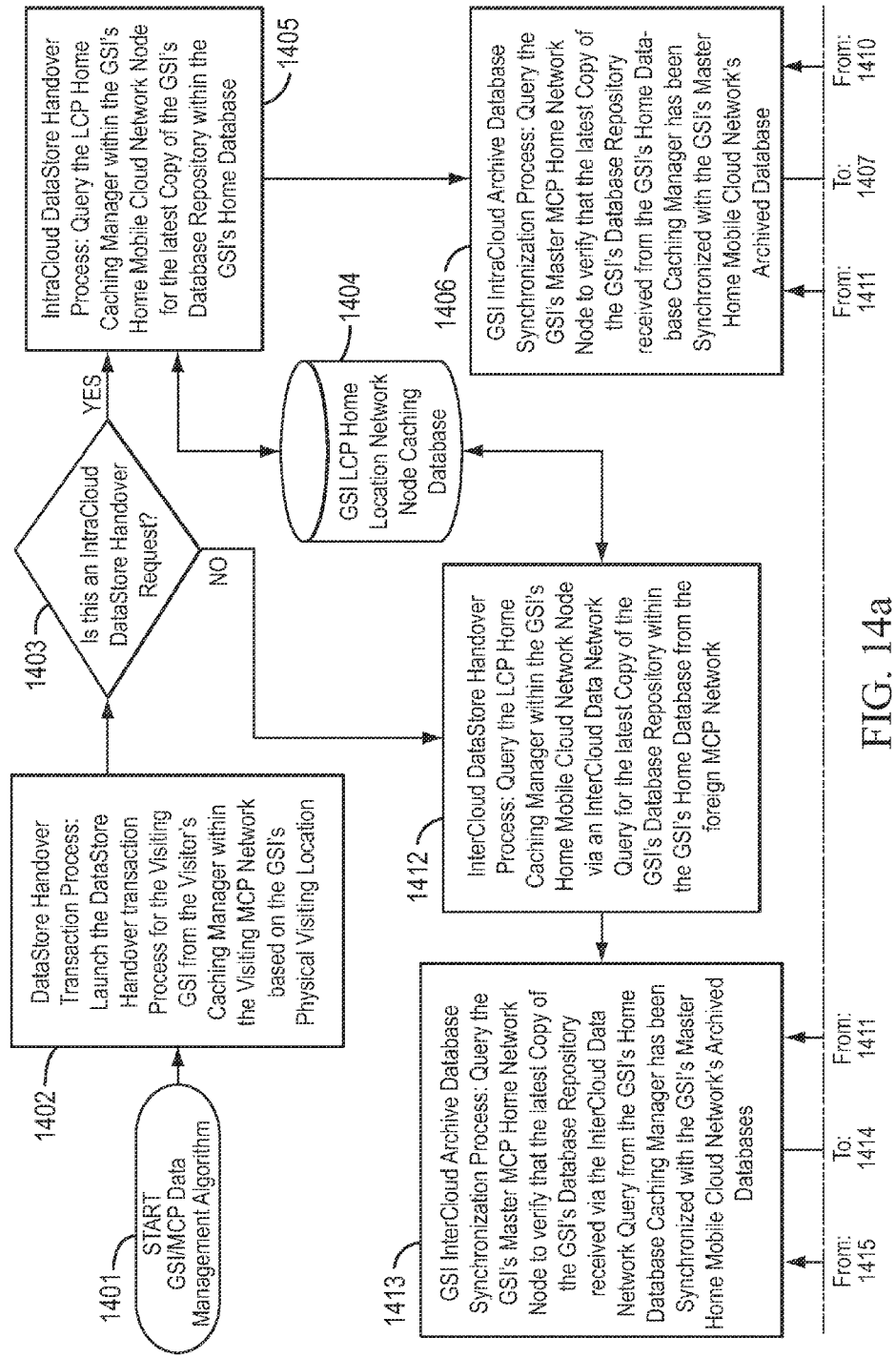
FIG. 14 illustrates an exemplary flow chart illustrating the features and operations of a MCP Data Management Protocol Algorithm used by the SMS network to transfer an end user's data from a local home network to a visiting network.
Figure 14B:
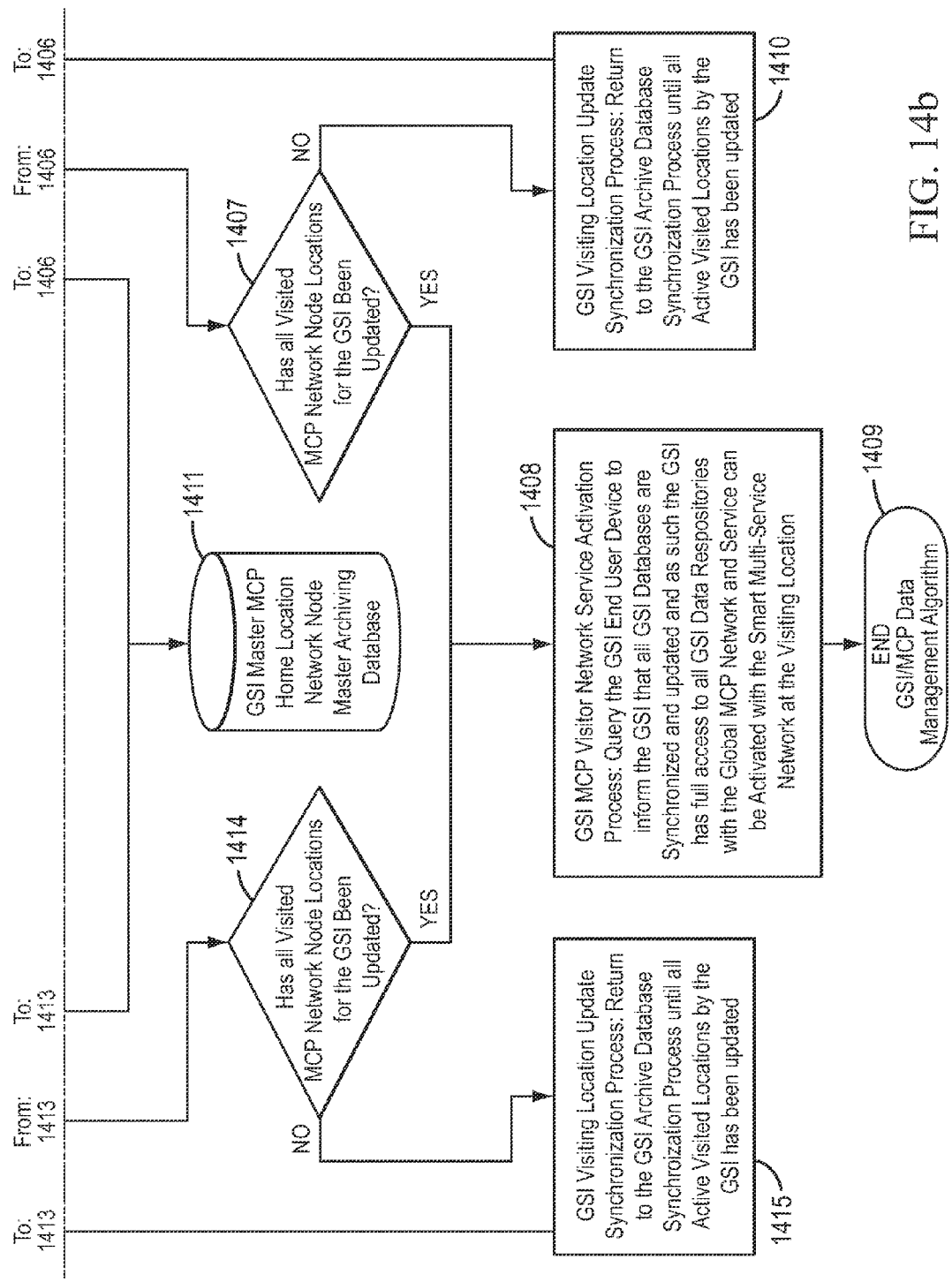

The Mobile Cloud Computing approach according to the present teachings, as shown in the exemplary embodiment of FIGS. 13 and 14, overcomes this shortcoming by enabling a mobile cloud computing data networking protocol that allows end users that are visiting foreign local access networks to be recognized as a "Visitor", thereby, allowing the user's device to cause the visiting network to activate the mobile cloud computing data networking protocol which implements an IntraCloud DataStore Handover or a InterCloud DataStore Handover as illustrated in FIG. 13. This mobile cloud computing data networking protocol eliminates the current security restrictions on data movement between home cloud networks and visiting cloud network by allows the end user to establish data policy management procedures within the end user's home SMS network which are used by the end user's home SMS network to perform internetworking with visiting local network for the purpose of allowing end user data to be mobile within the context of the SMS network. This mobile cloud computing data networking protocol also ensures that end user's current data is always automatically available within the local access networks that the end user happens to be connected to at the time whether it is the end users home local access network or a visiting local access network. The mobile cloud computing data networking protocol is implemented by using peer-to-peer server connections that can be formed dynamically by ad-hoc additions of server nodes on a local, regional, national and international mobile cloud computing network level as shown, for example, in FIG. 8. When the user's device connects to a visiting network, the Mobile Cloud Computing Data Networking (MCCDN) Protocol enables the visiting network to automatically recognize the device and then locate the local home network of the end user to gain access to the end user's data, which is then moved to the visiting local access network automatically. Thus, the SMS network automatically detects that the end user's device is no longer located within the local home access network 1301, automatically locates the data on the servers' of the local home access network then transfers it onto the servers' of the visiting network at the end user's new location. This capability of the SMS network of the present teachings, which moves the data with the user so that it "makes the data mobile", is termed as the "handover" feature. The SMS network can be designed to perform an InterCloud Handover 1311, IntraCloud Handover 1310*a*, 1310*b*, or a combination of InterCloud and IntraCloud Handovers, which will be described further below.

FIG. 13 illustrates a first SMS data network, identified as Home Mobile Cloud Computing Network 1301, which is capable of establishing a connection through a global network to a second SMS data network, identified as Visiting Mobile Cloud Computing Network 1312. The first and second SMS data networks 1301, 1312 shown in FIG. 13 can be configured as a part of the SMS network 300 depicted in FIG. 3. FIG. 13 provides a more detail discussion of the data manager aspect of FIG. 3. It will be apparent to those skilled in the art that each SMS network can be constructed to include numerous local home networks connected to a single national network. For example, Home Mobile Cloud Computing Network 1301 can be configured to include local networks 1313*a* and 1314*a* (Local Cloud Computing (LCP) Cache Home Network Location Node) connected to a national network 1302*a* (Master Cloud Computing (MCP) Home Network Nodes).

The network can be configured based on end user's policy management procedures such that the user does not have to request the transfer of his or her data repositories or data schema from the local home access network to the visiting access network, but rather the SMS network automatically performs the Mobile Cloud Computing function of transferring end user's data repositories or data schema. When the user initially registers with the SMS network, the network will prompt the user to enter his or her service selection preferences (see, block 908 in FIG. 9). One of the preferences that the SMS network may be configured to request from the user during enrollment is whether he or she wishes to select the Mobile Cloud Computing feature such that the network tracks the location of the user's wired or wireless device and collects and stores the corresponding tracking/location information as mobility location data of the wired or wireless device. If the user selects the Mobile Cloud Computing feature, the network can track the physical location of the wireless or wired device as it travels out of the local home access network to one or more visiting access networks. The present teachings further incorporates the features of policy management wherein the users can change their preferences in real-time to grant access to the visiting access network. If the user declines the Mobile Cloud Computing option during the initial registration and the user subsequently travels to a visiting location and wishes to access his or her data via the visiting location, the user can reset his or her preferences in real-time from the visiting location to temporarily logon to the visiting network to gain access to his or her data on the local home access network through a VPN connection and as such the Mobile Cloud Computing feature will be activated, thereby, enabling the SMS network to take charge of the management and movement of the end user's data repositories or data schema within the SMS network. For example, should the user's interne service become unavailable from her local home access network due to a service interruption, the user can still can gain Internet service access through the global network by accessing the local home network of another service provider or accessing a another local network as a visitor within the user's home access network. This feature provides the user with the choice to control how each network will be built and managed for each user and as to when each network will be selected by the user to provide the desired services. This temporary logon to a visiting network can be implemented via special network access permission controls within the visiting networks.

An IntraCloud Handover 1310 occurs when the user travels from a first location 1309*a* to a second visiting location 1315*a* within the home access network 1301 so that SMS network makes the data mobile "within" the user's home access network 1301. For example, a user may enter into a service agreement with a first Internet Service Provider that provides services in both Chicago and New York. The user may travel from a home location 1309*a* in the local home access network 1313*a*, which serves the Chicago area to a local visiting location 1315*a* serviced by a local visiting access network 1314*a* in the New York area and then connect to the local visiting network 1314*a* to gain access to the user's data at the local home access network 1313*a*. When the user connects the device to a local visiting access network 1314*a*, the Master Cloud Computing (MCP) Home Network Node of the SMS network will detect the connection and automatically transfer the end user's data repositories or data schema from the database engines 1308*a* of the local home visiting access network 1313*a* to the database engines 1306*a* of the local visiting access network 1314*a*. The Local Cloud Computing (LCP) Cache Home Network Location Node may include LCP Home Caching Manager 1307 and LCP Visitor Caching Manager 1305 to facilitate the retrieval, temporary storage, and transfer of the end user's data at the home network and the visiting network, respectively. The Master Cloud Computing (MCP) Home Network Nodes may include Master MCP Network Controllers 1303*a* and GSI Home Databases 1304*a* to facilitate the retrieval, temporary storage, and transfer of the end user's data. An InterCloud Handover 1311 occurs when the user travels from a first SMS network owned and operated by a service provider 1301 to a second SMS network owned and operated by another service provider 1312 so that the SMS network makes the data mobile "between" networks owned and operated by different entities. One noted difference between an "InterCloud Handover" and an "IntraCloud Handover" is that during an InterCloud Handover, the visiting access network must request and obtain authorization from the local home access network to access and receive a copy of the user's data from the local home access network. During the performance of an InterCloud Handover 1311 when the user connects the device to the Visiting Mobile Cloud Computing Network 1312, the SMS network will automatically send an access request from the Visiting Mobile Cloud Computing Network 1312 to the Master Cloud Computing (MCP) Home Network Nodes 1303*a* of the Home Mobile Cloud Computing Network 1301 to seek authorization to provide access to the user's data on the local home access network 1313*a* (Local Cloud Computing (LCP) Cache Home Network Location). If the Master Cloud Computing (MCP) Home Network Nodes 1303*a* approves the request and grants access to the user's data, the SMS network transfers a copy of the data from the local servers (Database Engines 1308*a*) of the local home network to the Master Cloud Computing (MCP) Home Network Nodes 1303*b*. The data is then transferred to the local visiting servers (Database Engines 1308*b*) of the local visiting access network 1313*b*. The SMS networks are capable of providing Mobile Cloud Computing to perform an InterCloud Handover, an IntraCloud Handover, or a combination of both on a local, regional, national, and international level, as shown in FIG. 3. For example, the user may travel from a local home network located in Chicago to a visiting network located in New York such that the smart network grants access to the user's data by establishing a peer-to-peer connection between Regional Service Nodes 807 as shown in FIG. 8. Another example is that the SMS network can also be configured to establish a peer-to-peer connection between International Service Nodes 801 should the user travel from a local home network located in Chicago, USA and connects to a visiting network located in Europe to gain access to his or her data on the local home access network.

Some of the features provided by the Mobile Cloud Computing include maintenance, synchronization and aging of the user's data. The SMS network will maintain the user's data at the visiting network as long as the user's device is located within the visiting network and for a predetermined time after the end user has disconnected from the visiting access network which is referred to as the end user's data aging interval that is defined by the end users as a policy management parameter of the SMS network. The SMS network will also simultaneously synchronize any data updates performed on the visiting access network with the local home access network. If the user's device leaves the first visiting access network location and travels to another visiting access network location, the smart network can be configured to also "age" the user's data at the first visiting access network location and the second visiting access network location while also simultaneously synchronizing the end user's data with the local home access network. The SMS network ages the data at the first visiting location by storing and maintaining it at that location for a predetermined time period. If the user does not return to and access the first visiting location within the predetermined time period, the SMS network automatically erases the user's data from the servers' of the first visiting network. The SMS network can be configured so that the user specifies the "aging interval", rather than the network. The user may stipulate a predetermined time period of the aging interval during the selection of the user's preference 909 as shown for example in FIG. 9. The SMS network moves the data to the user's current network location after the user sets his or her mobile cloud computing preferences in block 909. The local home access network can be defined as the master location so that the currently visited access network synchronizes with the local home access network. Then, the local home access network will synchronize the user's data with any other previously visited locations where the SMS network has not yet aged out the user's data. All other copies of the user's data stored on visited networks will eventually terminate after the expiration of the aging interval specified by the user. In summary, the Mobile Cloud Computing of the present teachings interacts with conventional Cloud Computing to make the user's data mobile. By employing this feature, the SMS network guarantees that the quality of experience for accessing user's data is consistently maintained at the same QSL level regardless of the location where the user accesses the SMS network. Thus, the SMS network is capable of making the storage capabilities of the local servers appear mobile so that the user's data appears mobile and travels with the user's device throughout the SMS network(s). Data storage can be performed by the SMS network as continuous mobility devices or for discrete mobility devices. Continuously mobile data storage occurs when the data is continuously moving and stored within the network. Discretely mobile data storage occurs when the data is moved among discrete locations within the network and stored at these discrete locations.

Embodiments of the SMS network enable the decoupling of the end user from the end user's device so that the network delivers the requested level of services to the end user regardless of the devices employed to connect to the SMS network. The SMS network can use the verification and security features of the GSI to monitor the end user's access to the network. An example of this feature in connection with the application of Mobile Cloud Computing is that the user can travel from his or her home network without the user's permanent device to a visiting network and connect to the visiting network using a temporary device. The user can use his or her GSI to verify and authenticate the user's identity to request that the user's data be transferred from the home network to the visiting network through Mobile Cloud Computing. This feature provides an extra level of security should someone steal the end user's permanent device and attempt to gain access to the end user's data or the network. Thus, using the GSI, the SMS network affords the ability to decouple the end user from any particular device. The SMS network enables the end users to be authenticated on the network so they can be associated with permanent devices, as well as temporary devices. The end user can configure his or her virtual network so that it is associated with and recognized when one or more permanent devices connect to the network after the end user completes the authentication process. Furthermore, the decoupling aspect of the SMS network provides the end user the ability to be temporarily associated with one or more temporary devices once the end user is authenticated on the network using the GSI features. In summary, the SMS network can monitor and track the end user's device, the GSI or a combination of both to grant the end user access to receive his or her defined services at any location or connection point established within the network.

FIG. 14 illustrates the SMS networks Mobile Cloud Computing (MCP) Data Management Protocol Algorithm which enables the end user's data to follow the end user as he or she travels from one physical location accessing a SMS local access network to a second physical location accessing another SMS local access network which can be within the end user's home SMS local access network or within a visiting SMS local access network. The MCP Data Management Protocol Algorithm is launched when an end user appears within a physical location other then the end user's home physical location. In Step 1401, this process is started by activating the DataStore Handover Transaction process in Step 1402, which first identifies the current physical location of the end user's device within the SMS network(s), which then determines whether an IntraCloud Handover or an InterCloud Handover in Step 1403 is required. If an IntraCloud Handover is required, the IntraCloud DataStore Handover process in Step 1405 is activated to request a copy of the end user's current database repository 1404 within the end user's Local Cloud Computing (LCP) home location network caching database. Once the copy of the end user's current database repository is received from the end user's LCP home location network caching database, the IntraCloud Archiving Database synchronization process in Step 1406 is activated to ensure that all end user data is synchronized between the current end user's local home caching network database 1404 and the end user's master home network archiving database 1411. Once this database verification in Step 1407 and update process in Step 1410 is completed, the visitor network service activation process in Step 1408 is activated which allows the end user to retrieve, modify, and/or change any end user's data repositories or data schema with the end user's LCP access network databases. Then, the MCP Data Management Protocol Algorithm terminates in Step 1409.

If an InterCloud Handover is required in Step 1403 rather than an IntraCloud DataStore Handover, the InterCloud DataStore Handover process in Step 1412 is activated to request network access security verification from the end user's home MCP master network. If granted, the InterCloud DataStore Handover process in Step 1412 requests a copy of the end user's current database repository within the end user's Local Cloud Computing (LCP) home location network caching database. Once the copy of the end user's current database repository is received from the end user's LCP home location network caching database, the InterCloud Archiving Database synchronization process in Step 1413 is activated to ensure that all end user data is synchronized between the current end user's local home caching network database 1404 and the end user's master home network archiving database 1411. Once this database verification in Step 1414 and update process in Step 1415 is completed, the visitor network service activation process in Step 1408 is activated which allows the end user to retrieve, modify, and/or change any end user's data repositories or data schema with the end user's LCP access network databases. Then, the MCP Data Management Protocol Algorithm terminates in Step 1409.

Other embodiments of the invention will be apparent to those skilled in the art from consideration of the specification and practice of the invention disclosed herein.

It is intended that the specification and examples be considered as exemplary only, with a true scope and spirit of the invention being indicated by the following claims.

What is claimed is:

1. A system for providing multi-services communications, the system comprising:
 a communication network;
 a Hybrid Fiber-Wireless (HFW) network having policy management capabilities;
 at least one processor connected to the HFW network; and
 at least one database connected to the at least one processor and the HFW network and for storing user-defined sets of rules and instructions to cause the processor to:
  receive the user-defined sets of rules and instructions from a plurality of end users via a plurality of end user devices;
  configure a virtual network for each end user within the communication network using the policy management capabilities based on the user-defined sets of rules and instructions provided by each end user, wherein the user-defined sets of rules and instructions define provisioning and delivery of resources and services provided by the communication network to the end user;
  conduct at least one communication session selected from the group consisting of voice, video, data, and multimedia;
  enable at least one end user of the plurality of end users to define the rules and instructions to establish at least one service level for delivering the services and resources to the end user;
   wherein the at least one service level for delivering the services and resources to the at least one end user is selected from a plurality of Quality of Experience (QoE) service levels, wherein each QoE service level corresponds to one or more dimensions that control a perception of at least one service that the at least one end user experiences when receiving the service and wherein the policy management capabilities enables the at least one end user to test features and capabilities of the communication network associated with each QoE service level for selecting a fee to pay for the at least one service based on the perception of the service to the at least one end user;
  calculate a Latency Quality Index (LQI) rating for measuring a performance level of the communication network to determine the QoE service level that the at least one end user experiences when engaged in the at least one communication session;
  execute a service price reduction program such that an owner of the HFW network is capable of submitting an activation request to calculate an initial service pricing plan for the at least one end user based on initial profile data captured by a data collection agent to determine an initial value of the at least one end user and a base price for at least one service, the at least one database stores the initial value of the at least one end user and the base price for the at least one service, and as the at least one end user requests additional services, the service price reduction program, initially using the initial value of the at least one end user, iteratively recalculates a current value of the at least one end user based on a number of transaction requests submitted by the at least one end user to reduce the base price for the at least one service;
  provide shared resources and services of the communication network accessible by at least some of the end users having a common interest for sharing the resources and services so as to reduce cost of network services and resources paid by the at least some of the end users;
  execute a resource allocation program to dynamically allocate network resources delivered to the at least one end user per at least one transaction requested by the at least one end user and conducted during the at least one communication session;
  receive a transfer request from the at least one end user to transfer data from a first processor located at a first location to a second processor located at a second location as the at least one end user travels from the first location to the second location, the at least one processor authorizes the transfer request if the user-defined sets of rules and instructions of the at least one end user permit the transfer of the data, and the at least one processor transfers the data of the end user if the at least one processor authorizes the transfer request;
  execute an e-commerce alias program to enable the at least one end user to create a service identity to conduct an e-commerce transaction during the at least one communication session over the communication network without revealing a true identity of the at least one end user during negotiations of terms of the e-commerce transaction and revealing the true identity of the at least one end user when the at least one end user agrees to the terms of the e-commerce transaction, wherein the service identity comprises at least one attribute known to the at least one end user and at least one attribute unknown to the at least one end user;

enable at least one end user of the plurality of end users to dynamically submit a secure channel request to establish a secure channel to conduct the at least one session between at least two end points within the communication network, the communication network opens the secured channel between an end point of the at least one end user and each end point of recipients that agrees to terms of service for establishing the secured channel, after the completion of the secured transaction, the communication network deletes and erases all data and information associated with the at least one session conducted over the secured channel from the communication network and all the end points of the recipients and the at least one end user.

2. The system of claim 1, wherein the terms of service includes limitation of use terms such that the communication network prevents each recipient at each end point from performing one or more of the functions consisting of modifying, manipulating, copying, printing, transmitting, transferring, hyperlinking, downloading, saving, and printing any data and information associated with the at least one session at one or more devices of at least one recipient in accordance with the terms of service agreed upon by each recipient before the communication network establish the secure channel.

3. The system of claim 1, wherein one of the user-defined sets of rules and instructions, set by the at least one end user, is an expiration time duration specifying when the communication network erases all data and information associated with the at least one session.

4. A method providing multi-services within a communication network, the method comprising:

storing, in a database of a computer, user-defined sets of rules and instructions for providing multi-services to end user devices connected to a communication network comprising a Hybrid Fiber-Wireless (HFW) network having policy management capabilities;

receiving, at one or more processors, the user-defined sets of rules and instructions from a plurality of end users via a plurality of end user devices, and configuring a virtual network for each end user within the communication network using the policy management capabilities based on the user-defined sets of rules and instructions provided by each end user, wherein the user-defined sets of rules and instructions define provisioning and delivery of resources and services provided by the communication network to the end user conducting at least one communication session selected from the group consisting of voice, video, data, and multimedia;

defining, by at least one end user of the plurality of end users, the rules and instructions to establish at least one service level for delivering the services and resources to the end user;

wherein the at least one service level for delivering the services and resources to the at least one end user is selected from a plurality of Quality of Experience (QoE) service levels, wherein each QoE service level corresponds to one or more dimensions that control a perception of at least one service that the at least one end user experiences when receiving the service and wherein the policy management capabilities enables the at least one end user to test features and capabilities of the communication network associated with each QoE service level for selecting a fee to pay for the at least one service based on the perception of the service to the at least one end user;

calculating a Latency Quality Index (LQI) rating for measuring a performance level of the communication network to determine the QoE service level that the at least one end user experiences when engaged in the at least one communication session;

executing a service price reduction program such that an owner of the HFW network is capable of submitting an activation request to calculate an initial service pricing plan for the at least one end user based on initial profile data captured by a data collection agent to determine an initial value of the at least one end user and a base price for at least one service, the at least one database stores the initial value of the at least one end user and the base price for the at least one service, and as the at least one end user requests additional services, the service price reduction program, initially using the initial value of the at least one end user, iteratively recalculates a current value of the at least one end user based on a number of transaction requests submitted by the at least one end user to reduce the base price for the at least one service;

providing shared resources and services of the communication network accessible by at least some of the end users having a common interest for sharing the resources and services so as to reduce cost of network services and resources paid by the at least some of the end users;

executing a resource allocation program to dynamically allocate network resources delivered to the at least one end user per at least one transaction requested by the at least one end user and conducted during the at least one communication session;

receiving a transfer request from the at least one end user to transfer data from a first processor located at a first location to a second processor located at a second location as the at least one end user travels from the first location to the second location, the first processor authorizes the transfer request if the user-defined sets of rules and instructions of the at least one end user permit the transfer of the data, and the first processor transfers the data of the end user to the second processor if the first processor authorizes the transfer request;

executing an e-commerce alias program to enable the at least one end user to create a service identity to conduct an e-commerce transaction during the at least one communication session over the communication network without revealing a true identity of the at least one end user during negotiations of terms of the e-commerce transaction and revealing the true identity of the at least one end user when the at least one end user agrees to the terms of the e-commerce transaction, wherein the service identity comprises at least one attribute known to the at least one end user and at least one attribute unknown to the at least one end user;

dynamically submitting, by at least one end user of the plurality of end users, a secure channel request to establish a secure channel to conduct the at least one session between at least two end points within the communication network, the communication network opens the secured channel between an end point of the at least one end user and each end point of recipients that agrees to terms of service for establishing the secured channel, and after the completion of the secured transaction, deleting and erasing, by the communication network, all data and information associated with the at least one session conducted over the secured channel from the communication network and all the end points of the recipients and the at least one end user.

5. The method of claim 4, wherein the terms of service includes limitation of use terms such that the communication network prevents each recipient at each end point from performing one or more of the functions consisting of modifying, manipulating, copying, printing, transmitting, transferring, hyperlinking, downloading, saving, and printing any data and information associated with the at least one session at one or more devices of at least one recipient in accordance with the terms of service agreed upon by each recipient before the communication network establish the secure channel.

6. The method of claim 4, wherein one of the user-defined sets of rules and instructions, set by the at least one end user, is an expiration time duration specifying when the communication network erases all data and information associated with the at least one session.

7. An apparatus for providing services and resources using a Smart Multi-Services (SMS) communication network, comprising:

a Hybrid Fiber-Wireless (HFW) network having policy management capabilities;

at least one processor connected to the HFW network; and at least one database connected to the at least one processor and the HFW network and for storing user-defined sets of rules and instructions to cause the processor to:

receive the user-defined sets of rules and instructions from a plurality of end users via a plurality of end user devices;

configure a virtual network for each end user within the communication network using the policy management capabilities based on the user-defined sets of rules and instructions provided by each end user, wherein the user-defined sets of rules and instructions define provisioning and delivery of resources and services provided by the communication network to the end user;

to conduct at least one communication session selected from the group consisting of voice, video, data, and multimedia;

to enable at least one end user of the plurality of end users to define the rules and instructions to establish at least one service level for delivering the services and resources to the end user;

wherein the at least one service level for delivering the services and resources to the at least one end user is selected from a plurality of Quality of Experience (QoE) service levels, wherein each QoE service level corresponds to one or more dimensions that control a perception of at least one service that the at least one end user experiences when receiving the service and wherein the policy management capabilities enables the at least one end user to test features and capabilities of the communication network associated with each QoE service level for selecting a fee to pay for the at least one service based on the perception of the service to the at least one end user;

to calculate a Latency Quality Index (LQI) rating for measuring a performance level of the communication network to determine the QoE service level that the at least one end user experiences when engaged in the at least one communication session;

to execute a service price reduction program such that an owner of the HFW network is capable of submitting an activation request to calculate an initial service pricing plan for the at least one end user based on initial profile data captured by a data collection agent to determine an initial value of the at least one end user and a base price for at least one service, the at least one database stores the initial value of the at least one end user and the base price for the at least one service, and as the at least one end user requests additional services, the service price reduction program, initially using the initial value of the at least one end user, iteratively recalculates a current value of the at least one end user based on a number of transaction requests submitted by the at least one end user to reduce the base price for the at least one service;

to provide shared resources and services of the communication network accessible by at least some of the end users having a common interest for sharing the resources and services so as to reduce cost of network services and resources paid by the at least some of the end users;

to execute a resource allocation program to dynamically allocate network resources delivered to the at least one end user per at least one transaction requested by the at least one end user and conducted during the at least one communication session;

to receive a transfer request from the at least one end user to transfer data from a first processor located at a first location to a second processor located at a second location as the at least one end user travels from the first location to the second location, the at least one processor authorizes the transfer request if the user-defined sets of rules and instructions of the at least one end user permit the transfer of the data, and the at least one processor transfers the data of the end user if the at least one processor authorizes the transfer request;

to execute an e-commerce alias program to enable the at least one end user to create a service identity to conduct an e-commerce transaction during the at least one communication session over the communication network without revealing a true identity of the at least one end user during negotiations of terms of the e-commerce transaction and revealing the true identity of the at least one end user when the at least one end user agrees to the terms of the e-commerce transaction, wherein the service identity comprises at least one attribute known to the at least one end user and at least one attribute unknown to the at least one end user;

to enable the at least one end user to dynamically submit a secure channel request to establish a secure channel to conduct the at least one session between at least two end points within the communication network;

in response to the secure channel request, to transmit a terms of service agreement to recipients of each end points to obtain consent from each recipient to terms and conditions defined within the terms of service agreements to establish the secure channel; and to issue at least one instruction to the communication network to open the secured channel between an end point of the at least one end user and each end point of the recipients that agree to terms of service for establishing the secured channel, after the completion of the secured transaction, the communication network deletes and erases all data and information associated with the at least one session conducted over the secured channel from the communication network and all the end points of the recipients and the at least one end user.

8. The communication network of claim 7, wherein the plurality of QoE service levels comprise at least one predefined service level and a customized service level and wherein the one or more dimensions comprise at least one of a mobility dimension, an audio dimension, a visual dimension, and a velocity dimension.

9. The communication network of claim 7, wherein the terms of service includes limitation of use terms such that the communication network prevents each recipient at each end point from performing one or more of the functions consisting of modifying, manipulating, copying, printing, transmitting, transferring, hyperlinking, downloading, saving, and printing any data and information associated with the at least one session at one or more devices of at least one recipient in accordance with the terms of service agreed upon by each recipient before the communication network establish the secure channel.

10. The communication network of claim 9, wherein one of the user-defined sets of rules and instructions, set by the at least one end user, is an expiration time duration specifying when the communication network erases all data and information associated with the at least one session.

11. The communication network of claim 7, wherein the policy management capabilities of the communication network enable the at least one end user to request and receive delivery of the resources and services to the at least one end user at another device different than the end user device according to requirements of the at least one service level.

12. A non-transitory computer-readable medium containing instructions for performing a method for providing services and resources using a Smart Multi-Services (SMS) communication network, the method comprising:
receiving at, one or more processors, user-defined sets of rules and instructions from a plurality of end users via a plurality of end user devices, and storing user-defined sets of rules and instructions to cause at least one processor of the one or more processors to:
configure a virtual network for each end user within the communication network using policy management capabilities based on the user-defined sets of rules and instructions provided by each end user, wherein the user-defined sets of rules and instructions define provisioning and delivery of resources and services provided by the communication network to the end user;
to conduct at least one communication session selected from the group consisting of voice, video, data, and multimedia;
to enable at least one end user of the plurality of end users to define the rules and instructions to establish at least one service level for delivering the services and resources to the end user;
wherein the at least one service level for delivering the services and resources to the at least one end user is selected from a plurality of Quality of Experience (QoE) service levels, wherein each QoE service level corresponds to one or more dimensions that control a perception of at least one service that the at least one end user experiences when receiving the service and wherein the policy management capabilities enables the at least one end user to test features and capabilities of the communication network associated with each QoE service level for selecting a fee to pay for the at least one service based on the perception of the service to the at least one end user;
to calculate a Latency Quality Index (LQI) rating for measuring a performance level of the communication network to determine the QoE service level that the at least one end user experiences when engaged in the at least one communication session;
to execute a service price reduction program such that an owner of the HFW network is capable of submitting an activation request to calculate an initial service pricing plan for the at least one end user based on initial profile data captured by a data collection agent to determine an initial value of the at least one end user and a base price for at least one service, the at least one database stores the initial value of the at least one end user and the base price for the at least one service, and as the at least one end user requests additional services, the service price reduction program, initially using the initial value of the at least one end user, iteratively recalculates a current value of the at least one end user based on a number of transaction requests submitted by the at least one end user to reduce the base price for the at least one service;
to provide shared resources and services of the communication network accessible by at least some of the end users having a common interest for sharing the resources and services so as to reduce cost of network services and resources paid by the at least some of the end users;
to execute a resource allocation program to dynamically allocate network resources delivered to the at least one end user per at least one transaction requested by the at least one end user and conducted during the at least one communication session;
to receive a transfer request from the at least one end user to transfer data from a first processor located at a first location to a second processor located at a second location as the at least one end user travels from the first location to the second location, the first processor authorizes the transfer request if the user-defined sets of rules and instructions of the at least one end user permit the transfer of the data, and the first processor transfers the data of the end user to the second processor if the first processor authorizes the transfer request;
to execute an e-commerce alias program to enable the at least one end user to create a service identity to conduct an e-commerce transaction during the at least one communication session over the communication network without revealing a true identity of the at least one end user during negotiations of terms of the e-commerce transaction and revealing the true identity of the at least one end user when the at least one end user agrees to the terms of the e-commerce transaction, wherein the service identity comprises at least one attribute known to the at least one end user and at least one attribute unknown to the at least one end user;
to enable the at least one end user to dynamically submit a secure channel request to establish a secure channel to conduct the at least one session between at least two end points within the communication network;

in response to the secure channel request, to transmit a terms of service agreement to recipients of each end points to obtain consent from each recipient to terms and conditions defined within the terms of service agreements to establish the secure channel; and to issue at least one instruction to the communication network to open the secured channel between an end point of the at least one end user and each end point of the recipients that agree to terms of service for establishing the secured channel, after the completion of the secured transaction, the communication network deletes and erases all data and information associated with the at least one session conducted over the secured channel from the communication network and all the end points of the recipients and the at least one end user.

13. The method of claim 12, wherein the plurality of QoE service levels comprise at least one predefined service level and a customized service level and wherein the one or more dimensions comprise at least one of a mobility dimension, an audio dimension, a visual dimension, and a velocity dimension.

14. The method of claim 12, wherein the terms of service includes limitation of use terms such that the communication network prevents each recipient at each end point from performing one or more of the functions consisting of modifying, manipulating, copying, printing, transmitting, transferring, hyperlinking, downloading, saving, and printing any data and information associated with the at least one session at one or more devices of at least one recipient in accordance with the terms of service agreed upon by each recipient before the communication network established the secure channel.

15. The method of claim 14, wherein one of the user-defined sets of rules and instructions, set by the at least one end user, is an expiration time duration specifying when the communication network erases all data and information associated with the at least one session.

16. The method of claim 12, wherein the policy management capabilities of the communication network enable the at least one end user to request and receive delivery of the resources and services to the at least one end user at another device different than the end user device according to requirements of the at least one service level.

* * * * *